US012044997B2

(12) United States Patent
Nishizawa et al.

(10) Patent No.: US 12,044,997 B2
(45) Date of Patent: Jul. 23, 2024

(54) IMAGE FORMING APPARATUS

(71) Applicant: CANON KABUSHIKI KAISHA, Tokyo (JP)

(72) Inventors: Yuki Nishizawa, Kanagawa (JP); Shigeto Tamura, Shizuoka (JP); Takaaki Tsuruya, Shizuoka (JP); Tsutomu Shimano, Shizuoka (JP); Kohei Matsuda, Kanagawa (JP); Tetsuya Sano, Shizuoka (JP); Kenji Takagi, Kanagawa (JP); Tomoaki Nakai, Shizuoka (JP); Masaki Shimomura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/383,659

(22) Filed: Jul. 23, 2021

(65) Prior Publication Data

US 2022/0035296 A1 Feb. 3, 2022

(30) Foreign Application Priority Data

Jul. 31, 2020 (JP) ................................ 2020-129960
Jul. 31, 2020 (JP) ................................ 2020-129961
(Continued)

(51) Int. Cl.
*G03G 15/00* (2006.01)

(52) U.S. Cl.
CPC ................................ *G03G 15/6544* (2013.01)

(58) Field of Classification Search
CPC ..... G03G 2215/00835; G03G 15/6544; G03G 2215/00877; B65H 2301/43827; B65H 2301/43822
See application file for complete search history.

(56) References Cited

U.S. PATENT DOCUMENTS 5,213,560 A * 5/1993 Crowley ................ B42D 15/08
493/332
7,260,354 B2 * 8/2007 Ishida ................ G03G 15/2064
399/407
(Continued)

FOREIGN PATENT DOCUMENTS

EP 0482644 A2 * 4/1992 ........... B42C 9/0056
JP 2001031320 A 2/2001
(Continued)

*Primary Examiner* — Jennifer Bahls
(74) *Attorney, Agent, or Firm* — ROSSI, KIMMS & McDOWELL LLP

(57) ABSTRACT

An image forming apparatus includes an image forming portion, a fixing portion configured to heat the toner image formed on the sheet by the image forming portion and fix the toner image to the sheet, a folding portion configured to fold the sheet having passed through the fixing portion such that a surface of the sheet to which the powder adhesive is applied is inside, and a bonding portion configured to heat the sheet folded by the folding portion and bond the sheet by the powder adhesive. A relationship of Tmax1>Tmax2 is satisfied, where Tmax1 (° C.) is a highest temperature of the powder adhesive when being heated by the fixing portion and Tmax2 (° C.) is a highest temperature of the powder adhesive when being heated by the bonding portion.

17 Claims, 44 Drawing Sheets

(30) Foreign Application Priority Data

| | | | |
|---|---|---|---|
| Jul. 31, 2020 | (JP) | ................................. | 2020-129962 |
| Sep. 17, 2020 | (JP) | ................................. | 2020-156213 |

(56) References Cited

U.S. PATENT DOCUMENTS

| | | | | |
|---|---|---|---|---|
| 7,579,130 | B2 * | 8/2009 | Kobayashi ......... | G03G 15/6591 428/447 |
| 8,267,391 | B2 | 9/2012 | Mizubata et al. | |
| 2007/0164505 | A1 * | 7/2007 | Ishibashi .................. | B65H 7/02 271/226 |
| 2013/0051886 | A1 * | 2/2013 | Watanabe .......... | G03G 15/6544 399/409 |
| 2017/0090313 | A1 | 3/2017 | Hoshino | |

FOREIGN PATENT DOCUMENTS

| | | | | |
|---|---|---|---|---|
| JP | 2003300669 | A | | 10/2003 |
| JP | 2004240283 | A | | 8/2004 |
| JP | 2006078545 | A | | 3/2006 |
| JP | 2006171607 | A | | 6/2006 |
| JP | 2007193004 | A | | 8/2007 |
| JP | 2008173917 | A | * | 7/2008 |
| JP | 2008181027 | A | * | 8/2008 |
| JP | 2008181027 | A | | 8/2008 |
| JP | 2011236018 | A | | 11/2011 |
| JP | 2014160208 | A | | 9/2014 |
| JP | 2015113204 | A | | 6/2015 |
| JP | 2015129840 | A | | 7/2015 |
| JP | 2016011969 | A | | 1/2016 |
| JP | 2017003770 | A | | 1/2017 |
| JP | 2017062314 | A | | 3/2017 |
| JP | 2017151399 | A | | 8/2017 |

* cited by examiner

IMAGE FORMING APPARATUS

BACKGROUND OF THE INVENTION

Field of the Invention

The present invention relates to an image forming apparatus for forming an image on a sheet.

Description of the Related Art

Hitherto, in order to create a confidential document that requires sealing, such as a salary payment statement, a pre-printed sheet is prepared in advance, and variable data is printed to each pre-printed sheet before the sheet is subjected to a sealing process performed as postprocessing. According to this method, the creation of pre-printed sheets requires much time because it requires application of adhesive, and it was inefficient to create small quantities of confidential documents.

Japanese Patent Application Laid-Open Publication No. 2006-171607 proposes an image forming apparatus configured to output a sealed document using normal paper by one apparatus through use of adhesive toner, i.e., powder adhesive, in addition to toner for forming images using an electrophotographic process. Adhesive toner is designed to melt at a temperature lower than toner for forming images, and adhesive toner is applied to a sheet serving as a recording medium by being transferred to the sheet via an electrophotographic process in a same manner as toner for forming image. Thereafter, the sheet is folded so that faces (i.e., bonding surfaces) on which adhesive toner is applied are opposed to each other, and finally, the sheet is bonded by being heated in a state where the bonding surfaces of the sheet are closely attached via adhesive toner. This method completes the printing process and the bonding process by one image forming apparatus, so that it can be efficiently applied to creating even small quantities of documents. Further, since the method for bonding sheets by heating and melting adhesive does not require application of strong pressure, it is advantageous from the viewpoint of downsizing and reducing noise of the apparatus.

However, in a case where the printing process and the bonding process are performed by one image forming apparatus as according to the technique disclosed in the above-mentioned publication, the following drawbacks may occur. In the bonding process, a surface on an outer side of the folded sheet comes into contact with a heating member such as a heating roller or a heating film and is heated thereby, and the heat is conducted through the sheet to heat the powder adhesive applied on an inner side of the folded sheet. Therefore, the temperature rise of powder adhesive is slow compared to a case where powder adhesive is in direct contact with the heating member. Meanwhile, the sheet is heated while being conveyed by a conveyance speed set in advance, so that the period of time during which the sheet is in contact with the heating member is limited. Therefore, it may be possible to set the heating temperature of the bonding process to a very high temperature to soften the powder adhesive, but there are cases where sufficient adhesive strength cannot be achieved according to this method.

SUMMARY OF THE INVENTION

The present invention provides an image forming apparatus capable of providing sufficient adhesive strength to an output product bonded using powder adhesive.

According to one aspect of the invention, an image forming apparatus includes an image forming portion configured to form a toner image on a sheet using printing toner and apply powder adhesive on the sheet, a fixing portion configured to heat the toner image formed on the sheet by the image forming portion and fix the toner image to the sheet, a folding portion configured to fold the sheet having passed through the fixing portion such that a surface of the sheet to which the powder adhesive is applied is inside, and a bonding portion configured to heat the sheet folded by the folding portion and bond the sheet by the powder adhesive, wherein the fixing portion and the bonding portion are configured such that a relationship of $Tmax1>Tmax2$ is satisfied, where $Tmax1$ (° C.) is a highest temperature of the powder adhesive when being heated by the fixing portion and $Tmax2$ (° C.) is a highest temperature of the powder adhesive when being heated by the bonding portion.

Further features of the present invention will become apparent from the following description of exemplary embodiments with reference to the attached drawings.

DESCRIPTION OF THE EMBODIMENTS

Embodiments of the present disclosure will be described with reference to the drawings.

First Embodiment

Entire Configuration of Apparatus

Figure 1:
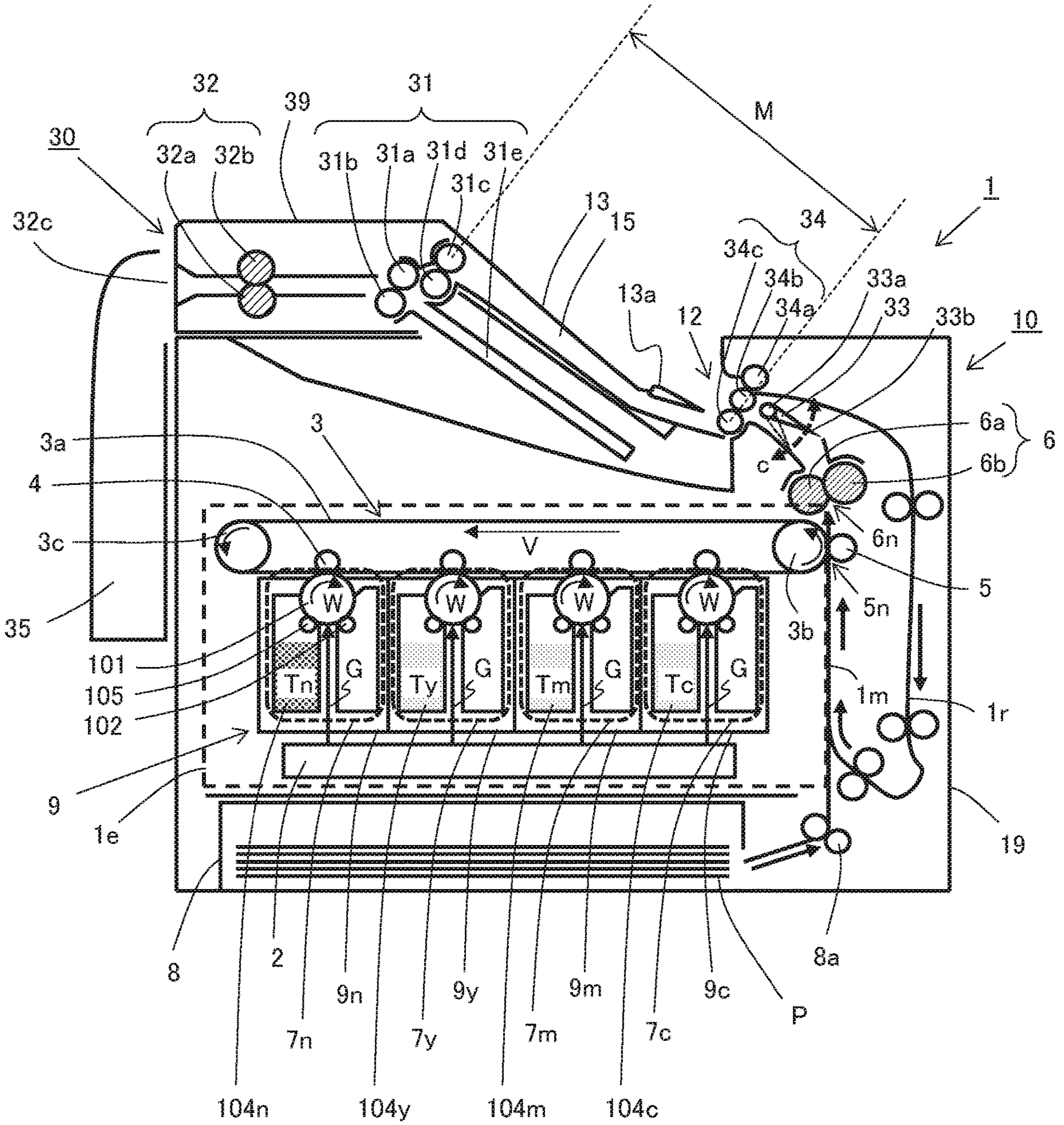
FIG. 1 is a schematic drawing of an image forming apparatus according to a first embodiment.

First, the entire configuration of the image forming apparatus will be described with reference to FIGS. 1, 2 and 6. FIG. 1 is a schematic drawing illustrating a sectional configuration of an image forming apparatus 1 including a main body of the image forming apparatus according to the first embodiment, hereinafter referred to as an apparatus body 10, and a postprocessing unit 30 connected to the apparatus body 10. The image forming apparatus 1 is an electrophotographic image forming apparatus, i.e., an electrophotographic system, composed of the apparatus body 10 having a printing function adopting an electrophotographic system and the postprocessing unit 30 serving as a sheet processing apparatus.

Figure 6:
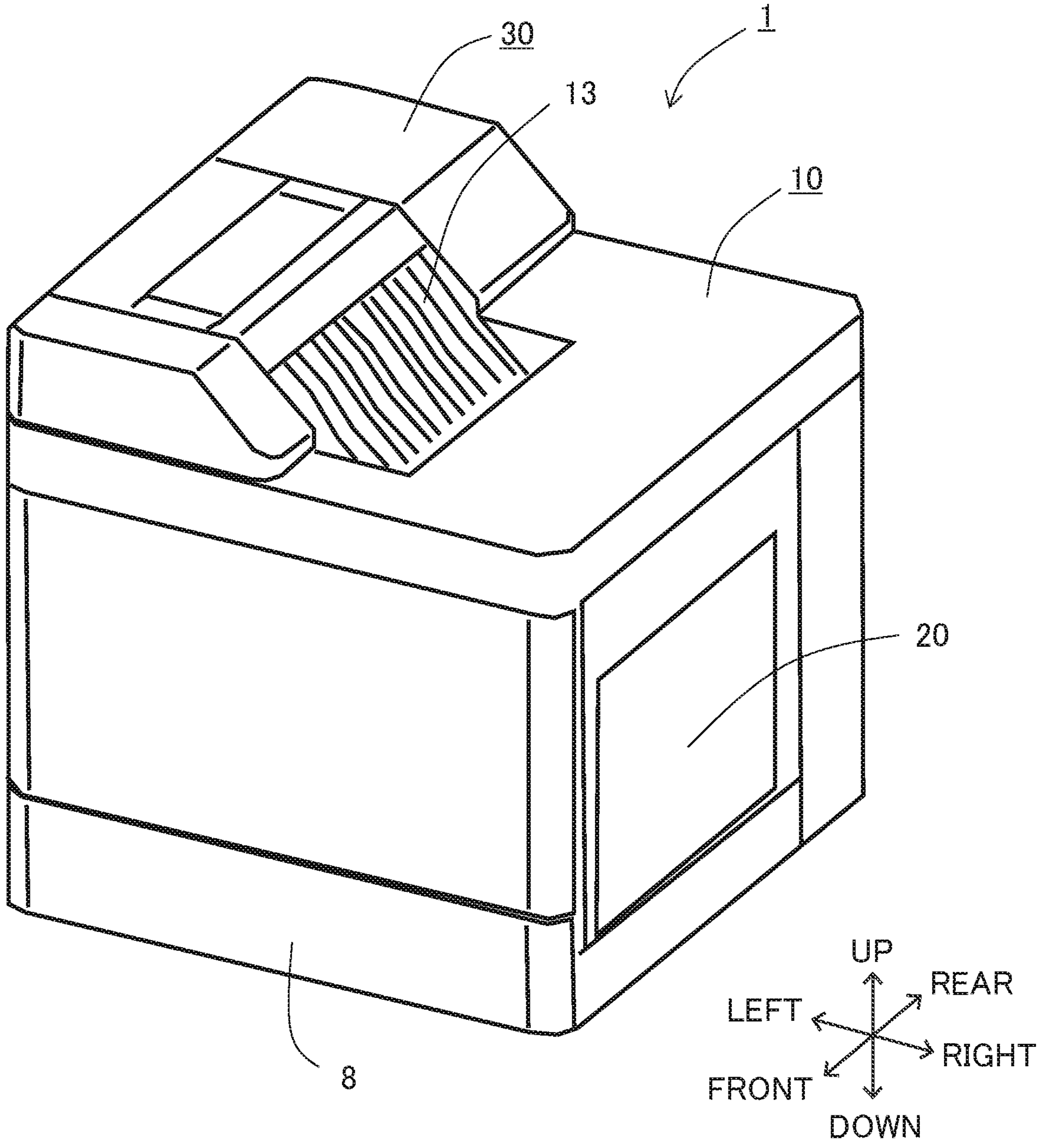
FIG. 6 is a perspective view illustrating an appearance of the image forming apparatus according to the first embodiment.

FIG. 6 is a perspective view illustrating an outer appearance of the image forming apparatus 1. The postprocessing unit 30 is attached to an upper portion of the apparatus body 10. The image forming apparatus 1 includes a sheet cassette 8 arranged at a lower portion, a tray 20 that can be opened and closed arranged at a right side portion, and a first sheet discharge tray 13 arranged at an upper face portion.

At first, an internal configuration of the apparatus body 10 will be described. As illustrated in FIG. 1, the apparatus body 10 includes the sheet cassette 8 serving as a sheet storage portion that stores sheets P serving as recording media, an image forming unit 1*e* serving as an image forming portion, a first fixing unit 6 serving as a fixing portion, and a casing 19 housing these components. The apparatus body 10 has a printing function of forming a toner image by the image forming unit 1*e* on the sheet P being fed from the sheet cassette 8 and subjecting the sheet P to a fixing process by the first fixing unit 6 to create a printed matter. Paper can be used as an example of the sheet P serving as the recording medium.

The sheet cassette 8 is inserted in a drawable manner to the casing 19 at a lower part of the apparatus body 10, and stores multiple sheets P. The sheets P stored in the sheet cassette 8 are fed from the sheet cassette 8 by a feeding member such as a feed roller, and one of the sheets P is separated from other sheets by a separation roller pair and conveyed by a conveyance roller 8*a*. Further, it is also possible to feed sheets that are set on the tray 20 arranged in an opened state (FIG. 6).

The image forming unit 1*e* is a tandem-type electrophotographic unit including four processing cartridges 7*n*, 7*y*, 7*m* and 7*c*, a scanner unit 2 and a transfer unit 3. A processing cartridge is a unit that includes a plurality of components carrying out an image forming process, which can be replaced integrally. A cartridge supporting portion 9 that can be supported in the casing 19 is provided on the apparatus body 10, and the respective processing cartridges 7*n*, 7*y*, 7*m* and 7*c* are detachably attached to attachment portions 9*n*, 9*y*, 9*m* and 9*c* provided on the cartridge supporting portion 9. The cartridge supporting portion 9 may also be a tray member that can be drawn out of the casing 19.

The processing cartridges 7*n*, 7*y*, 7*m* and 7*c* have approximately the same configuration, except for the different types of powder material stored in the four powder storage portions 104*n*, 104*y*, 104*m* and 104*c*. That is, each of the processing cartridges 7*n*, 7*y*, 7*m* and 7*c* include a photosensitive drum 101 serving as an image bearing member, a charge roller 102 serving as a charger, one of powder storage portions 104*n*, 104*y*, 104*m* and 104*c* storing powder material, and a developing roller 105 that develops image using the powder material.

Among the four powder storage portions, three powder storage portions 104*y*, 104*m* and 104*c* arranged on the right side in the drawing store printing toner Ty, Tm and Tc of yellow, magenta and cyan as toner, i.e., first powder material or powder developer, for forming a visible image on the sheet P. Meanwhile, the powder storage portion 104*n* on the leftmost side in the drawing stores the powder adhesive Tn which is powder material, i.e., second powder material for performing a bonding process after the printing process. The powder storage portions 104*y*, 104*m* and 104*c* are each an example of a first storage portion storing printing toner, and the powder storage portion 104*n* is an example of a second storage portion storing powder adhesive. Further, the processing cartridges 7*y*, 7*m* and 7*c* are each an example of a first processing unit for forming a toner image using printing toner, and a processing cartridge 7*n* is an example of a second processing unit for forming an image of powder adhesive according to a predetermined application pattern.

According to the present embodiment, in order to print a black image such as a text image, process black in which color toner of yellow (Ty), magenta (Tm) and cyan (Tc) are superposed to create black is used. However, it is possible to add a fifth processing cartridge containing black printing toner to the image forming unit 1*e* and enable a black image to be formed using black printing toner. The types and number of printing toner can be varied according to the purpose of use of the image forming apparatus 1.

The scanner unit 2 is arranged below the processing cartridges 7*n*, 7*y*, 7*m* and 7*c* and above the sheet cassette 8. The scanner unit 2 is an exposure unit or exposing portion of the present embodiment that emits laser light G to the photosensitive drum 101 of respective processing cartridges 7*n*, 7*y*, 7*m* and 7*c* to form an electrostatic latent image.

The transfer unit 3 is equipped with a transfer belt 3*a* that serves as an intermediate transfer body, i.e., secondary image bearing member. The transfer belt 3*a* is a belt member wound around a secondary transfer inner roller 3*b* and a tension roller 3*c*, and an outer peripheral surface of the transfer belt 3*a* opposes to the photosensitive drums 101 of the respective processing cartridges 7*n*, 7*y*, 7*m* and 7*c*. Primary transfer rollers 4 are arranged at positions corresponding to respective photosensitive drums 101 on the inner peripheral side of the transfer belt 3*a*. Further, a secondary transfer roller 5 serving as a transfer member is arranged at a position opposed to the secondary transfer inner roller 3*b*. A transfer nip 5*n* formed between the secondary transfer roller 5 and the transfer belt 3*a* is a transfer portion, i.e., secondary transfer portion, where toner image is transferred from the transfer belt 3*a* to the sheet P.

Figure 9:
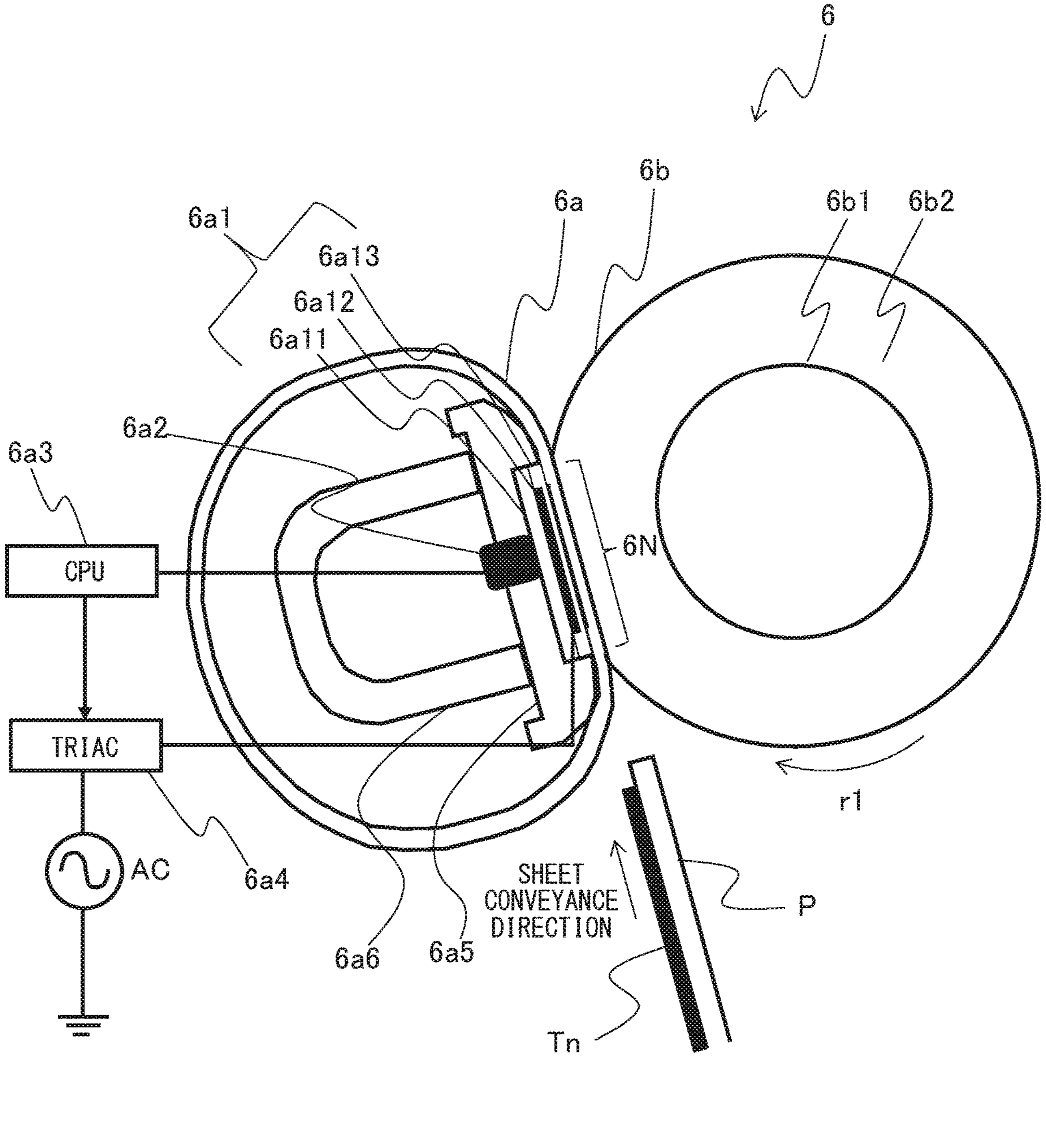
FIG. 9 is a schematic drawing of a first fixing unit according to the first embodiment.

The first fixing unit 6 is arranged above the secondary transfer roller 5. FIG. 9 is a detailed view of the first fixing unit 6. The first fixing unit 6 includes a tubular fixing film, i.e., endless belt, 6*a*, a heater 6*a*1 that contacts an inner surface of the fixing film 6*a*, and a pressure roller 6*b* that forms a fixing nip 6N with the heater 6*a*1. The fixing film 6*a* and the pressure roller 6*b* function as a rotary member pair, i.e., first rotary member pair, that nips the sheet P and rotates. The fixing film 6*a* includes a base layer having a thickness of 30 to 70 μm formed of heat-resistant resin such as polyimide, polyamide, or PEEK (Polyether Ether Ketone), or of metal such as stainless steel. The fixing film 6*a* is formed by providing an elastic layer having a thickness of 0.1 to 1 mm formed for example of silicone rubber and a release layer having a thickness of 5 to 30 μm formed of fluororesin such as PFA (Perfluoroalkoxy Alkane) or PTFE (Polytetrafluoroethylene) on a base layer. A surface roughness, i.e., Rz value, of a surface of the fixing film is set to 6 μm or less to realize sufficient smoothness. The surface roughness, i.e., Rz value, mentioned here is a value measured using a surface roughness measuring instrument SE-3400 (product of Kosaka Laboratory Ltd.). The surface layer of the fixing film 6*a* is the surface that comes into contact with toner and powder adhesive, and the toner surface having been subjected to the fixing process is smoothed along the surface shape of the fixing film 6*a* as described later.

The pressure roller 6*b* includes a core metal 6*b*1 formed for example of iron or aluminum, an elastic layer 6*b*2 having a thickness of 2 to 4 mm formed for example of silicon rubber, and a release layer formed of fluororesin such as PFA or PTFE arranged on the outermost surface.

The heater 6*a*1 serving as a heating unit, i.e., first heating unit, includes a heating resistor 6*a*12 formed for example of Ag/Pd (silver-palladium alloy) that generates heat by passing electric current therethrough and an insulation protecting layer, which according to the present embodiment is a glass layer, 6*a*13, that are arranged on a thin plate-shaped substrate 6*a*11 mainly composed of ceramics such as alumina. A temperature detecting element 6*a*2 such as a thermistor is abutted against the substrate 6*a*11 and is connected to a CPU 6*a*3 serving as a control unit installed in the image forming apparatus 1. The heater 6*a*1 is heated by having power supplied to the heating resistor 6*a*12. The heating is detected by the temperature detecting element 6*a*2, and the CPU 6*a*3 controls the electric current supplied to the heating resistor 6*a*12 via a triac 6*a*4. For example, the heater 6*a*1 is maintained to a constant temperature by performing control to increase an electric energy supplied to the heating resistor 6*a*12 so that the temperature of the heater 6*a*1 rises if a detected temperature of the temperature detecting element 6*a*2 is lower than a predetermined set temperature and to decrease the electric energy if the detected temperature is higher than the preset temperature.

The heater 6*a*1 is held by a holding member 6*a*5 made of heat-resistant resin such as LCP (Liquid Crystal Polymer). The holding member 6*a*5 also has a guiding function to guide the rotation of the fixing film 6*a*. The holding member 6*a*5 receives force toward a direction approaching the pressure roller 6*b* from a spring not shown attached to a stay 6*a*6 made of metal. The pressure roller 6*b* is in pressure contact with the fixing film 6*a* toward the direction of the heater 6*a*1 with a total pressure of 10 to 30 kgf by a pressure unit such as a spring member not shown. Thereby, the fixing nip 6N having a width of 5 to 11 mm in the sheet conveyance direction is formed between the pressure roller 6*b* and a nip forming unit composed of the heater 6*a*1 and the holding member 6*a*5.

The pressure roller 6*b* receives power from a motor not shown and rotates in the direction of arrow r1 in FIG. 9. The fixing film 6*a* is rotated by following the rotation of the pressure roller 6*b*. The sheet P bearing an unfixed toner image is conveyed together with the fixing film 6*a* through the fixing nip 6N in the sheet conveyance direction while having a surface, i.e., image surface, of the sheet P bearing the toner image and the powder adhesive Tn being in close contact with an outer surface of the fixing film 6*a* at the fixing nip 6N. Since a thermal capacity of the fixing film and the heater is especially small and the holding member 6*a*5 is formed of a material having high heat insulating property, the surface of the fixing film 6*a* can be raised to a high temperature speedily and with a small supply of heat according to the characteristic configuration of the present embodiment.

A sheet discharge port 12, i.e., first sheet discharge port, serving as an opening portion for discharging the sheet P from the apparatus body 10 is formed on the casing 19, and a sheet discharge unit 34 is arranged on the sheet discharge port 12. The sheet discharge unit 34 serving as a sheet discharge portion according to the present embodiment adopts a so-called triple roller composed of a first sheet discharge roller 34*a*, an intermediate roller 34*b* and a second sheet discharge roller 34*c*. Further, a switching guide 33 which is a flap-shaped guide that switches the conveyance route of the sheet P is provided between the first fixing unit 6 and the sheet discharge unit 34. The switching guide 33 is pivotable around a shaft portion 33*a* such that a tip 33*b* of the switching guide 33 moves back and forth in a direction of arrow c in the drawing.

The apparatus body 10 is equipped with a mechanism for performing duplex printing. A motor not shown is connected to the sheet discharge unit 34 for rotating the intermediate roller 34*b* in both a normal direction and a reverse direction. A duplex conveyance path 1*r* that serves as a conveyance path connected in a loop to a main conveyance path 1*m* is provided. The sheet P having an image formed on a first surface while passing through the main conveyance path 1*m* is nipped and conveyed by the first sheet discharge roller 34*a* and the intermediate roller 34*b* via the switching guide 33 pivoted in a clockwise direction, the position of which is shown by a dashed line. After a trailing edge of the sheet P in a feed direction passes through the switching guide 33, the switching guide 33 pivots in a counterclockwise direction, the position of which is shown by a solid line, and the rotation of the intermediate roller 34*b* is reversed, by which the sheet P is conveyed in a reverse manner to the duplex conveyance path 1*r*. While the sheet P having the front and back sides reversed passes through the main conveyance path 1*m* again, an image is formed on a second surface of the sheet P. The sheet P after being subjected to duplex printing is guided by the switching guide 33 pivoted in the counterclockwise direction, the position of which is shown by the solid line, and nipped and conveyed by the intermediate roller 34*b* and the second sheet discharge roller 34*c* to be discharged from the apparatus body 10.

The conveyance route that passes the conveyance roller 8*a*, a transfer nip 5N and a fixing nip 6N in the apparatus body 10 constitutes the main conveyance path 1*m* through which image is formed on the sheet P. The main conveyance path 1*m* extends from a position lower than to a position upper than the image forming unit 1*e* through one side in a horizontal direction when viewed in a main scanning direction for forming an image, that is, a width direction of the sheet perpendicular to a conveyance direction of the sheet conveyed in the main conveyance path 1*m*. In other words, the apparatus body 10 according to the present embodiment is a so-called vertical conveyance-type, also referred to as vertical path-type, printer in which the main conveyance path 1*m* extends in an approximately vertical direction. When viewed in the vertical direction, the first sheet discharge tray 13, an intermediate path 15 and the sheet cassette 8 are mutually overlapped. Therefore, the direction of movement of the sheet with respect to the horizontal direction when the sheet discharge unit 34 discharges the sheet P is opposite to the direction of movement of the sheet with respect to the horizontal direction when the sheet P is fed from the sheet cassette 8.

In the viewpoint of FIG. 1, that is, when viewed in the main scanning direction for forming an image, an occupation range in the horizontal direction of the main body portion excluding a second sheet discharge tray 35 of the postprocessing unit 30 preferably falls within an occupation range of the apparatus body 10. By designing the postprocessing unit 30 to fit in the space above the apparatus body 10, the image forming apparatus 1 having a printing-and-bonding function can be installed in an installation space of approximately a same size as a normal vertical path-type printer.

Postprocessing Unit

Figure 2:
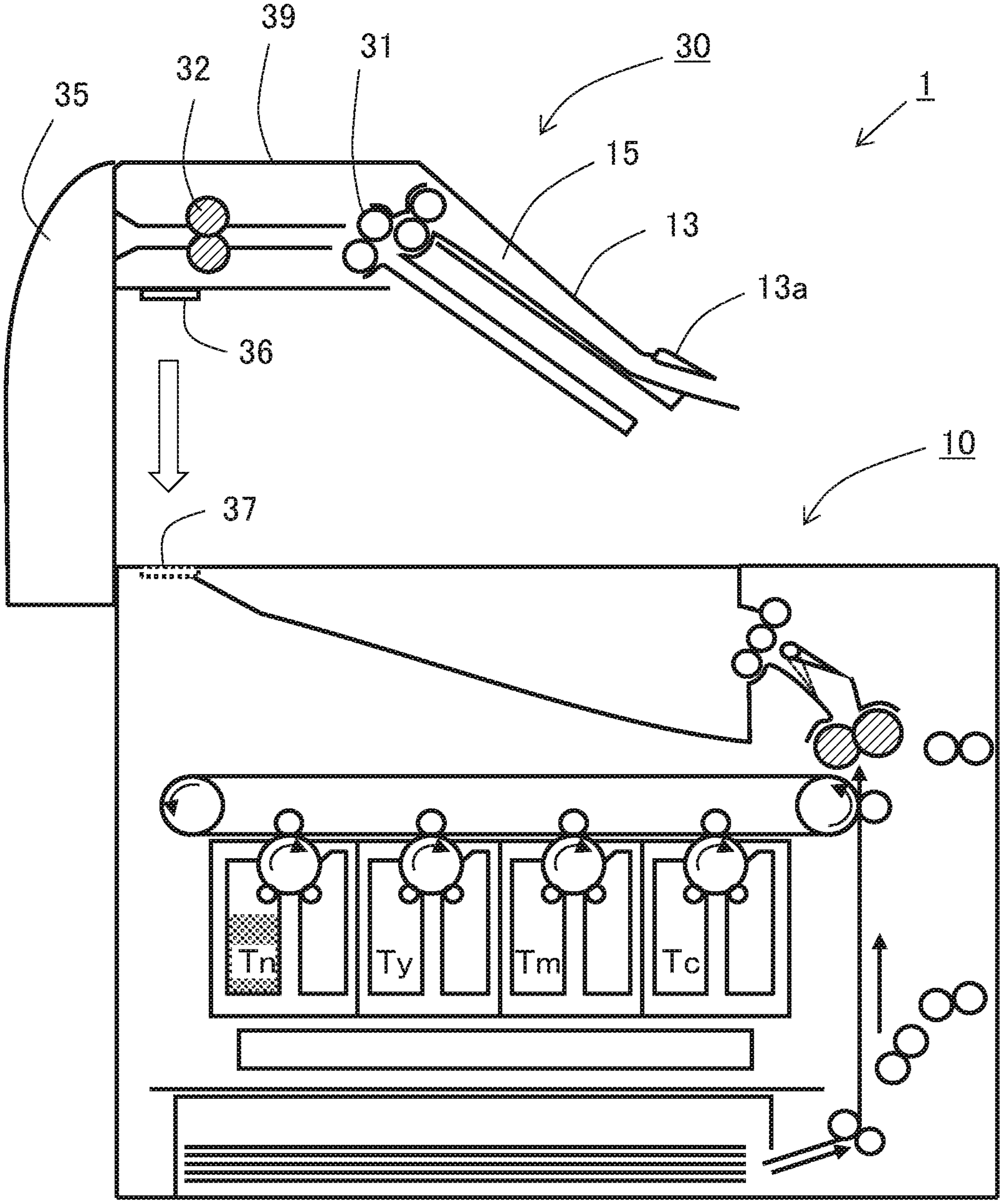
FIG. 2 is an explanatory view illustrating attachment of a postprocessing unit to an apparatus body of the image forming apparatus according to the first embodiment.

As illustrated in FIG. 2, the postprocessing unit 30 is attached to the upper portion of the apparatus body 10. The postprocessing unit 30 is a postprocessing unit in which a folding unit 31 serving as a folding portion and a second fixing unit 32 serving as a bonding portion, i.e., second fixing portion, are housed integrally in a casing, i.e., second casing, 39.

Figure 10:
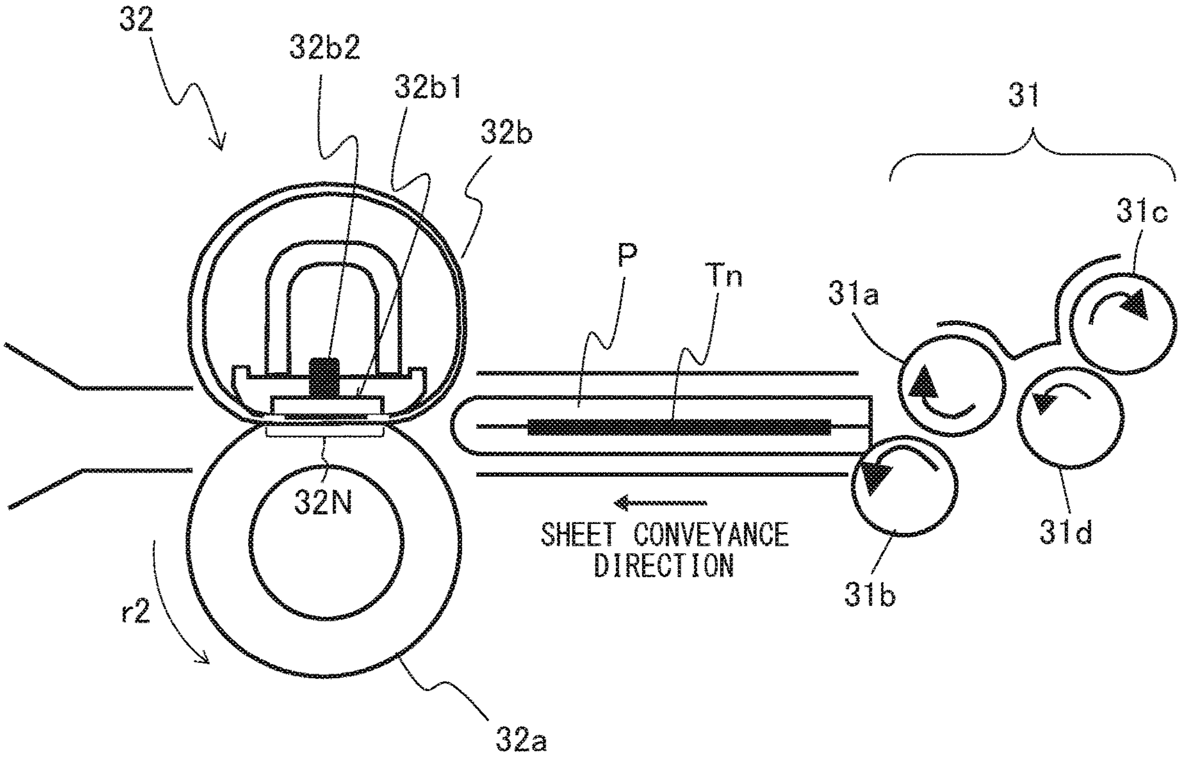
FIG. 10 is a schematic drawing of an inner side of the postprocessing unit according to the first embodiment.

The configuration of the second fixing unit 32 according to the present embodiment is substantially the same as the first fixing unit 6, as illustrated in FIG. 10. The second fixing unit 32 includes a heating film, i.e., endless belt, 32*b* having a tubular shape and a pressure roller 32*a*, and the second fixing unit 32 nips and conveys the sheet P having been folded by the folding unit 31 by a bonding nip 32N, i.e., second fixing nip, which is a nip portion formed between the heating film 32*b* and the pressure roller 32*a*. The heating film 32*b* and the pressure roller 32*a* function as a rotary member pair, i.e., second rotary member pair, that nips the sheet P and rotates. A heater 32*b*1 serving as a heating unit and a temperature detecting element 32*b*2 are provided on an inner side of the heating film 32*b*, similar to the first fixing unit 6. The heating film 32*b* is rotated following the rotation of the pressure roller 32*a* that rotates in the direction of arrow r2, by which the sheet P is nipped and conveyed by the bonding nip 32N. During this process, the sheet P is heated and pressed, by which the powder adhesive Tn applied on the sheet P is softened again, and the sheet P is bonded in the folded state.

Further, the postprocessing unit 30 includes the first sheet discharge tray 13 for rotatably supporting a tray switching guide 13*a*, the intermediate path 15 and the second sheet discharge tray 35. The first sheet discharge tray 13 is arranged on the upper surface of the postprocessing unit 30 and also arranged on the upper side of the whole body of the image forming apparatus 1 (FIG. 1). The functions of the various units in the postprocessing unit 30 will be described later.

A positioning portion, such as a projected shape that fits to a recess portion on the casing 19, for positioning the casing 39 on the casing 19, i.e., first casing, of the apparatus body 10 is provided in the postprocessing unit 30. Further, a drive source and a control unit that differ from those of the apparatus body 10 are provided on the postprocessing unit 30, and by coupling a connector 36 of the postprocessing unit 30 to a connector 37 of the apparatus body 10, the postprocessing unit 30 is electrically connected to the apparatus body 10. Thereby, the postprocessing unit 30 will operate based on a command from a control unit provided in the apparatus body 10 using power supplied through the apparatus body 10.

Processing Cartridge

Figure 8:
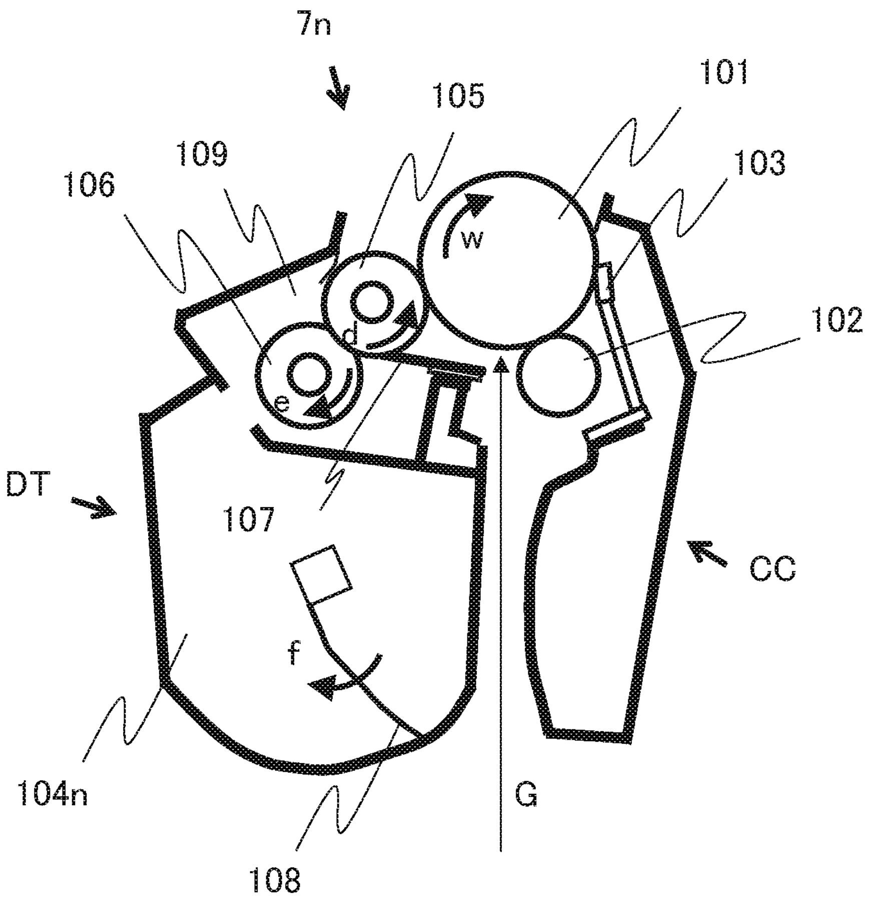
FIG. 8 is a schematic drawing of a processing cartridge according to the first embodiment.

The processing cartridges 7*n*, 7*y*, 7*m* and 7*c* have approximately common configurations except for the type of powder material stored in the four powder storage portions 104*n*, 104*y*, 104*m* and 104*c*, as mentioned earlier. The processing cartridge 7*n* will be described here as an example. FIG. 8 is a cross-sectional view illustrating a schematic configuration of the processing cartridge 7*n*. The processing cartridge 7*n* is composed of a photoreceptor unit CC including the photosensitive drum 101 and a developing unit DT including the developing roller 105.

The photosensitive drum 101 serving as an electrophotographic photoreceptor, i.e., image bearing member, formed in a drum shape is attached rotatably via a bearing not shown to the photoreceptor unit CC. Further, the photosensitive drum 101 is driven to rotate in a clockwise direction (arrow w) in the drawing during image forming operation by receiving the driving force of motor serving as a driving unit, i.e., drive source, not shown. Further, the charge roller 102 for charging the photosensitive drum 101 and a cleaning member 103 are arranged on the circumference of the photosensitive drum 101 in the photoreceptor unit CC.

The developing roller 105 serving as a developer bearing member that contacts the photosensitive drum 101 and rotates in the counterclockwise direction (arrow d) is provided in the developing unit DT. The developing roller 105 and the photosensitive drum 101 are rotated so that their surfaces are moved in the same direction at the opposing portion, i.e., contact portion.

Further, a developer feed roller, hereinafter simply referred to as "feed roller 106", that serves as a developer supply member that rotates in the clockwise direction (arrow e) in the drawing is provided in the developing unit DT. The feed roller 106 and the developing roller 105 are rotated so that their surfaces move in the same direction at the opposing portion, i.e., contact portion. The feed roller 106 feeds the powder adhesive, or the printing toner in the case of processing cartridges 7*y*, 7*m* and 7*c*, to the developing roller 105. At the same time, the feed roller 106 functions to scrape off the powder adhesive, or the printing toner in the case of the processing cartridges 7*y*, 7*m* and 7*c*, remaining on the developing roller 105 from the developing roller 105. Further, a developer blade 107 serving as a developer regulation member for regulating layer thickness of the powder adhesive, or the printing toner in the case of the processing cartridges 7*y*, 7*m* and 7*c*, supplied on the developing roller 105 by the feed roller 106 is provided in the developing unit DT.

The powder adhesive, or the printing toner in the case of the processing cartridges 7*y*, 7*m* and 7*c*, is stored as powder material in the powder storage portion 104*n*. Further, a conveying member 108 which is supported rotatably is provided in the powder storage portion 104*n*. The conveying member 108 rotates in the clockwise direction (arrow f) in the drawing to agitate the powder stored in the powder storage portion 104*n* and convey the powder to a developing chamber 109 including the developing roller 105 and the feed roller 106.

It is also possible to design the photoreceptor unit CC and the developing unit DT separately as a photoreceptor unit cartridge and a developing unit cartridge, that can be detachably attached to the image forming apparatus body. Further, it is also possible to provide the powder storage portion 104*n* and the conveying member 108 as a powder cartridge that can be detachably attached to the apparatus body separately from the processing cartridge including the photoreceptor and the developer bearing member.

Printing Toner

Conventionally known printing toner can be used as printing toner Tm, Tc and Ty according to the present embodiment. Among such toner, a printing toner that uses thermoplastic resin as binder resin is preferable. The thermoplastic resin is not specifically limited to a certain type of resin, and any type of thermoplastic resin that have been used conventionally as printing toner, such as polyester resin, vinyl resin, acrylic resin and styrene-acrylic resin can be used. The toner can contain a plurality of such resins. Specifically, a printing toner using styrene-acrylic resin is preferable. The printing toner, i.e., printing developer, can contain a coloring agent, a magnetic body, a charge control agent, a wax and an external additive.

Powder Adhesive

A powder adhesive containing thermoplastic resin as binding resin can be used as the powder adhesive Tn according to the present embodiment. The thermoplastic resin is not specifically limited, and known thermoplastic resin such as polyester resin, vinyl resin, acrylic resin, styrene-acrylic resin, polyethylene, polypropylene, polyolefin, ethylene-vinyl acetate copolymer resin and ethylene-acrylic acid copolymer resin can be used. The powder adhesive can also include a plurality of these resins.

The powder adhesive Tn should preferably further include wax. A known wax, such as ester wax which is an ester including alcohol and acid or a hydrocarbon wax such as paraffin wax, can be used.

The powder adhesive Tn can contain a coloring agent. Known coloring agents such as black coloring agent, yellow coloring agent, magenta coloring agent and cyan coloring agent can be used. The content of the coloring agent within the powder adhesive should preferably be 1.0 wt. % or less, and more preferably, 0.1 wt. % or less. The powder adhesive Tn can contain a magnetic body, a charge control agent, a wax or an external additive.

In order to configure a bonding portion using powder adhesive on the sheet P using the electrophotographic system, weight-average particle diameter of the powder adhesive Tn should preferably be 5.0 μm or more and 30 μm or less, and more preferably 6.0 μm or more and 20 μm or less. A printing toner can also be used as the powder adhesive Tn, as long as it satisfies the required adhesive property.

Example of Preparation of Powder Adhesive

An example of a method for preparing the powder adhesive Tn will be described. At first, the following materials were prepared.

| | |
|---|---|
| styrene | 75.0 parts |
| n-butyl acrylate | 25.0 parts |
| polyester resin | 4.0 parts (polyester resin having a weight-average molecular weight (Mw) of 20,000, a glass transition temperature (Tg) of 75° C. and an acid value of 8.2 mgKOH/g) |
| ethylene glycol distearate | 14.0 parts (ester wax obtained by esterifying ethylene glycol and stearic acid) |
| hydrocarbon wax | 2.0 parts (HNP-9, product of Nippon Seiro Co., Ltd.) |
| divinylbenzene | 0.5 parts |

A mixture having mixed the above materials was maintained at a temperature of 60° C., agitated at 500 rpm using a T. K. Homogenizing Mixer (product of Tokushu Kika Kogyo Co., Ltd.) and uniformly dissolved to prepare a polymerizable monomer composition.

Meanwhile, 850.0 parts of 0.10 mol/L—$Na_3PO_4$ aqueous solution and 8.0 parts of 10% hydrochloric acid were added to a container equipped with a high speed agitation apparatus Clearmix (product of M Technique Co., Ltd.), which was heated to 70° C. with a rotation speed set to 15,000 rpm. Then, 127.5 parts of 1.0 mol/L—$CaCl_2$ aqueous solution was added to prepare an aqueous medium containing a calcium phosphate compound.

After putting the above-described polymerizable monomer composition into the aqueous medium, 7.0 parts of t-butyl peroxypivalate, which is a polymerization initiator, was added, and granulation was performed for 10 minutes while maintaining a rotation speed of 15,000 rpm. Thereafter, the agitator was changed from the high speed agitator to a propeller-type agitator, and reaction was performed for five hours at 70° C. under reflux, before further reaction was performed for two hours with the solution temperature set to 85° C.

After completing polymerization reaction, the acquired slurry was cooled, and hydrochloric acid was added to the slurry to adjust the pH to 1.4, which was agitated for one hour to dissolve calcium phosphate salt. Thereafter, washing was performed using an amount of water three times the amount of slurry, then filtering and drying was performed, and finally, classification was performed to obtain powder adhesive particles.

Thereafter, 2.0 parts of silica particulates (number particle average diameter of primary particles: 10 nm, BET specific surface area: 170 $m^2/g$) which had been subjected to hydrophobization treatment using dimethyl silicone oil (20 wt. %) was added as additive to 100.0 parts of powder adhesive particles. Then, powder adhesive particles having silica particulates added thereto were mixed for 15 minutes at 3,000 rpm using a Mitsui Henschel Mixer (product of Mitsui Miike Chemical Engineering Machinery Co., Ltd.) to obtain powder adhesive. The weight-average particle diameter of the powder adhesive being obtained was 6.8 μm.

Method for Measuring Glass Transition Temperature (Tg)

Glass transition temperature (Tg) of the powder adhesive Tn can be measured using a differential scanning calorimetry analyzer "Q1000" (product of TA Instruments). Melting points of indium and zinc are used for temperature correction of temperature detecting portion, and fusion heat of indium is used to correct heat quantity.

Specifically, 1 mg of a sample is precisely weighed, which is put into an aluminum pan, and an empty aluminum pan is used as a reference. Measurement using a modulation measurement mode is performed for 60 seconds within the range of 0 to 100° C. with a temperature rising speed of 1° C./min and a temperature modulation condition of ±0.6° C./60 sec. Specific heat change is obtained in the temperature rising process, and an intersection point between a differential thermal curve and a line of an intermediate point between a base line before and after the appearance of specific heat change is set as the glass transition temperature (Tg). The obtained glass transition temperature (Tg) of the powder adhesive Tn was 52° C.

Example of Preparation of Printing Toner

Next, an example of a method for preparing the printing toner Ty, Tm and Tc will be described. At first, the following materials were prepared.

| | |
|---|---|
| styrene | 60.0 parts |
| coloring agent | 6.5 parts (C.I. Pigment Blue 15:3, product of Dainichiseika Color & Chemicals Mfg. Co., Ltd.) |

The above materials were put into an attritor (product of Mitsui Miike Chemical Engineering Machinery Co., Ltd.), and zirconia particles having a diameter of 1.7 mm were used to perform dispersion for five hours by 220 rpm to obtain a pigment dispersion.

Further, the following materials were prepared.

| | |
|---|---|
| styrene | 15.0 parts |
| n-butyl acrylate | 25.0 parts |
| polyester resin | 4.0 parts (polyester resin having a weight-average molecular weight (Mw) of 20,000, a glass transition temperature (Tg) of 75° C. and an acid value of 8.2 mgKOH/g) |
| behenyl behenate | 12.0 parts (ester wax having esterified behenic acid and behenyl alcohol) |
| divinylbenzene | 0.5 parts |

The above materials were mixed and added to the pigment dispersion. The obtained mixture was maintained at a temperature of 60° C., agitated at 500 rpm using a T. K. Homogenizing Mixer (product of Tokushu Kika Kogyo Co., Ltd.), and uniformly dissolved to prepare a polymerizable monomer composition.

Meanwhile, 850.0 parts of 0.10 mol/L—$Na_3PO_4$ aqueous solution and 8.0 parts of 10% hydrochloric acid were added to a container equipped with a high speed agitation apparatus Clearmix (product of M Technique Co., Ltd.), which was heated to 70° C. with a rotation speed set to 15,000 rpm. Then, 127.5 parts of 1.0 mol/L—$CaCl_2$ aqueous solution was added to the above to prepare an aqueous medium containing a calcium phosphate compound.

After putting the above-described polymerizable monomer composition into the aqueous medium, 7.0 parts of t-butyl peroxypivalate, which is a polymerization initiator, was added, and granulation was performed for 10 minutes while maintaining a rotation speed of 15,000 rpm. Thereafter, the agitator was changed from the high speed agitator to a propeller-type agitator, reaction was performed for five hours at 70° C. under reflux, and then further reaction was performed for two hours with a solution temperature set to 85° C.

After completing polymerization reaction, the acquired slurry was cooled, and hydrochloric acid was added to the slurry to adjust the pH to 1.4, which was agitated for one hour to dissolve calcium phosphate salt. Thereafter, washing was performed using an amount of water three times the amount of slurry, then filtering and drying was performed, and finally, classification was performed to obtain toner particles.

Thereafter, 2.0 parts of silica particulates (number particle average diameter of primary particles: 10 nm, BET specific surface area: 170 $m^2/g$) having been subjected to hydrophobization treatment using dimethyl silicone oil (20 wt. %) was added as additive to 100.0 parts of toner particles. Then, toner particles having silica particulates added thereto were mixed for 15 minutes at 3,000 rpm using a Mitsui Henschel Mixer (product of Mitsui Miike Chemical Engineering Machinery Co., Ltd.) to obtain toner. The weight-average particle diameter of the obtained printing toner was 6.5 μm.

Method for Measuring Weight-Average Particle Diameter

Weight-average particle diameter of the printing toner Ty, Tm and Tc and the powder adhesive Tn were obtained by the following method. A precise particle size distribution measurement device called "Coulter Counter Multisizer 3" (Registered Trademark, product of Beckman Coulter, Inc.) that adopts an aperture electrical resistance method using a 100-μm aperture tube was used as a measurement device. A specialized software attached to the device called "Beckman Coulter Multisizer 3 Version 3.51" (product of Beckman Coulter, Inc.) was used to set measurement conditions and analyze measurement data. Number of effective measurement channels for the measurement was set to 25,000 channels.

Electrolyte solution having analytical grade sodium chloride dissolved in ion exchanged water with a concentration set to 1 wt. %, such as "ISOTON II" (product of Beckman Coulter, Inc.) can be used as the electrolyte solution used for the measurement.

Prior to performing measurement and analysis, setting of the specialized software is performed as described below. On "change standard measurement method (SOM)" screen of the specialized software, a total number of counts of a control mode is set to 50,000 particles, and the number of times of measurement is set to once, and a value obtained by using "standard particles 10.0 μm" (product of Beckman Coulter, Inc.) is set as Kd value. By clicking on "Button for measuring threshold/noise level", the threshold and the noise level are set automatically. Further, current is set to 1,600 μA, gain is set to 2, electrolyte is set to ISOTON II, and a check mark is entered in a box for "flush aperture tube after measurement". On a "set conversion from pulse to particle diameter" screen of the specialized software, a bin interval is set to logarithmic particle diameter, particle diameter bin is set to 256 particle diameter bins, and particle diameter range is set from 2 μm to 60 μm.

An actual measurement method is as described below.

(1) 200 mL of electrolyte solution is poured into a 250-mL round-bottom beaker made of glass dedicated for use in Multi sizer 3, the beaker is set on a sample stand, and agitation of stirrer rod is performed in a counterclockwise direction at 24 rps. Then, using the "flushing of aperture tube" function of the specialized software, soiling and air bubbles in the aperture tubes are removed.

(2) 30 mL of electrolyte solution is poured into a 100-mL flat-bottom beaker made of glass. 0.3 mL of diluent obtained by diluting "Contaminon N" (Registered Trademark) (10 wt. % aqueous solution of neutral detergent of pH7 for washing precise measuring device composed of nonionic surfactant, anionic surfactant and organic builder, product of Wako Pure Chemical Industries, Ltd.) in ion exchanged water to three times by mass is added as dispersant.

(3) An ultrasonic dispersion device "Ultrasonic Dispersion System Tetora 150" (product of Nikkaki Bios Co., Ltd.) with an electrical output of 120 W is prepared, in which two oscillators with an oscillating frequency of 50 kHz are installed with a 180-phase difference. 3.3 L of ion exchanged water is poured into a tank of the ultrasonic dispersion device, and 2 mL of Contaminon N is added to the tank.

(4) The beaker mentioned in (2) is set to a beaker fixing hole of the ultrasonic dispersion device, and the ultrasonic dispersion device is activated. The height position of the beaker is set so that a resonant state of liquid level of the electrolyte solution within the beaker is maximized.

(5) Toner or powder adhesive is added and dispersed a little at a time to the electrolyte solution until a total amount of 10 mg is obtained while irradiating ultrasonic waves to the electrolyte solution in the beaker of (4). Then, ultrasonic wave dispersion processing is continued further for 60 seconds. During ultrasonic wave dispersion, the solution temperature in the tank is controlled to fall between 10° C. and 40° C.

(6) The electrolyte solution mentioned in (5) in which toner or powder adhesive is dispersed is dripped using a pipette to the round-bottom beaker mentioned in (1) placed on the sample stand, so that a measurement concentration of 5% is obtained. Then, measurement is performed until the number of measured particles reaches 50,000.

(7) Measurement data is analyzed using the specialized software attached to the device, and weight-average particle diameter is calculated.

Image Forming Operation

Figure 3:
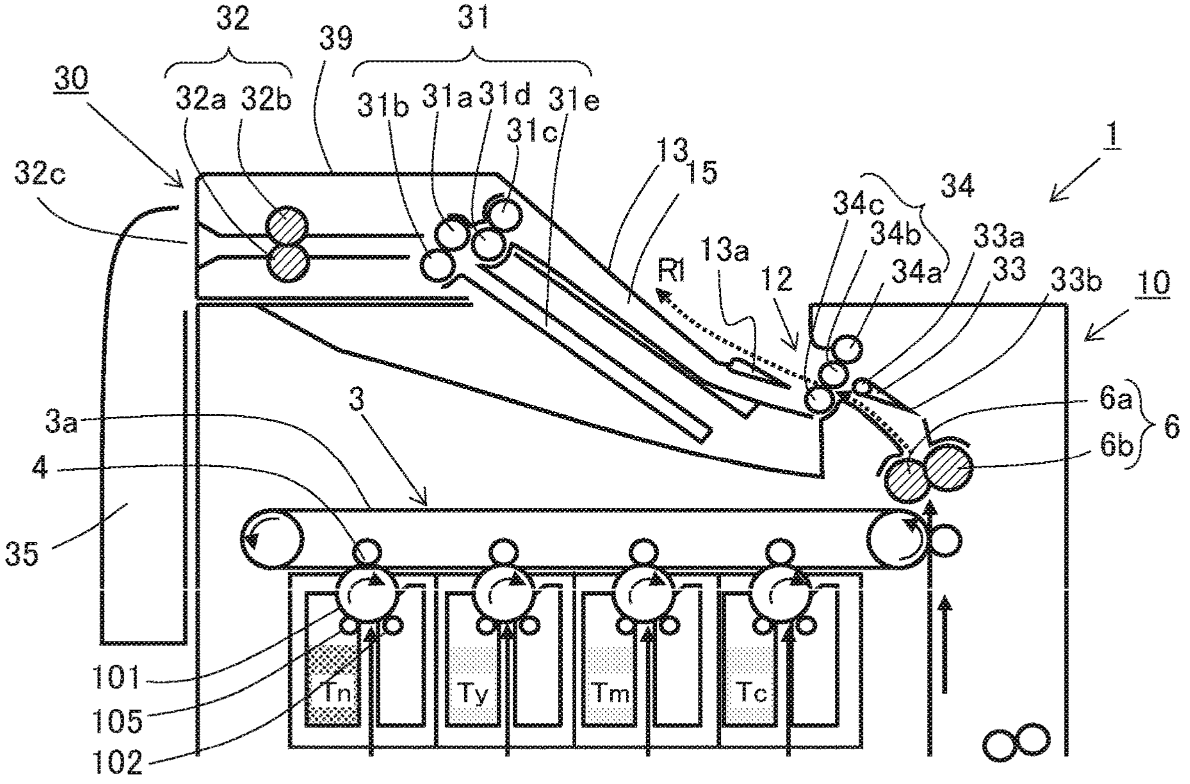
FIG. 3 is a view illustrating a conveyance route of a sheet in the image forming apparatus according to the first embodiment.
Figure 4:
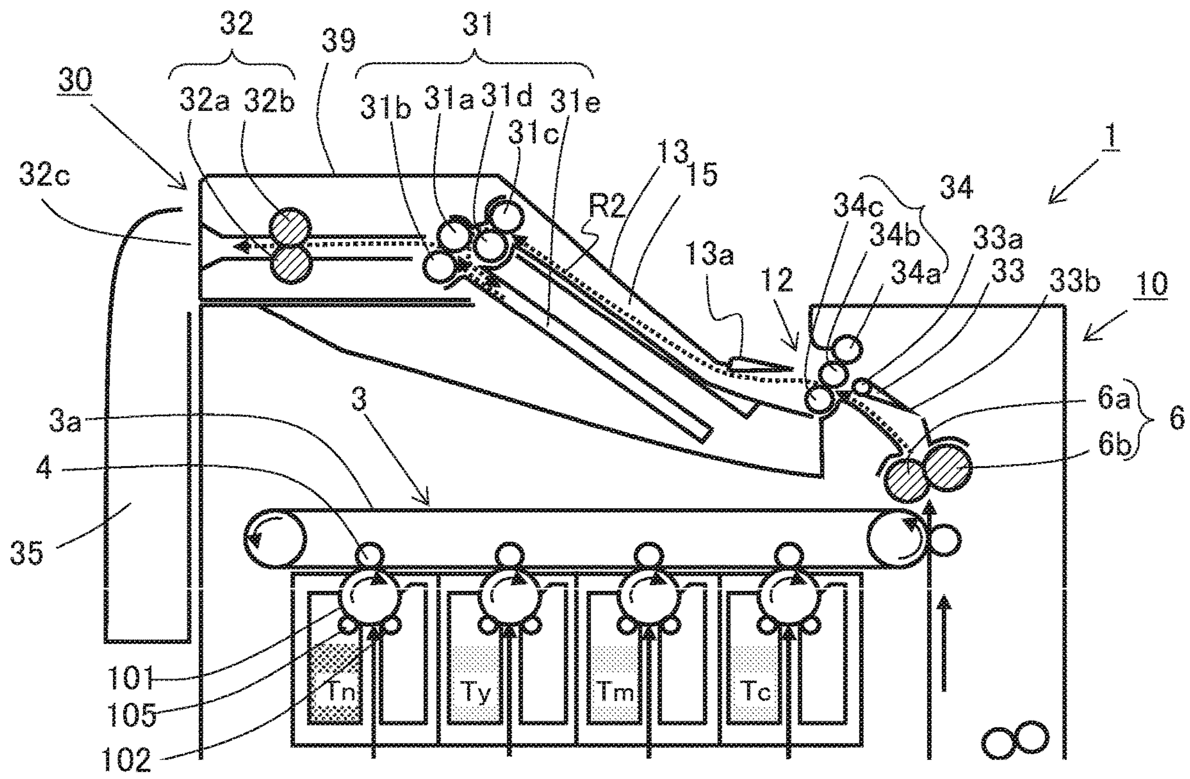
FIG. 4 is a view illustrating another conveyance route of a sheet in the image forming apparatus according to the first embodiment.

Next, an image forming operation according to the image forming apparatus 1 of the present embodiment will be described with reference to FIGS. 1 to 8. FIGS. 3 and 4 are views illustrating conveyance routes of the sheet in the image forming apparatus 1. FIGS. 5A to 5F are views illustrating the contents of the folding process.

In a state where data of the image to be printed and a command to execute printing are entered to the image forming apparatus 1, a control unit of the image forming apparatus 1 starts a sequence of operations, i.e., image forming operation, in which the sheet P is conveyed and subjected to image formation, and if necessary, subjected to postprocessing by the postprocessing unit 30. In the image forming operation, at first as illustrated in FIG. 1, the sheet P is fed one at a time from the sheet cassette 8 and conveyed via the conveyance roller 8*a* toward the transfer nip 5*n*.

In parallel with the feeding of the sheet P, the processing cartridges 7*n*, 7*y*, 7*m* and 7*c* are driven sequentially, and the photosensitive drums 101 are driven to rotate in the clockwise direction (arrow w) in the drawing. In this state, a uniform charge is applied to the surface of each photosensitive drum 101 by the charge roller 102. Further, the scanner unit 2 irradiates laser light G modulated according to image data to the photosensitive drums 101 of respective processing cartridges 7*n*, 7*y*, 7*m* and 7*c*, by which electrostatic latent images are formed on the surface of the photosensitive drums 101. Next, the electrostatic latent images on the photosensitive drums 101 are developed as powder material images by powder material borne on the developing rollers 105 of the processing cartridges 7*n*, 7*y*, 7*m* and 7*c*.

The powder adhesive layer formed on the photosensitive drum 101 by developing the image using the powder adhesive Tn differs from the image formed of printing toner for recording an image such as a figure or a text to the sheet P, that is, normal toner image, since the former does not aim at transmitting visual information. However, the layer of powder adhesive Tn developed by an electrophotographic process of applying the powder adhesive Tn to the sheet P by a predetermined application pattern can also be considered as one type of "toner image".

The transfer belt 3*a* rotates in a counterclockwise direction (arrow v) in the drawing. The toner images formed on the respective processing cartridges 7*n*, 7*y*, 7*m* and 7*c* are primarily transferred from the photosensitive drums 101 to the transfer belt 3*a* by electric field formed between the photosensitive drum 101 and the primary transfer roller 4.

As illustrated in FIG. 1, the processing cartridge 7*n* using the powder adhesive Tn is positioned most upstream among the four processing cartridges in the direction of rotation of the transfer belt 3*a*. Processing cartridges 7*y*, 7*m* and 7*c* of yellow, magenta and cyan are arranged in the named order from the processing cartridge 7*n* toward the downstream side in the direction of rotation of the transfer belt 3*a*. Therefore, if the four types of toner images are superposed on the transfer belt 3*a*, the powder adhesive Tn will constitute the lowermost layer, that is, the layer in contact with the transfer belt 3*a*, and printing toner of yellow (Ty), magenta (Tm) and cyan (Tc) are superposed thereon in the named order.

Figure 27:
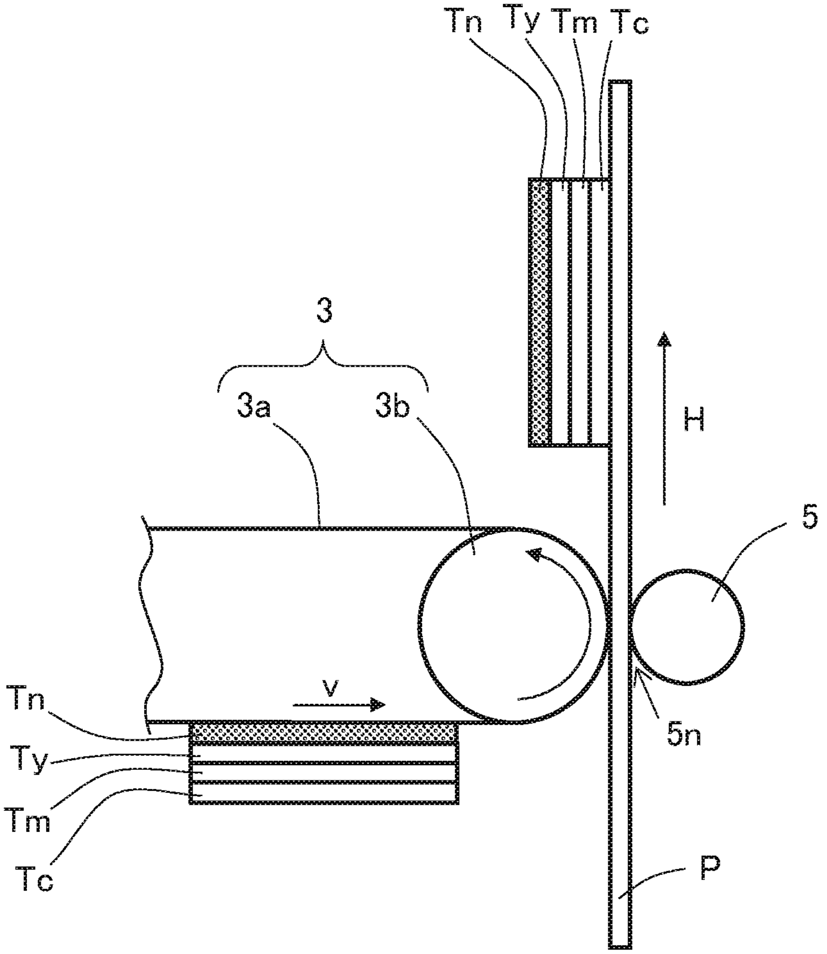
FIG. 27 is a schematic diagram illustrating layers of toner and powder adhesive transferred to a sheet.

The toner image borne on the transfer belt 3*a* and having reached the transfer nip 5N is secondarily transferred to the sheet P conveyed through the main conveyance path 1*m* by the electric field formed between the secondary transfer roller 5 and the secondary transfer inner roller 3*b*. In that state, the order of the toner layers in the vertical direction is reversed. That is, from the lowermost layer, or layer in contact with the sheet P, printing toner of cyan (Tc), magenta (Tm) and yellow (Ty) are superposed to the sheet P having passed the transfer nip 5*n*, and the layer of powder adhesive Tn is formed on top. Thus, as illustrated in FIG. 27, the layer of powder adhesive Tn is formed on the uppermost surface of the toner image transferred to the sheet P.

Thereafter, the sheet P bearing the unfixed toner image is nipped and conveyed together with the fixing film 6*a* in the fixing nip 6N while having the image surface side of the sheet P being in close contact with the outer surface of the fixing film 6*a* at the fixing nip 6N. During the nipping and conveying process, the heat from the heater 6*a*1 is applied on the image surface of the sheet P via the fixing fil 6*a*, by which the printing toner Ty, Tm and Tc and the powder adhesive Tn are melted and fixed on the sheet P. The sheet P having passed the fixing nip 6N is self-stripped from the fixing film 6*a* (i.e., separated from the fixing film 6*a* because of the curvature of the film) while maintaining the fixed toner image, so that an image fixed to the sheet P is obtained.

Regardless of whether the printing is one-side printing or duplex printing, the sheet P discharged from the apparatus body 10 is nipped by the intermediate roller 34*b* and the second sheet discharge roller 34*c*, as illustrated in FIGS. 3 and 4, and the sheet P is either conveyed to a first route R1 or a second route R2 by the tray switch guide 13*a*.

The first route R1 illustrated in FIG. 3 is a route through which the sheet P having passed the first fixing unit 6 is discharged by the sheet discharge unit 34 to the first sheet discharge tray 13 in a normal printing mode where the postprocessing unit 30 is not used. The second route R2 illustrated in FIG. 4 is a route through which the sheet P having passed through the first fixing unit 6 is conveyed via the sheet discharge unit 34, the folding unit 31 and the second fixing unit 32 and discharged to the second sheet discharge tray 35 in a print-and-bond mode.

The intermediate path 15 is provided between the first fixing unit 6 and the folding unit 31 in the second route R2. The intermediate path 15 is a sheet conveyance path that passes the upper surface portion, i.e., top panel portion, of the image forming apparatus 1, and extends approximately in parallel with the first sheet discharge tray 13 at the lower side of the first sheet discharge tray 13. The intermediate path 15 and the first sheet discharge tray 13 are inclined upward in the vertical direction toward the folding unit 31 with respect to the horizontal direction. Therefore, an inlet port of the folding unit 31, that is, the guide roller pair 312, is positioned upper in the vertical direction than an outlet port of the apparatus body 10, that is, the nip between the intermediate roller 34*b* and the second sheet discharge roller 34*c*.

The folding unit 31 includes four rollers, which are a first guide roller 31*c*, a second guide roller 31*d*, a first folding roller 31*a* and a second folding roller 31*b*, and a drawing portion 31*e*. The first guide roller 31*c* and the second guide roller 31*d* are a guide roller pair 312 that nips and conveys the sheet P received from a conveyance path arranged upstream of the folding unit 31, which is the intermediate path 15 according to the present embodiment. The first folding roller 31*a* and the second folding roller 31*b* constitute a folding roller pair 311 that folds the sheet P while conveying the sheet P.

A distance M (FIG. 1) from the second sheet discharge roller 34*c* to the first guide roller 31*c* in the sheet conveyance direction along the second route R2 is designed to be shorter than a total length L (FIG. 5A) in the conveyance direction of the sheet P prior to the folding process. In other words, a lower limit of the conveyance direction length of the sheet that can be processed by the postprocessing unit 30 is determined by the distance M from the second sheet discharge roller 34*c* to the first guide roller 31*c*. According to this configuration, the sheet P is transferred smoothly from the sheet discharge unit 34 to the guide roller pair 312.

Figure 5A:
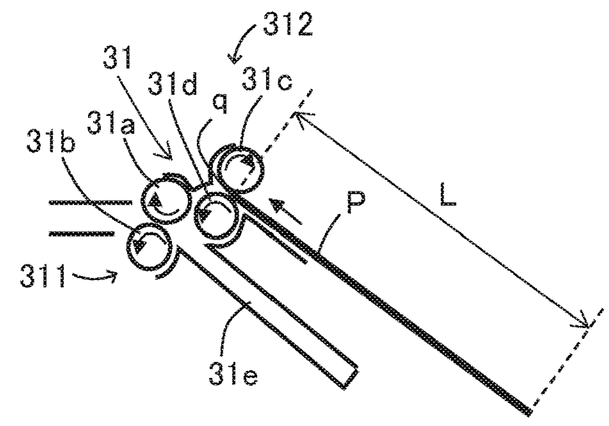
FIGS. 5A to 5F are views illustrating folding steps according to the first embodiment.
Figure 5B:
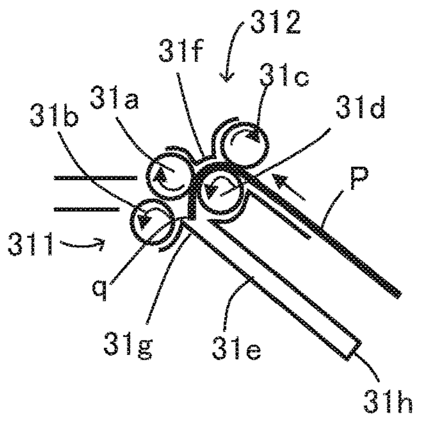

A folding process performed by the folding unit 31 will be described with reference to FIGS. 5A to 5F. When executing the folding process, the first guide roller 31*c* and the first folding roller 31*a* are rotated in the clockwise direction, and the second guide roller 31*d* and the second folding roller 31*b* are rotated in the counterclockwise direction in the drawing. At first, a leading edge q of the sheet P conveyed from the sheet discharge unit 34 is drawn into the guide roller pair 312, as illustrated in FIG. 5A. The leading edge q of the sheet P is guided downward by a guide wall 31*f*, comes into contact with the first folding roller 31*a*, and is drawn by the first folding roller 31*a* and the second guide roller 31*d* which are opposed to each other and comes into contact with a wall 31*g* of the drawing portion 31*e*, as illustrated in FIG. 5B.

Figure 5C:
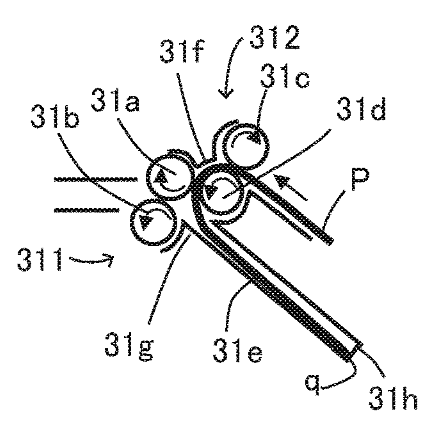

Along with the drawing of the sheet P by the guide roller pair 312, the leading edge q moves toward the depth of the drawing portion 31*e* while sliding against the wall 31*g*. Then, as illustrated in FIG. 5C, the leading edge q abuts against an end portion 31*h* of the drawing portion 31*e*. The drawing portion 31*e* forms a space that is extended approximately parallel to the intermediate path 15 at the lower side of the intermediate path 15, and in the state illustrated in FIG. 5C, the sheet P is curved in a U shape by being wound around the second guide roller 31*d*.

Figure 5D:
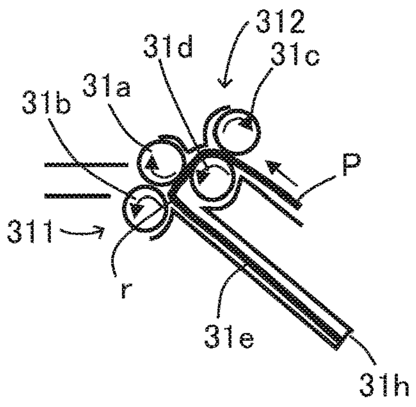
Figure 5E:
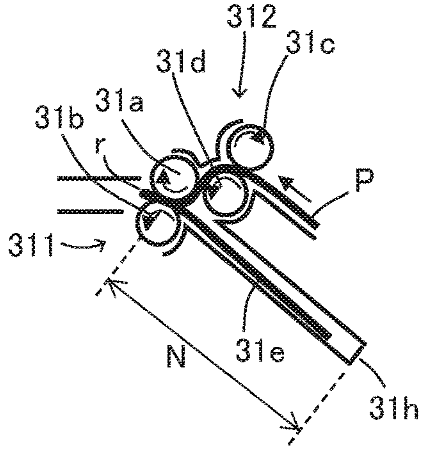
Figure 5F:
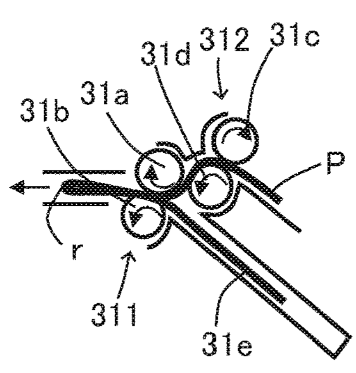

As the sheet P is drawn further by the guide roller pair 312 from the state illustrated in FIG. 5C, a warp starts to build at a middle part r, as illustrated in FIG. 5D. Then, when the middle part r contacts the second folding roller 31*b*, the middle part is drawn into the nip portion of the folding roller pair 311 by frictional force received from the second folding roller 31*b*, as illustrated in FIG. 5E. Then, the sheet P in the folded state with the middle part r serving as a folding line is discharged with the middle part r positioned as the leading edge by the folding roller pair 311, as illustrated in FIG. 5F.

A depth N of the drawing portion 31*e* (FIG. 5E), that is, the distance from the nip portion of the folding roller pair 311 to an end portion 31*h* of the drawing portion 31*e*, is set to half the total length L of the sheet P. Thereby, the folding unit 31 can execute a process of folding the sheet P at half the sheet length, i.e., center folding. The position of the folding line can be changed arbitrarily by changing the depth N of the drawing portion 31*e*.

The folding unit 31 described above is an example of the folding portion, and other folding mechanisms can be adopted, such as a folding mechanism in which a folding line is formed by pressing a blade against the sheet P and pushing the sheet into the nip portion of a roller pair. Not only a two-fold folding process but also a Z-shaped fold or a three-fold folding process can be executed by the folding mechanism. Since the folding unit 31 according to the present embodiment is composed of rollers that are rotated and the drawing portion 31*e* that is fixed, the driving mechanism thereof can be simplified compared to the folding mechanism using a blade that moves in reciprocating motion. Further, the folding unit 31 according to the present embodiment only requires the drawing portion 31*e* having the depth N set to half the sheet length in addition to the four rollers, so that the postprocessing unit 30 can be downsized.

The sheet P that has been folded by folding unit 31 is conveyed to the second fixing unit 32, where the sheet P is subjected to a bonding treatment where the sheet receives heat and pressure while being nipped and conveyed by the bonding nip 32N. The sheet P is bonded in the state folded as illustrated in FIG. 10 by receiving the bonding treatment, which is a second heat fixing performed to the image surface to which the powder adhesive has been applied. In other words, in a state where the powder adhesive Tn on the sheet P is heated and softened again when the sheet P is passed through the bonding nip 32N and pressed, the inner side surfaces of the sheet P are bonded via the powder adhesive Tn.

The sheet P having been subjected to the bonding treatment by the second fixing unit 32 is discharged to a left side of the drawing through a sheet discharge port 32*c*, i.e., second sheet discharge port, provided on the casing 39 of the postprocessing unit 30, as illustrated in FIG. 4. The sheet P is then stored in the second sheet discharge tray 35 provided on the left side of the apparatus body 10 (refer to FIG. 1). Thereby, the image forming operation in which the sheet P is conveyed through the second route R2 is ended.

Figure 7A:
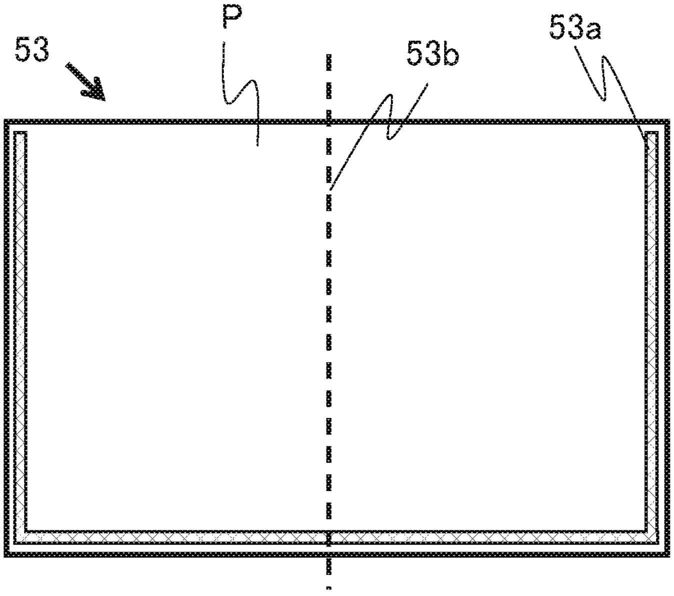
FIGS. 7A and 7B are views illustrating examples of a product output from the image forming apparatus according to the first embodiment.
Figure 7B:
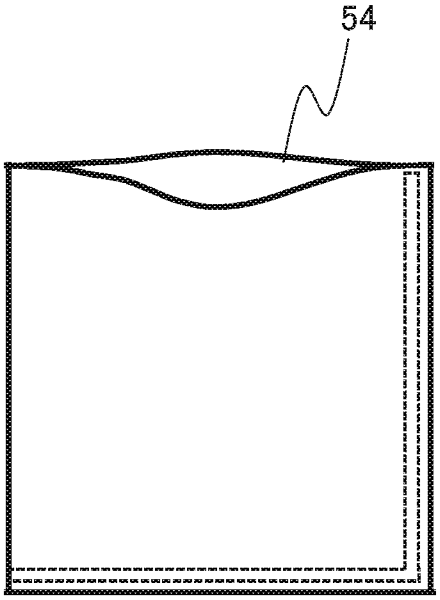

FIG. 7A illustrates an example of an application pattern of the powder adhesive Tn, and FIG. 7B illustrates a paper pouch (or paper bag) serving as an example of a printed-and-bonded product, which is a completely bonded product 54 as an output object of the image forming apparatus 1. In this example, the image forming unit 1*e* applies the powder adhesive Tn to an area 53*a* having a rectangular shape with one side opened so that three edges including a folding line 53*b* for folding the sheet P are bonded. Bonding treatment is performed after the sheet P has been folded so that the layers of the powder adhesive Tn applied to the area 53*a* face each other, according to which a paper pouch illustrated in FIG. 7B having one edge opened is formed.

Figure 28A:
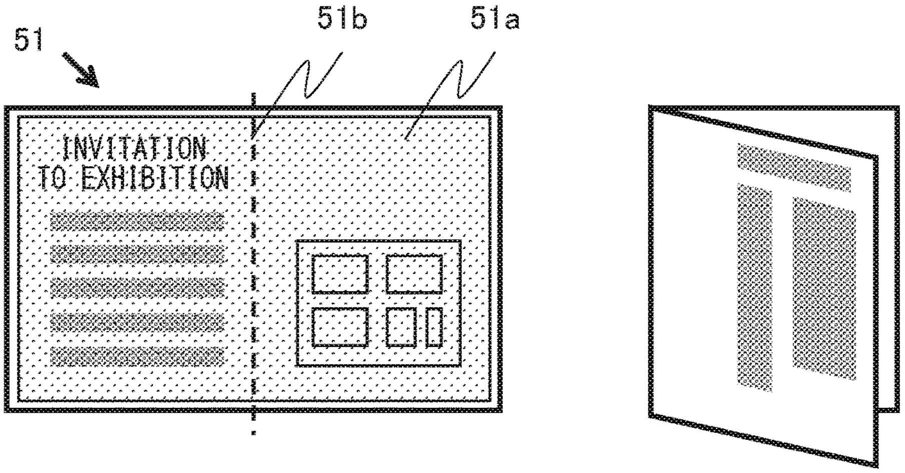
FIGS. 28A to 28C are views illustrating a product output from the image forming apparatus.
Figure 28B:
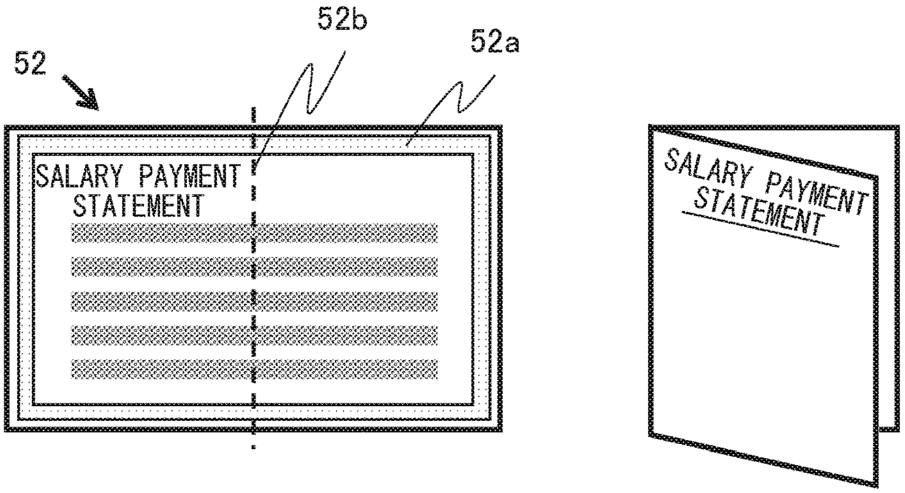
Figure 28C:
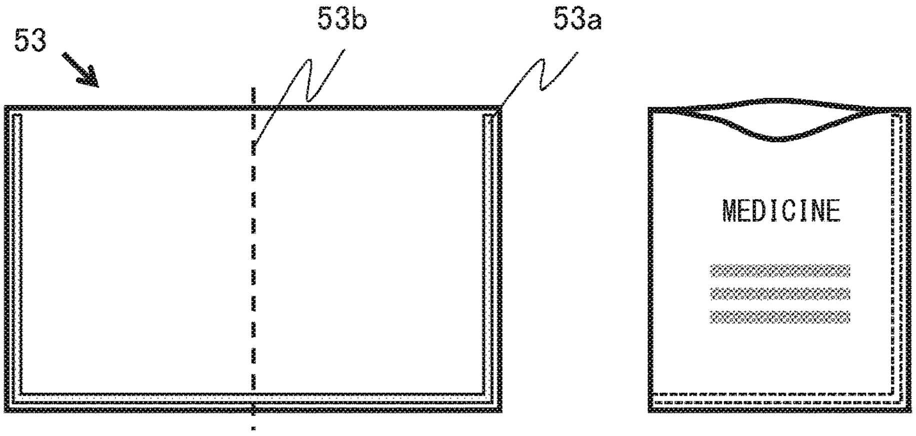

The bonding area of the sheet P being folded can be changed according to the application pattern of the powder adhesive Tn on the sheet P. FIGS. 28A to 28C illustrate examples of products, i.e., output objects of the image forming apparatus, in which application patterns of the powder adhesive Tn are varied. FIGS. 28A and 28B are examples of a product, that is, a semi-bonded product, the purpose of use of which is to be opened or peeled off by a receiver. In the case of a semi-bonded postcard 51 (i.e., peel-and-reveal type postcard) of FIG. 28A, the powder adhesive Tn is applied to a whole surface 51*a* of one side of a base sheet, and the sheet is folded at a center folding line 51*b* and bonded. In the case of a salary payment statement 52 illustrated in FIG. 28B, the powder adhesive Tn is applied to a whole outer circumference 52*a* of one side of the base sheet, and the sheet is folded at a center folding line 52*b* and bonded. FIG. 28C illustrates a paper pouch, i.e., medicine envelope, 53 which is an example of a product, that is, completely bonded product, the purpose of use of which is not intended to be opened by the user. In this case, the powder adhesive Tn is applied to a rectangular-shaped area 53*a* with one side opened so that three edges including the folding line 53*b* of the sheet in the folded state are bonded.

As described, according to the image forming apparatus 1 of the present embodiment, a product that has been bonded by the bonding treatment can be made from a base sheet such as normal white paper that is not a preprinted sheet. The bonding area of the folded sheet P can be varied according to the application pattern of the powder adhesive Tn on the sheet P. For example, a semi-bonded product assuming use as an envelope for sealing a document or a salary payment statement that is intended to be peeled later can be created. Further, the image to be recorded using printing toner by the image forming apparatus 1 can include a format (unchanged portion) when using a preprinted sheet and a variable part such as personal information. Further, a preprinted sheet can be used as a recording medium and the image forming apparatus 1 according to the present embodiment can be used for the purpose of performing printing of the variable part and the bonding treatment.

Conditions of First Heating Process and Second Heating Process

Now, setting of conditions of a fixing process, i.e., first fixing process or first heating step, in which the sheet P is heated by the first fixing unit 6 and a bonding process, i.e., second fixing process or second heating step, in which the sheet P is heated by the second fixing unit 32 will be described.

In order to output the completely bonded product 54 such as the paper pouch illustrated in FIG. 7B, it is sufficient for the bonding portion bonded by powder adhesive to merely have a strength not less than a tear strength of the sheet P being the base sheet to satisfy the purpose of use as a paper pouch. In other words, the bonding portion preferably has an adhesive strength, or mechanical strength, that prevents the sheet surfaces from being peeled off from one another when external force is applied in a direction to remove the sheet surfaces that have been bonded in the product 54 from each other, and the strength of the paper sheet P is exceeded first such that the paper is torn. This adhesive strength is generally higher than the strength obtained by fixing a normal printing toner to the sheet P by a fixing process during normal printing.

At first, the difference in heating efficiency between the fixing process and the bonding process will be explained. In the fixing process, the powder adhesive Tn is heated highly efficiently since the fixing film 6*a* serving as the heating member is directly in contact with the layer of powder adhesive Tn on the sheet P and supplies heat thereto, as illustrated in FIG. 9. Meanwhile, in the bonding process, the heating film 32*b* serving as the heating member contacts an outer surface of the sheet P and supplies heat thereto in a state where the sheet P is in a folded state so that the layer of powder adhesive Tn is arranged on the inner side, as illustrated in FIG. 10. In other words, the layer of powder adhesive Tn is heated by the heat transmitted through the sheet P from the heating film 32*b*, so that the heating efficiency of the powder adhesive Tn is low compared to the fixing process.

Therefore, if it is assumed that the powder adhesive Tn is to reach the exact same maximum temperature in both the fixing process and the bonding process, it is necessary to apply a greater heat quantity to the sheet P in the bonding process than the fixing process. In other words, it is considered necessary to set the controlled temperature of the heating film 32*b* to a high value so that a greater heat quantity is supplied to the sheet P in a short time.

Especially, in the case of an image forming apparatus having a high productivity, that is, a high sheet conveyance speed, the sheet P will pass through the bonding nip 32N in a short time. In order to have the powder adhesive Tn reach the exact same maximum temperature in such fixing process and bonding process, it is assumed that the heat supplied during the bonding process must be extremely greater, such as twice or more times greater, than the heat supplied during the fixing process. That is, it is assumed that the controlled temperature of the heating film 32*b* is set extremely high so that a large amount of heat is conducted to the sheet P in a short time.

However, if the controlled temperature of the heating film 32*b* is set high, hot offset may occur during the bonding process, as described later. In addition, high controlled temperature of the heating film 32*b* may lead to drawbacks such as increased power consumption and generation of heat of the image forming apparatus 1.

Therefore, the present embodiment proposes conditions of the fixing process and the bonding process for achieving a firm bond by the powder adhesive while suppressing the heat quantity supplied to the sheet during the bonding treatment as small as possible. In the following description, the heat quantity supplied per unit area of the sheet P during the fixing process is referred to as "supplied heat Q1 during fixing process" and the heat quantity supplied per unit area of the sheet P during the bonding process is referred to as "supplied heat Q2 during bonding process". In other words, Q1 is a Joule heat supplied from the fixing film 6*a* per unit area of the sheet P from when the sheet P reaches the fixing nip 6N to when the sheet passes through the fixing nip 6N. Q2 is a Joule heat supplied from the heating film 32*b* per unit area of the sheet P, that is, unit area of an outer surface of the sheet in the folded state, from when the sheet P reaches the bonding nip 32N to when the sheet passes through the bonding nip 32N.

In the present embodiment, the heat supplied during the fixing process is set higher than a minimum value, and the heat supplied during the bonding process is suppressed as small as possible.

(a) As a specific condition, preferably, a ratio of the supplied heat Q2 during the bonding process to the supplied heat Q1 during the fixing process is between 1.0 and 2.2 ($1.0 \leq Q2/Q1 \leq 2.2$).

(b) More preferably, the ratio of the supplied heat Q2 during the bonding process to the supplied heat Q1 during the fixing process is between 1.3 and 1.9 ($1.3 \leq Q2/Q1 \leq 1.9$).

A highest temperature (Tmax1) of the powder adhesive Tn during the fixing process is set to a temperature range that exceeds a melting point of the powder adhesive Tn so that a melt viscosity approaches a fluid state. Meanwhile, a highest temperature (Tmax2) of the powder adhesive during the bonding process is set to a value close to a glass transition temperature Tg (softening point) that is lower than the melting point of the powder adhesive Tn. By adopting such heat distribution, a firm bond strength can be obtained even when the supplied heat during the bonding process is suppressed as small as possible, as described in detail later. The details of the calculation method will be described in detail below.

In the present embodiment, sheet conveyance speeds of the first fixing unit 6 and the second fixing unit 32 are set to a same value, and specifically, they are set to 210 mm/sec. An example of outputting a product formed by printing and bonding a sheet P folded in two using a sheet P formed of an A4-size (210 mm width×297 mm conveyance-direction length) paper will now be illustrated. In this case, the area of the sheet P is 62370 $mm^2$ and the time required for the sheet P to pass through the fixing nip 6N of the first fixing unit 6 is approximately 1.41 sec. In the bonding process, the sheet P is folded in two and reduced to half the size (210 mm width×148.5 mm length), wherein the area is 31185 $mm^2$ and the time required for the sheet P to pass through the bonding nip 32N of the second fixing unit 32 is approximately 0.71 sec (Table 1).

TABLE 1

| | FIRST EMBODIMENT | |
|---|---|---|
| | FIXING PROCESS | BONDING PROCESS |
| SHEET CONVEYANCE SPEED [mm/sec] | 210 | 210 |
| SHEET WIDTH [mm] | 210 | 210 |
| SHEET LENGTH [mm] | 297 | 148.5 |
| SHEET AREA [$mm^2$] | 62370 | 31185 |
| TIME REQUIRED TO PASS THROUGH NIP [sec] | 1.41 | 0.71 |

The temperature control conditions and electric power during the fixing process and the bonding process according to the above conditions will be illustrated in Table 2 below. Measurement of electric power was performed by connecting a wattmeter (Digital Power Meter WTn310, a product of Yokogawa Test & Measurement Corporation) in series with the heater 6*a*1 or the heater 32*b*1 of the first fixing unit 6 or the second fixing unit 32 and acquiring an average value of power consumption during passing of sheets. In the evaluation result of adhesive property, "Good" shows that when external force was applied in a direction to peel off the bonding surfaces of the product, the strength of the sheet P as paper reached its limit first and is torn before the bonding surfaces were peeled off from each other.

The highest temperatures Tmax1 and Tmax2 of the powder adhesive Tn were measured in the following manner. At first, a thermocouple having a small thermal capacity of a temperature detection portion (such as a K-type thermocouple wire having a diameter of 50 μm or smaller, a product of Anritsu Meter Co., Ltd.) was prepared. When measuring the highest temperature Tmax1 of the powder adhesive Tn in the fixing process, the thermocouple was adhered to the surface of the sheet P and the sheet P was passed through the fixing nip 6N for measurement. Further, when measuring the highest temperature Tmax2 of the powder adhesive Tn in the bonding process, the thermocouple was adhered to the sheet P after the fixing process and before being folded by the folding unit 31, and the thermocouple was sandwiched in the inner side of the folded sheet P passed through the bonding nip 32N for measurement. A potential difference signal output from the thermocouple was measured by a Memory HiCorder, a product of Hioki E.E. Corporation, and the highest temperatures among the time variation of temperature was specified and set as Tmax1 and Tmax2.

TABLE 2

| | | FIRST EMBODIMENT |
|---|---|---|
| FIXING PROCESS | CONTROLLED TEMPERATURE [° C.] | 170 |
| | POWER [W] | 415 |
| | TIME REQUIRED TO PASS THROUGH NIP [sec] | 1.41 |
| | HEAT QUANTITY RECEIVED BY SHEET [J] | 586.9 |
| | SHEET AREA (A4 SIZE) [$mm^2$] | 62370 |
| | SUPPLIED HEAT QUANTITY PER UNIT AREA Q1 [$J/mm^2$] | 0.0094 |
| | MAXIMUM REACHED TEMPERATURE OF POWDER | 120 |

TABLE 2-continued

| | | FIRST EMBODIMENT |
|---|---|---|
| BONDING PROCESS | ADHESIVE Tmax1 [° C.] | |
| | CONTROLLED TEMPERATURE [° C.] | 220 |
| | POWER [W] | 617 |
| | TIME REQUIRED TO PASS THROUGH NIP [sec] | 0.71 |
| | HEAT QUANTITY RECEIVED BY SHEET [J] | 436.3 |
| | SHEET AREA (A4 SIZE FOLDED IN TWO) [$mm^2$] | 31185 |
| | SUPPLIED HEAT QUANTITY PER UNIT AREA Q2 [$J/mm^2$] | 0.0140 |
| | MAXIMUM REACHED TEMPERATURE OF POWDER ADHESIVE Tmax2 [° C.] | 80 |
| | Q2/Q1 | 1.49 |
| EVALUATION RESULT OF BONDING PROPERTY | | GOOD |

The controlled temperature during the fixing process, that is, target temperature of the heater **6*a*1, was 170° C., and power consumption during passing of sheet was 415 W on average. The time required for the sheet P to pass through the fixing nip 6N is approximately 1.41 sec, so that the applied heat quantity can be calculated by 415 (W)×1.41 (sec) =586.9 (J). Since the sheet area is 62370 $mm^2$, the heat quantity applied per unit area (Q1**) is 586.9/62370 ($J/mm^2$), that is, approximately 0.009 ($J/mm^2$). The highest temperature Tmax1 of the powder adhesive Tn according to these conditions was 120° C.

The controlled temperature during the bonding process, that is, target temperature of the heater **32*b*1, was 220° C., and power consumption during passing of the sheet was 617 W on average. The time required for the sheet P to pass through the bonding nip 32N is approximately 0.71 sec, so that the applied heat quantity can be calculated by 617 (W)×0.71 (sec)=436.3 (J). Since the sheet area is 31185 $mm^2$, the heat quantity applied per unit area (Q2**) is 436.3/31185 ($J/mm^2$), that is, approximately 0.014 ($J/mm^2$). The highest temperature Tmax2 of the powder adhesive Tn according to these conditions was 80° C.

The results are shown in Table 2. The relationship between the highest temperatures Tmax1 and Tmax2 of the powder adhesive Tn preferably satisfies Tmax1>Tmax2. Further, Tmax2 is preferably set to be higher than the glass transition temperature Tg, which according to the present embodiment is 52° C., due to reasons described later.

Now, the state of a bonding portion formed by the fixing process and the bonding process according to the present embodiment will be described. An ideal bond refers to a state where smooth surfaces are in close contact with each other and bonded members are sufficiently contiguous so that they are mutually within the influence range of intermolecular forces, according to which direct binding force in molecular levels is created. In this state, if the bonded members have similar bonding structures, a stronger binding force is obtained. Generally, it is known that an extremely high bond strength is achieved by polishing the surfaces of a solid body made of the same type of material such as metal and placing the surfaces in close contact with each other.

Figure 11A:
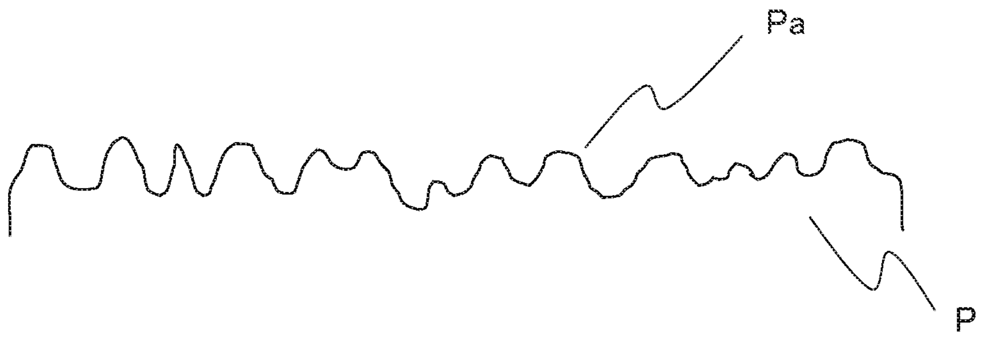
FIGS. 11A and 11B are conceptual diagrams of a mechanism for bonding a sheet.

FIG. 11A is a cross-sectional view showing an enlarged view of an area near the surface of the paper used as the sheet P. Paper is a light and strong medium in which cellulose fibers are entangled, so that when observed using a microscope, there are countless height unevenness Pa in the order of a few μm to a few dozen μm caused by the cellulose fibers. Therefore, the condition of the surface of the paper is generally not suitable as members to be bonded.

Figure 11B:
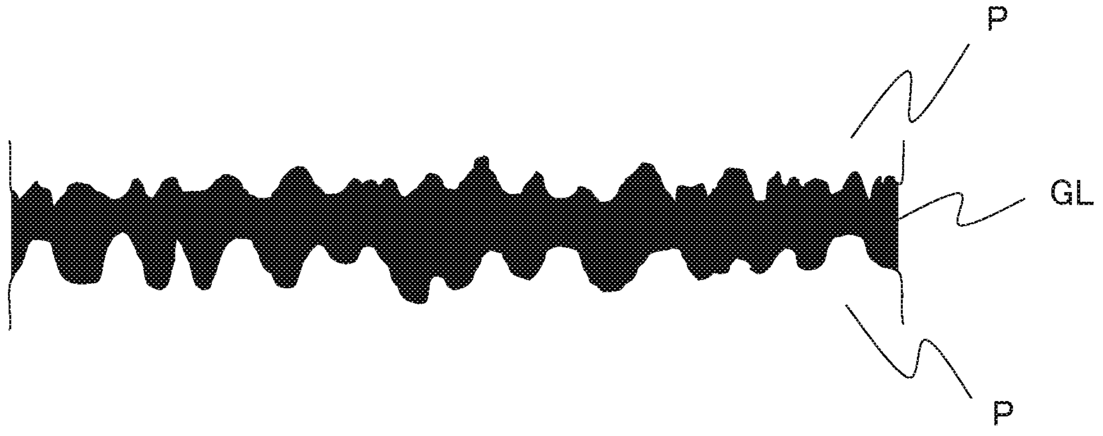

Incidentally, liquid glue is an example that enables to realize a practical adhesive strength for paper. As illustrated in FIG. 11B, liquid glue GL has good wettability for cellulose, and can fill the gap formed by surface unevenness Pa of opposed paper surfaces. If moisture is evaporated in this state to dry and harden the liquid glue GL, intermolecular forces act between the cellulose and the solidified liquid glue GL and an overall mechanical bond, i.e., anchor effect, via the solidified body is achieved to realize a firm bond.

As described above, according to the present embodiment, bonding of the sheet P is performed using the powder adhesive Tn. By performing the processes described hereafter, an adhesive strength close to a firm bond realized by liquid glue GL is achieved.

Fixing Process

Figure 12A:
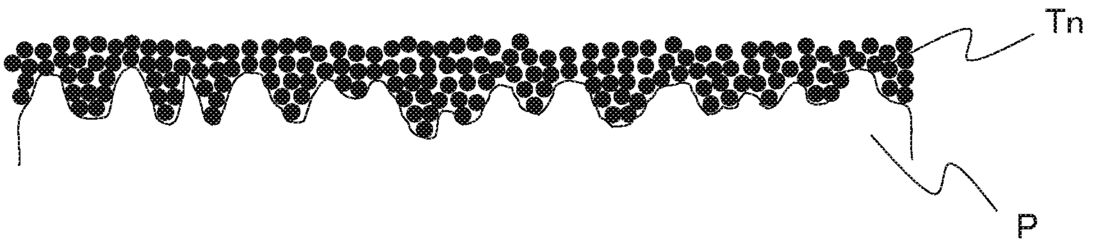
FIGS. 12A to 12C are conceptual diagrams of steps for melting powder adhesive by the first fixing unit.
Figure 12B:
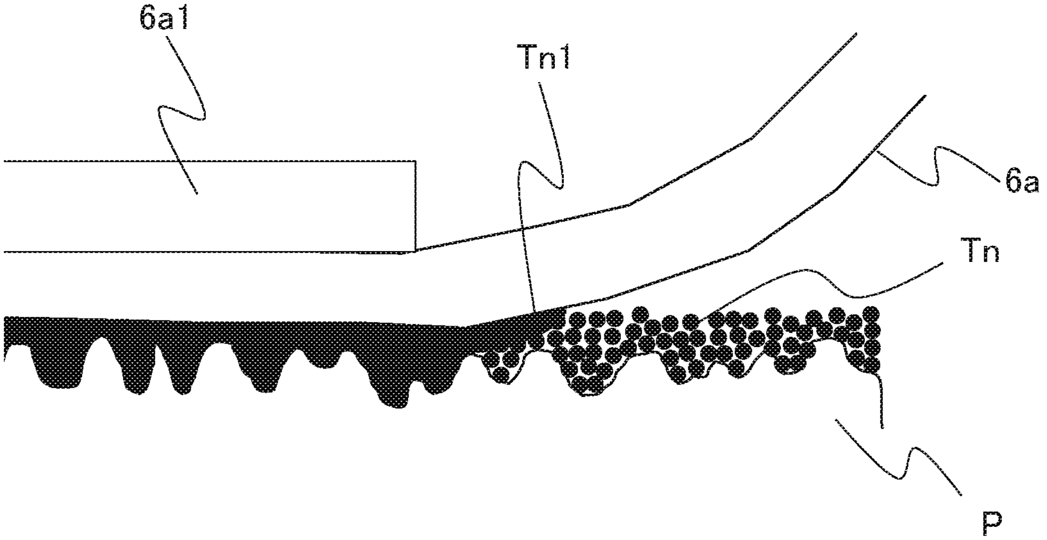

At first, as illustrated in FIG. 12A, the image forming unit **1*e* transfers the powder adhesive Tn on the paper used as the sheet P and applies the powder adhesive Tn according to a predetermined pattern. Next, as illustrated in FIG. 12B, the heat from the heater 6*a*1 is applied to the powder adhesive Tn via the fixing film 6*a* at the fixing nip 6N of the first fixing unit 6. As a result, the temperature of the powder adhesive Tn rises to 120° C., which is a temperature (Tmax1) greater than the highest temperature (Tmax2) during the bonding process described later. Thereby, the powder adhesive Tn melts and liquefies, so that a layer of adhesive Tn1** entering the unevenness of the paper, that is, wetting the surface of the paper, is formed. The highest temperature Tmax1 during the fixing process is preferably 40 degrees or more higher than the glass transition temperature (Tg) of the powder adhesive Tn, and more preferably, 50 degrees or more higher than Tg.

Figure 12C:
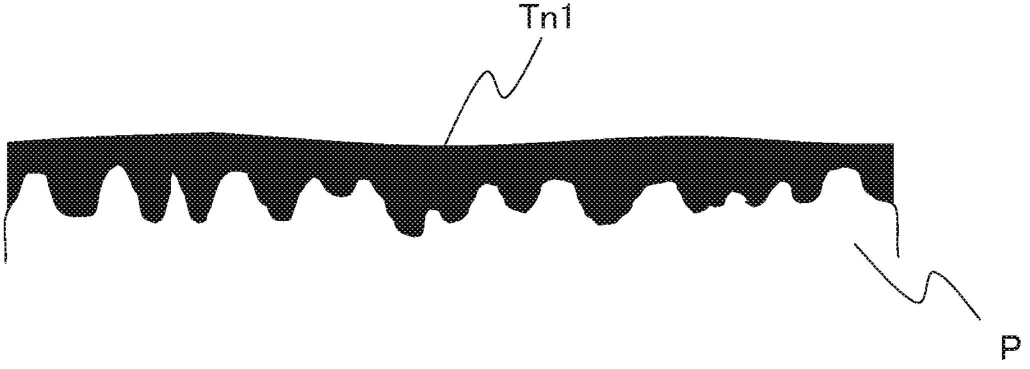

After passing through the fixing nip 6N, an adhesive Tn1 is solidified in a state filling the unevenness on the surface, as illustrated in FIG. 12C, and intermolecular forces, i.e., Van der Waals forces, act since there is sufficient contact area between the cellulose and the adhesive Tn1. Simultaneously, the adhesive Tn1 is entangled with the fibers of the sheet, by which a mechanical binding force, i.e., anchor effect, is also generated between the adhesive Tn1 and the paper. Further, the surface of the adhesive Tn1 is smoothed by the fixing film **6*a*, so that it is smoothed to a surface roughness of a same level as the surface of the fixing film 6*a***, which according to the present embodiment is the surface of the release layer formed of fluororesin.

If the heat quantity supplied to the powder adhesive Tn during the fixing process is not sufficient, the adhesive Tn1 will not sufficiently fill the unevenness of the paper, in other words, will not wet the paper sufficiently, and the surface of the adhesive Tn1 is not sufficiently smoothed. Meanwhile, if too much heat quantity is applied to the powder adhesive Tn during the fixing process, the viscosity of the melted powder adhesive Tn drops excessively and the adhesive penetrates to the inner side of the paper, such that the amount of adhesive retained on the surface of the paper is insufficient and the surface of the adhesive Tn1 is not smoothed.

As described, by supplying a somewhat higher electric power than the normal fixing process, the viscosity of the melted powder adhesive is lowered moderately and a smooth surface nature can be obtained.

Bonding Process

Figure 13A:
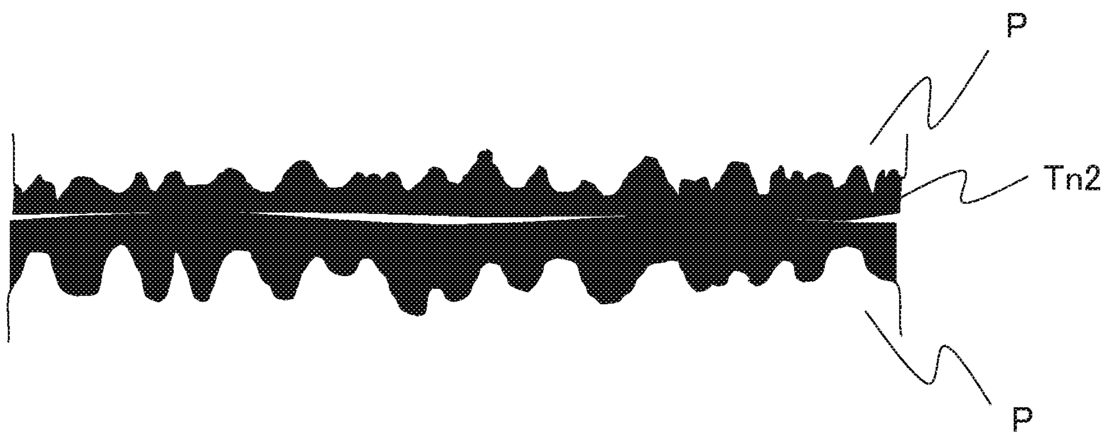
FIGS. 13A and 13B are conceptual diagrams of steps for bonding the powder adhesive by a second fixing unit.

As illustrated in FIG. 13A, at a point of time when the sheet P reaches the second fixing unit 32, the sheet P is folded so that the surfaces of the sheet P to which adhesive Tn2 is applied, i.e., image surface, are opposed to each other. At this point of time, the surface of the adhesive Tn2 is smooth but the respective surfaces of the adhesive Tn2 are not in close contact with each other and there is a gap formed therebetween, so that they are not in a bonded state.

From this state, the sheet P is pressed and heated at the bonding nip 32N of the second fixing unit 32, and the temperature of the adhesive Tn2 is raised to 80° C., for example. The highest temperature Tmax2 during the bonding process is preferably 10 degrees or more higher than the glass transition temperature (Tg) of the powder adhesive Tn, and more preferably 20 degrees or more higher than Tg. However, the highest temperature Tmax2 during the bonding process is lower than the highest temperature Tmax1 during the fixing process.

Figure 13B:
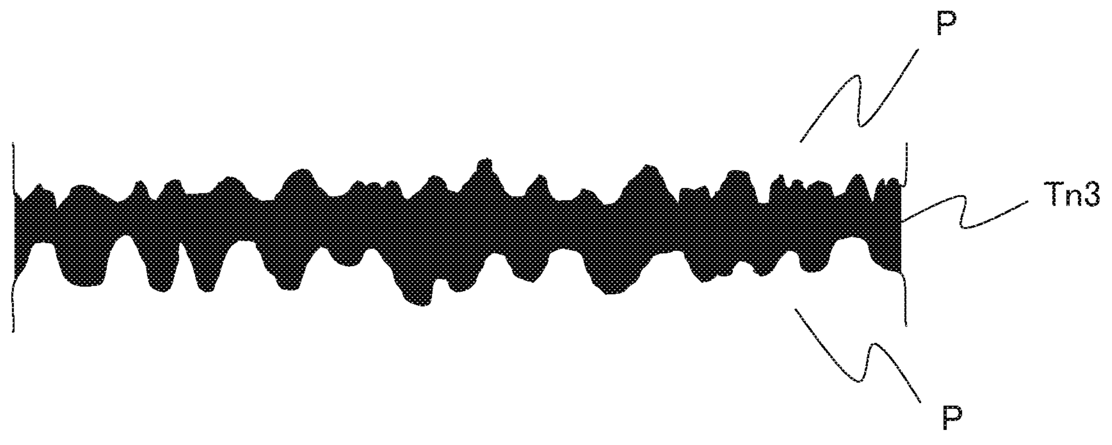

The sheet is heated at the bonding nip 32N, and layers of softened adhesive Tn3 are in close contact with each other, as illustrated in FIG. 13B. In this state, the bonded members of the same material are sufficiently contiguous and direct binding force is created in the molecular level, so that the sheets P on the upper and lower sides in the drawing are firmly bonded via the adhesive Tn3.

COMPARATIVE EXAMPLE

Table 3 shows a result of comparative experiment in which the supplied heat Q1 during the fixing process is varied, that is, the power supplied to the heater 6*a*1 of the first fixing unit 6 is varied, and the result having evaluated the adhesive property of the printed-and-bonded product obtained. As a method for evaluating the adhesive property, force was applied to the bonding surface of the paper pouch in a direction to peel off the bonded surfaces by hand. As a result, the surfaces not being bonded at all was evaluated as poor, the surfaces being bonded but was peeled off at the bonding surface was evaluated as fair, and paper torn without the bonding surfaces being peeled off was evaluated as good. Comparative examples 3 and 4 have achieved good results, but as for comparative examples 2 and 5, the bonding surfaces were peeled off before the paper gave way (fair). According to comparative examples 1 and 6, the papers were not bonded (poor).

TABLE 3

| | FIRST EMBOD. | COMPAR. EXAMPLE 1 | COMPAR. EXAMPLE 2 | COMPAR. EXAMPLE 3 | COMPAR. EXAMPLE 4 | COMPAR. EXAMPLE 5 | COMPAR. EXAMPLE 6 |
|---|---|---|---|---|---|---|---|
| SUPPLIED HEAT DURING FIXING PROCESS Q1 [J/mm$^2$] | 0.0094 | 0.0155 | 0.0140 | 0.0108 | 0.0074 | 0.0064 | 0.0058 |
| SUPPLIED HEAT DURING BONDING PROCESS Q2 [J/mm$^2$] | 0.0140 | 0.0140 | 0.0140 | 0.0140 | 0.0140 | 0.0140 | 0.0140 |
| Q2/Q1 | 1.49 | 0.9 | 1.0 | 1.3 | 1.9 | 2.2 | 2.4 |
| EVALUATION RESULT OF BONDING PROPERTY | GOOD | POOR | FAIR | GOOD | GOOD | FAIR | POOR |

Figure 14A:
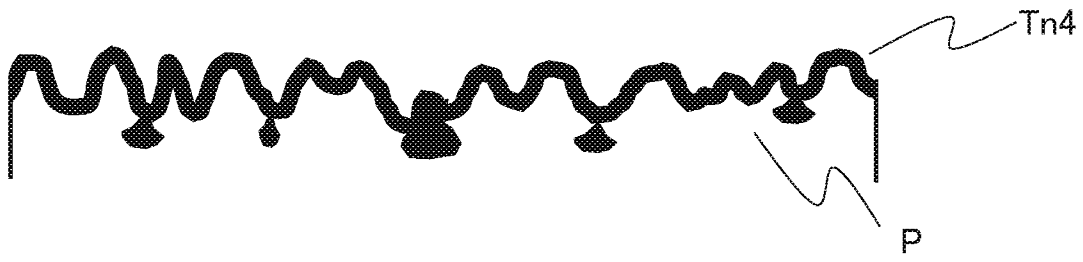
FIGS. 14A and 14B are conceptual diagrams illustrating a state of the powder adhesive in a case where a ratio of heat supplied during a bonding process and heat supplied during a fixing process is less than 1.0.
Figure 14B:
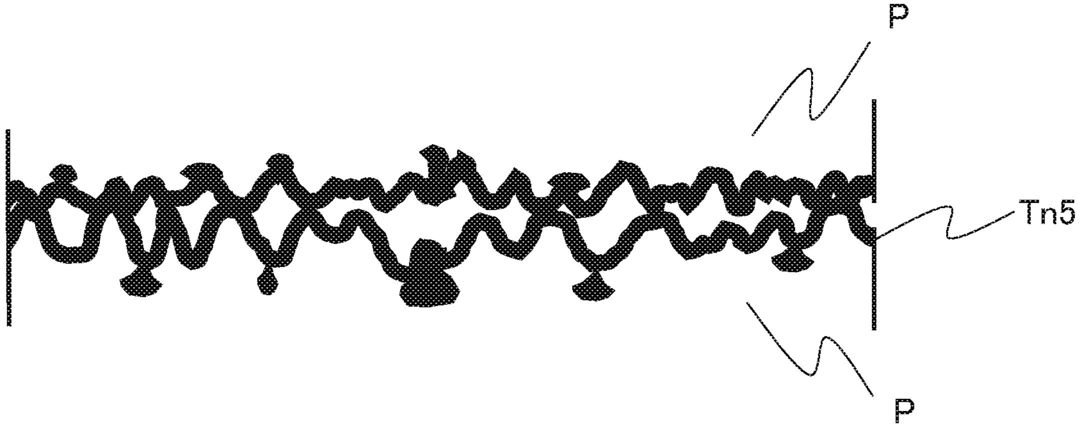

A comparative example 1 where a ratio Q2/Q1 of supplied heat Q2 during the bonding process to supplied heat Q1 during the fixing process is lower than 1.0 will be explained. In this case, as illustrated in FIG. 14A, the supplied heat Q1 during the fixing process is excessive, so that an adhesive Tn4 is excessively melted and penetrates to the inner side of the cellulose fibers, so that in the state after passing through the first fixing unit 6, unevenness on the surface of the paper itself appears on the surface of the adhesive Tn4. Even if the bonding process is performed in this state, there is only a small contact area between adhesives Tn5, as illustrated in FIG. 14B, and sufficient adhesive strength cannot be achieved.

Figure 15A:
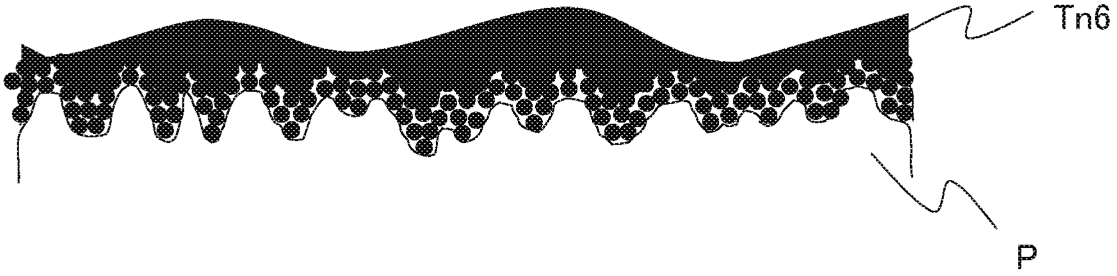
FIGS. 15A to 15C are conceptual diagrams illustrating a state of the powder adhesive in a case where a ratio of heat supplied during the bonding process and heat supplied during the fixing process is 2.2 or higher.
Figure 15B:
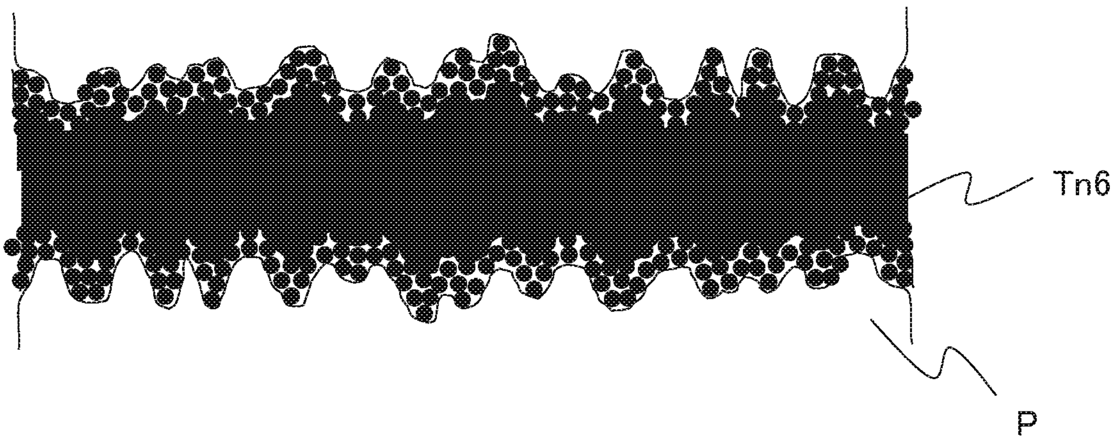
Figure 15C:
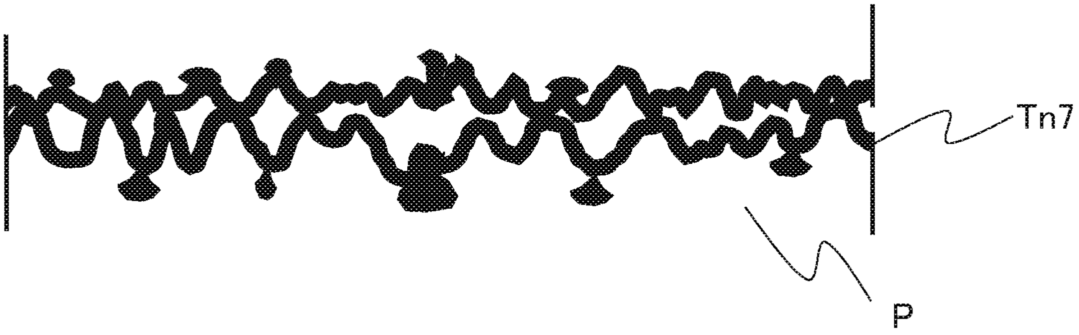

Next, we will illustrate a comparative example 6 where the ratio Q2/Q1 of the supplied heat Q2 during the bonding process to the supplied heat Q1 during the fixing process is higher than 2.2. In this case, as illustrated in FIG. 15A, since the supplied heat Q1 during the fixing process is too little, an adhesive Tn6 is in a state where the surface has unevenness as illustrated in the drawing since the adhesive is not sufficiently melted, and the adhesive Tn6 is also not sufficiently melted at the interface with paper. Even if the bonding process is performed in this state, there is not enough contact area between the cellulose and the adhesive Tn6, so that no intermolecular attractive force, i.e., Van der Waals force, can be obtained, and no mechanical bond, i.e., anchor effect, can be obtained. Therefore, if the bonding process is performed by the supplied heat quantity Q2 of 0.0140 J/mm$^2$ which is the same as the first embodiment, even if the surfaces of the adhesive Tn6 layers are bonded as illustrated in FIG. 15B, the bond between the adhesive Tn6 and the paper is weak, so that the bonding of paper via the adhesive Tn6 is insufficient. Further, even if the adhesive Tn6 is heated to the melting point or higher from this state, adhesive Tn7 will penetrate through the cellulose fibers as illustrated in FIG. 15C, and the adhesive strength will not be enhanced. Therefore, it is recognized that the balance between the supplied heat quantities Q1 and Q2 during the fixing and bonding processes is important.

As described, according to the present embodiment, the highest temperature Tmax2 of the powder adhesive Tn during the bonding process is set lower than the highest temperature Tmax1 of the powder adhesive Tn during the fixing process. Thereby, the state of the powder adhesive Tn is changed appropriately during the fixing process and the bonding process without setting the heating temperature during the bonding process excessively high, and the sheet P can be bonded firmly via the powder adhesive Tn.

Second Embodiment

According to the present embodiment, a method for reducing the occurrence of image defects related to the image formed using printing toner at the same time as enhancing the adhesive strength of the powder adhesive Tn will be described. Hereafter, it is assumed that elements denoted with the same reference numbers as the first embodiment have approximately the same configurations and effects as the first embodiment, so that only the parts that differ from the first embodiment will mainly be described.

As described above, the image forming apparatus 1 is capable of applying powder adhesive Tn according to a predetermined application pattern in parallel with the operation of recording an image on one or both sides of the sheet P using printing toner, so that a product having been subjected to folding and bonding treatments, i.e., printed-and-bonded product, can be output. Therefore, a product bonded by the bonding treatment and to which printed information is applied can be output using a base sheet such as normal white paper that is not a preprinted sheet.

Figures 16A, 16B, 16C:
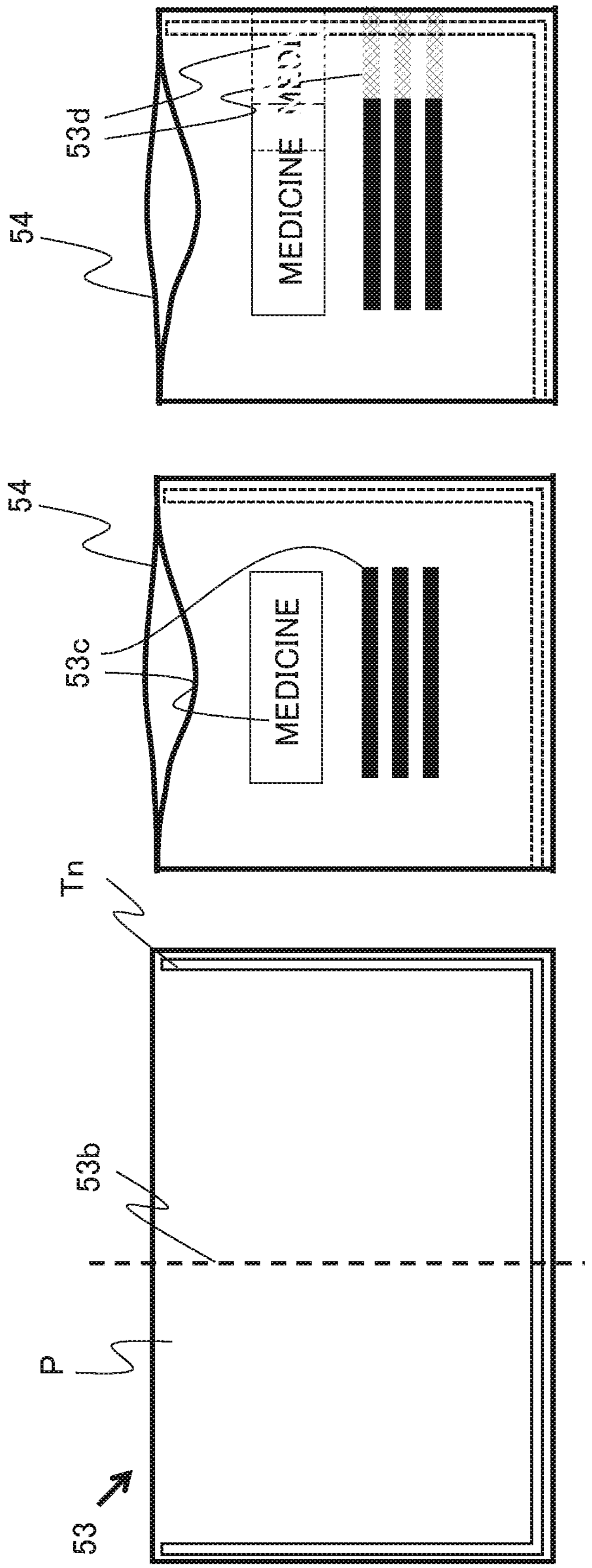
FIGS. 16A to 16C are views illustrating examples of a product and image defects thereof output from an image forming apparatus according to a second embodiment.

FIG. 16A illustrates an example of an application pattern of the powder adhesive Tn, and FIG. 16B illustrates a paper pouch used as a medicine envelope which is one example of the printed-and-bonded product 54. The product 54 is formed by applying the powder adhesive Tn to the area illustrated in FIG. 16A, folding the sheet in two at the folding line 53*b*, and subjecting the sheet to bonding treatment to form a pouch-shaped product. Further, an image 53*c* recorded using printing toner is formed on the surface of the product 54. When such product is output, one surface of the sheet P used as the base sheet is arranged on an outer side of the product and the other surface of the sheet P is arranged on an inner side of the product. Therefore, as an image forming operation of a first surface in duplex printing, the image 53*c* on the outer side surface is formed by printing toner, and thereafter, the powder adhesive Tn is applied by a predetermined application pattern as an image forming operation of a second surface.

In this state, according to conditions such as temperature and power applied during the bonding process, image defects 53*d* called hot offsets may occur, as illustrated in FIG. 16C. Hot offsets may occur by the following causes.

Figure 17:
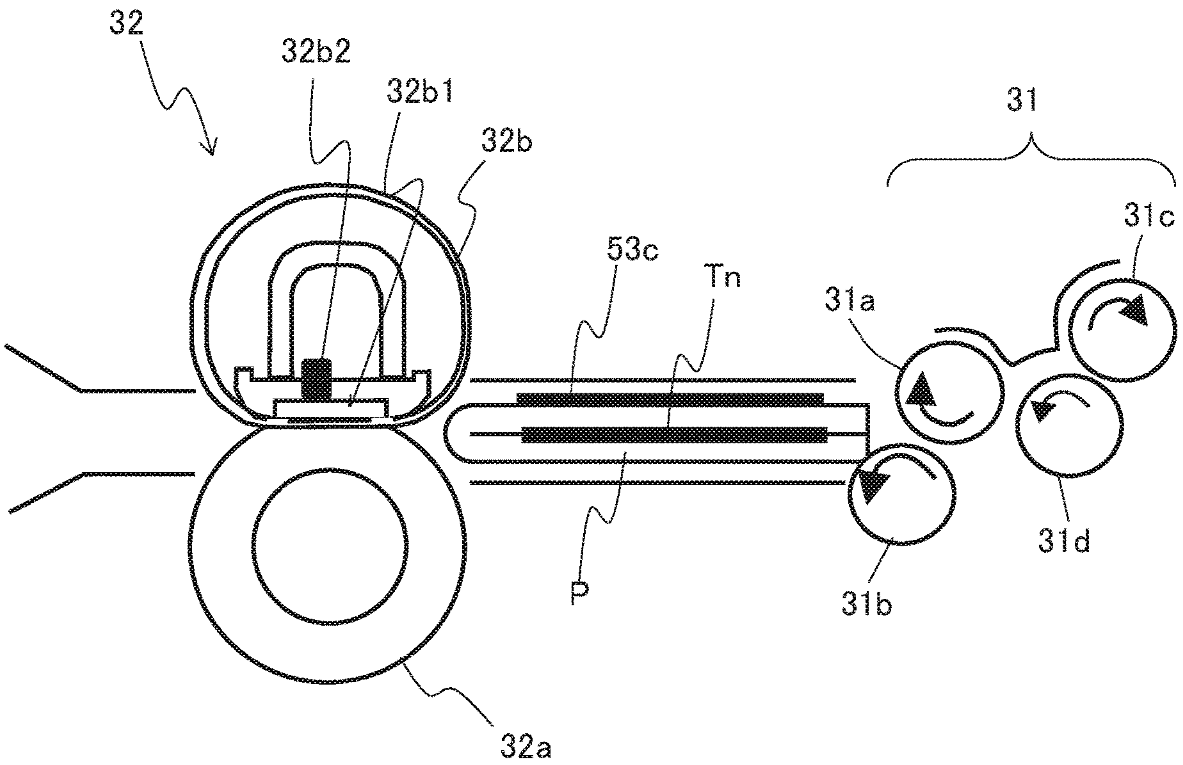
FIG. 17 is a conceptual diagram illustrating a cause of image defects.

As illustrated in FIG. 17, the powder adhesive Tn is applied on the inner side of the sheet P being folded. If the power supply during the bonding process is increased to melt the powder adhesive Tn, the temperature of the heating film 32*b* is increased. If the temperature of the heating film 32*b* becomes excessively high, the image 53*c* on the outer side of the sheet P in direct contact with the heating film 32*b* is melted excessively into a fluid state and attaches to the heating film 32*b* as soiling. The attached soiling will be reattached to the sheet P when the heating film 32*b* rotates once and is actualized as image defects 53*d* illustrated in FIG. 16C. In order to suppress the occurrence of such hot offsets, it is necessary to supply necessary heat quantity required for the powder adhesive Tn while preventing the temperature of the heating film 32*b* from becoming excessively high.

In the present embodiment, the sheet conveyance speed of the second fixing unit 32 is set to a low value, so as to enable the required heat quantity to be supplied to the powder adhesive Tn while the temperature of the heating film 32*b* being set to a low value. That is, if the sheet conveyance speed at the first fixing unit 6 is set to V1 and the sheet conveyance speed at the second fixing unit 32 is set to V2, a relationship of V1>V2 is satisfied.

Specifically, a sheet conveyance speed V1 of the first fixing unit 6 is 210 mm/sec, which is the same as the first embodiment, and a sheet conveyance speed V2 of the second fixing unit 32 is set to 104.5 mm/sec which is slower than 210 mm/sec. In this state, the temperature setting of the heater 32*b*1 is adjusted so that the heat quantity received by the sheet P during the bonding process is substantially the same as the first embodiment. Table 4 also shows a comparative example 1 where the sheet conveyance speed V2 of the second fixing unit 32 is set to 157.5 mm/sec and a comparative example 2 set to 70 mm/sec. A result of the adhesive property evaluated as "good" refers to a state where the bonding surface is not peeled off and the strength of the sheet P which is paper is exceeded first so that the paper is torn when external force is applied to the bonding surface of the product in the direction to peel off the bonding surface.

The evaluations of adhesive property of the second embodiment and comparative examples 1 and 2 in which the sheet conveyance speed V2 and the heater temperature are controlled as described above are all good. It is recognized that by performing appropriate control of the supplied heat quantity Q2 per unit area of the sheet P during the fixing process and the bonding process, the state of the powder adhesive Tn can be changed appropriately during the fixing process and the bonding process to realize a firm bond, as illustrated in the first embodiment.

TABLE 4

| BONDING CONDITIONS | FIRST EMBODIMENT | COMPARATIVE EXAMPLE 1 | SECOND EMBODIMENT | COMPARATIVE EXAMPLE 2 |
|---|---|---|---|---|
| SHEET LENGTH [mm] | 148.5 | 148.5 | 148.5 | 148.5 |
| SUPPLIED HEAT QUANTITY PER UNIT AREA Q2 [J/mm$^2$] | 0.0140 | 0.0140 | 0.0140 | 0.0140 |
| EVALUATION RESULT OF BONDING PROPERTY | GOOD | GOOD | GOOD | GOOD |
| SHEET CONVEYANCE SPEED [mm/sec] | 210.0 | 157.5 | 105.0 | 70.0 |
| TIME REQUIRED TO PASS NIP PORTION [sec] | 0.7071 | 0.9429 | 1.4143 | 2.1214 |
| HEATER TEMPERATURE [° C.] | 220 | 200 | 170 | 160 |
| FILM TEMPERATURE [° C.] | 200 | 182 | 155 | 148 |
| EVALUATION RESULT OF HOT OFFSET | OCCURRED | SOMEWHAT OCCURRED | NONE | NONE |

Based on Table 4, it can be recognized that the temperature of the heater 32*b*1 and the heating film 32*b* tends to be lowered as the sheet conveyance speed V2 of the second fixing unit 32 becomes slower. This is because as the sheet conveyance speed V2 becomes slower, the time required for the sheet to pass through the bonding nip 32N becomes longer, so that the temperature of the heater 32*b*1 and the heating film 32*b* required to supply the same heat quantity Q2 (0.0140 J/mm$^2$) to the sheet P becomes lower. In other words, since the sheet conveyance speed V2 during the bonding process is set slower than the sheet conveyance speed V1 during the fixing process, the heating temperature of the heater 32*b*1 and the heating film 32*b* can be suppressed to a low value while maintaining a good adhesive property. As a result, excessive melting of printing toner will not occur easily during the bonding process, and therefore, hot offsets will not occur easily.

As illustrated in Table 4, hot offsets do not occur easily according to the second embodiment and comparative examples 1 and 2 where the temperature of the heater **32*b*1 and the heating film 32*b*** is set lower than the first embodiment. Especially according to the second embodiment and the comparative example 2, no hot offsets occurred. The conditions of the second embodiment are more advantageous than the conditions of the comparative example 2 since a higher productivity can be realized without causing hot offset.

The sheet conveyance speed during the fixing process and the bonding process can be selected arbitrary by determining the overall printing speed of the image forming apparatus or the method for folding the sheet P. For example, in a case where the sheet conveyance speed of the fixing process is 210 mm/sec and a printed-and-bonded product having folded the sheet P in two before performing the bonding process is to be output, the sheet conveyance speed during the bonding process can be reduced to half the speed, or 105 mm/sec, without deteriorating the overall productivity. In other words, it is preferable to set the sheet conveyance speeds V1 and V2 during the fixing and bonding processes to satisfy $0.5 \le V2/V1 \le 0.75$, for example.

As described, according to the present embodiment, the sheet conveyance speed of the bonding process is set relatively slower than the sheet conveyance speed of the fixing process to suppress the heating temperature during the bonding process to be as low as possible while ensuring a sufficient adhesive strength, to thereby reduce the possibility of occurrence of hot offsets.

Third Embodiment

In order to perform the fixing process and the bonding process by a single image forming apparatus as described in the first and second embodiments, a heating apparatus for fixing an image and a heating apparatus for bonding the sheet are used in combination. Known heating elements of the heating apparatus include a heating resistor, a halogen lamp and an induction heating mechanism, which are all elements requiring high power consumption within the image forming apparatus, so that there are demands to reduce power consumption. Further, if the temperature of the heating member such as a heating roller during the bonding process is too high, image defects called hot offsets may occur in which the printed image having been fixed is melted again and are adhered to the sheet.

Therefore, in the third embodiment, a configuration of an image forming apparatus is illustrated which is suitable for acquiring sufficient adhesive strength while reducing the heat quantity supplied to the sheet during the bonding process. Hereafter, it is assumed that elements denoted with the same reference numbers as the first embodiment have the same configurations and effects as the first embodiment, so that only the portions that differ from the first embodiment will mainly be described.

Figure 18:
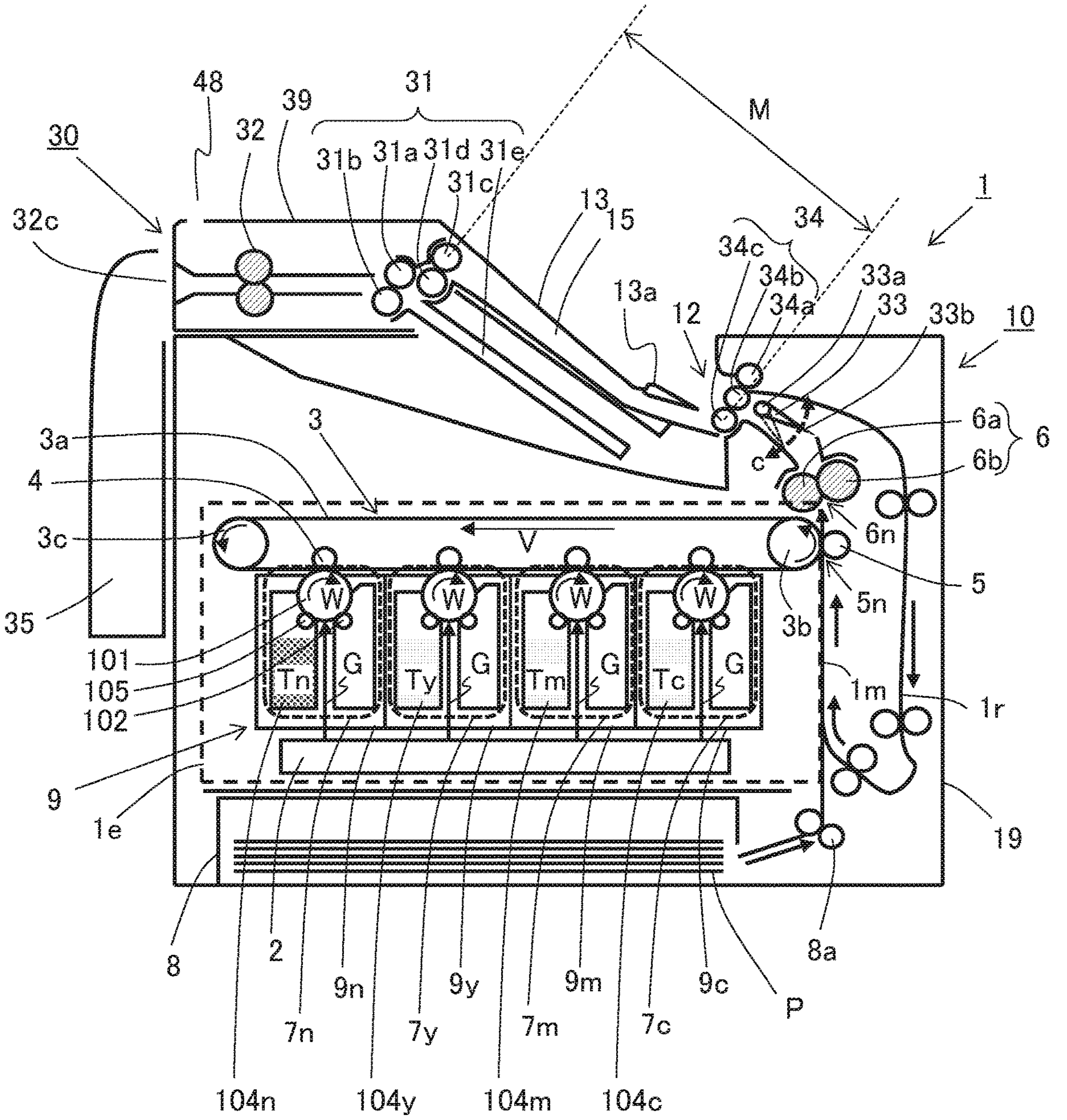
FIG. 18 is a schematic drawing of an image forming apparatus according to a third embodiment.

FIG. 18 is a schematic drawing illustrating a cross-sectional configuration of the image forming apparatus 1 according to the third embodiment including the apparatus body 10 and the postprocessing unit 30 arranged on the upper portion of the apparatus body 10. Similar to the first embodiment, in the viewpoint of FIG. 18, that is, when viewed in a main scanning direction for forming an image, an occupation range in the horizontal direction of the main body portion excluding the second sheet discharge tray 35 of the postprocessing unit 30 preferably falls within an occupation range of the apparatus body 10. By designing the postprocessing unit 30 to fit within the space above the apparatus body 10, the image forming apparatus 1 having a printing-and-bonding function can have a shorter sheet conveyance route, or second route described later for performing print-and-bond, compared to an arrangement where the apparatus body 10 and the postprocessing unit 30 are arranged side by side. Thereby, the sheet P having passed the first fixing unit 6 and discharged from the apparatus body 10 can be introduced to the postprocessing unit 30 immediately, so that the folding process and the bonding process can be started before much of the heat of the sheet P heated by the fixing process escapes. As described later, energy consumption of the bonding process can be reduced by keeping the heat supplied to the sheet P during the fixing process as much as possible.

Figure 19:
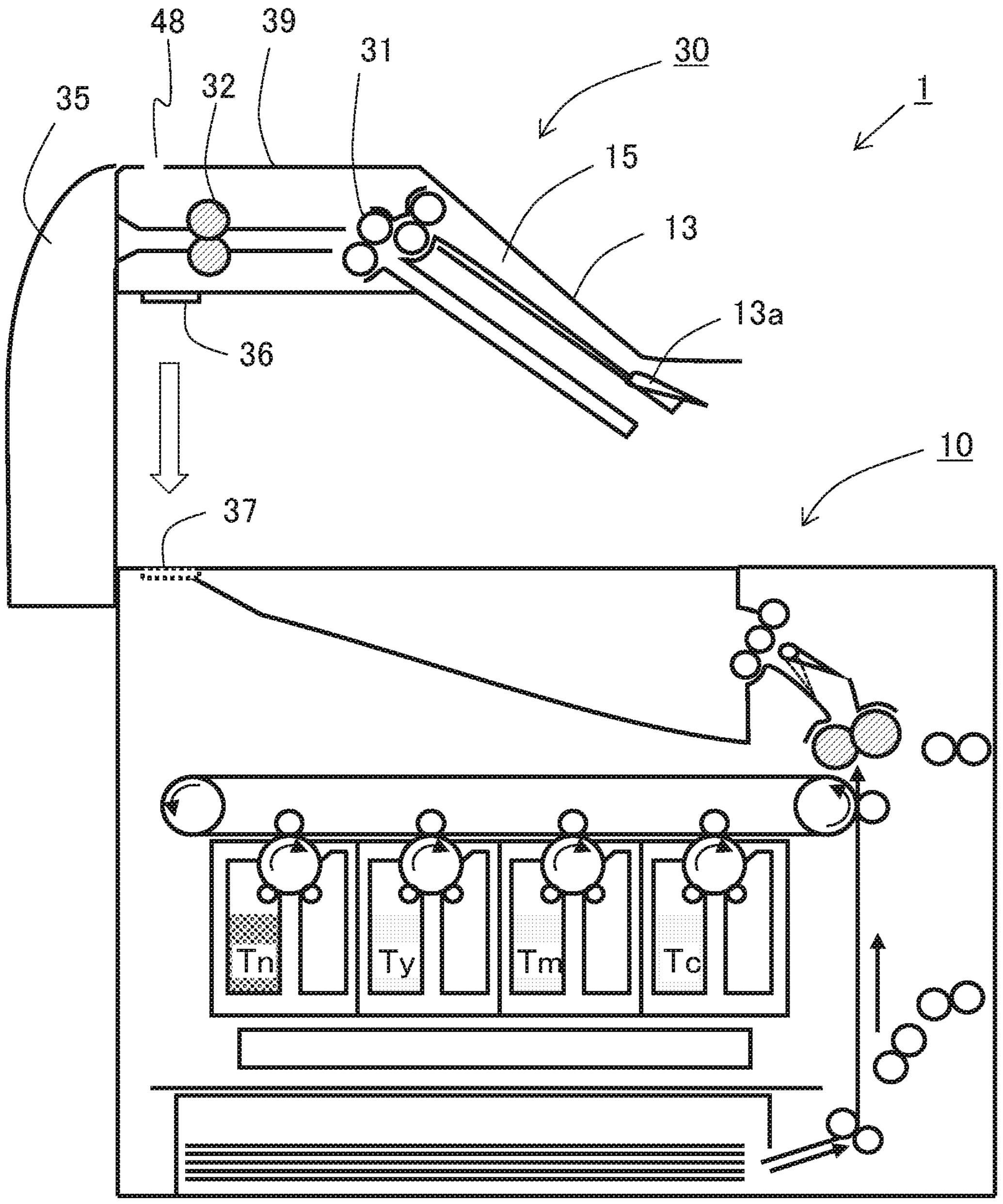
FIG. 19 is a view illustrating an attachment of a postprocessing unit to an apparatus body of the image forming apparatus according to the third embodiment.
Figure 20:
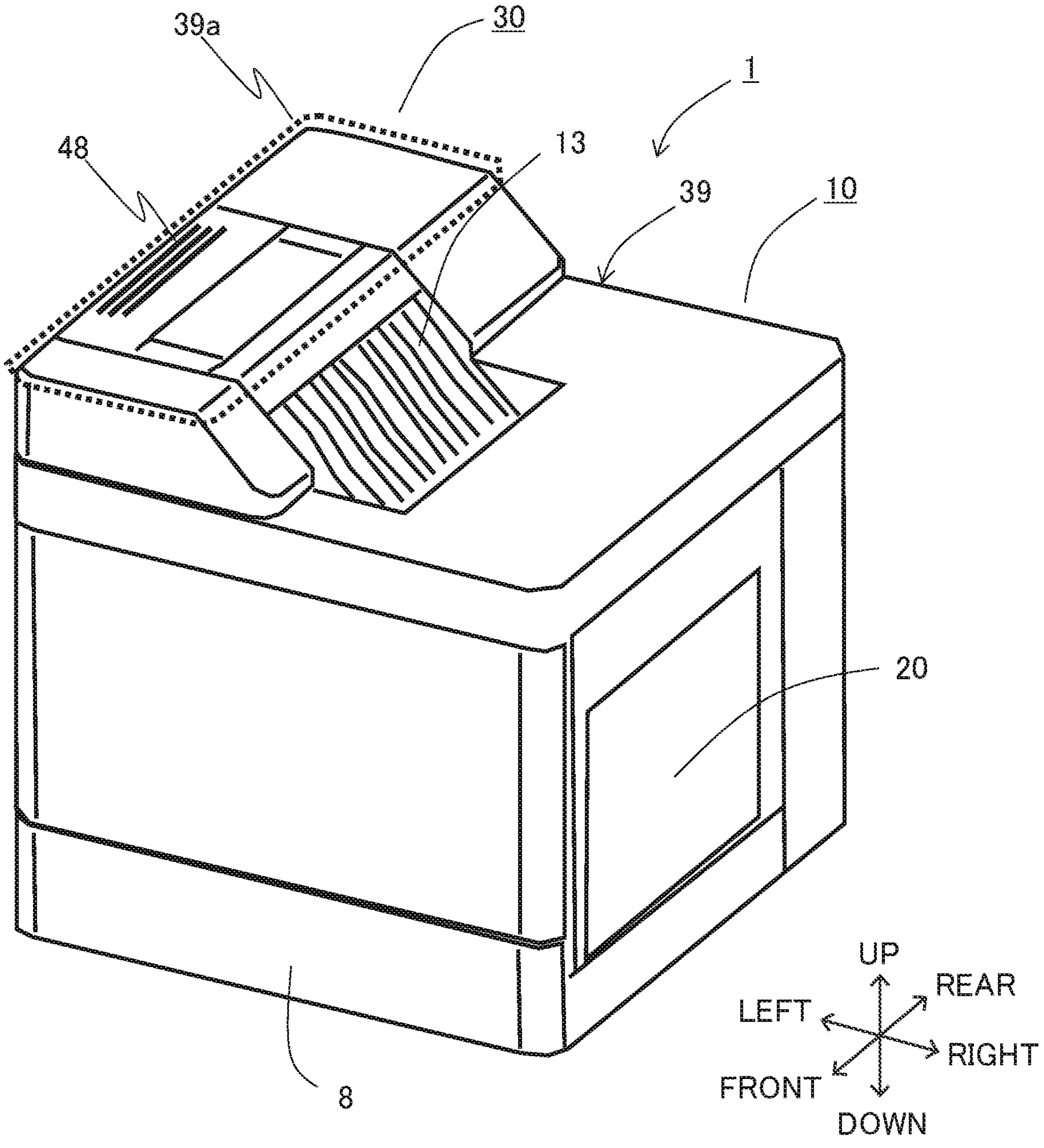
FIG. 20 is a perspective view illustrating an appearance of an image forming apparatus according to the third embodiment.

An opening portion 48 is provided in the postprocessing unit 30 according to the present embodiment, as illustrated in FIGS. 18, 19 and 20. Three slits having a size of 4 mm×150 mm are provided on the casing of the postprocessing unit 30 to communicate an inner space of the image forming apparatus 1 with an outer space above the image forming apparatus 1 as the opening portion 48 on a top panel portion, which is a region **39*a* denoted by dotted lines, that covers an upper portion of the second fixing unit 32 serving as a heat source. An area of the region 39*a* viewed in a gravity direction is 460 mm×160 mm. An opening ratio of the opening portion 48 with respect to the top panel portion of the cover member, that is, ratio of a total opening area of the slits to the area of the region 39*a*, is approximately 2.4%. The opening ratio of the opening portion 48 is preferably approximately 0.1% to 5%. The opening portion 48 is designed so that an amount of discharge of air near the fixing unit is small compared to the fixing unit used for heat-fixing the normal image in the image forming apparatus, so that warm air tends to accumulate in the area below the region 39*a***. The reasons will be described hereafter.

It is known that moisture is evaporated from the sheet and vapor is generated around a normal fixing unit, so that a design that allows to discharge the air around the fixing unit is adopted to prevent dew condensation. However, according to the second fixing unit 32 of the present embodiment, moisture is released from the sheet after finishing the fixing process, so that normally, not much vapor will be generated after the bonding process, that is, second heating process, performed by the second fixing unit 32. Therefore, compared to the first fixing unit 6, the possibility of dew condensation at the second fixing unit 32 is low, and not much issue occurs by reducing the opening ratio of the top panel portion, or region **39*a***, of the cover member.

By lowering the opening ratio of the top panel portion of the cover member, the air warmed by the second fixing unit 32 can be accumulated in the postprocessing unit 30 and reused to heat the folding unit 31. As described later, the temperature of a roller member coming into contact with the sheet at the folding unit 31 being high is advantageous from the viewpoint of reducing energy consumption during the bonding process.

Printing Toner and Powder Adhesive

For printing toner Tm, Tc and Ty according to the present embodiment, similar toner as those described in the first embodiment can be used. Further, powder adhesive containing thermoplastic resin serving as binder resin can be used as the powder adhesive Tn according to the present embodiment. The powder adhesive Tn preferably further contains a crystalline material having compatibility with binder resin. A known crystalline resin such as crystalline polyester resin or crystalline vinyl resin or a known wax such as ester wax which is ester containing alcohol and acid or hydrocarbon wax such as paraffin wax can be used. The crystalline resin and wax can be used in combination. These crystalline materials function as plasticizer that provides plasticity to the powder adhesive Tn during heating. That is, the crystalline material that is dispersed in a crystalline state within the binder resin at normal temperature is melted instantaneously and dissolves with binder resin when the powder adhesive Tn is heated, so that it has an effect of facilitating deformation of the powder adhesive Tn.

Example of Preparation of Powder Adhesive

An example of a method for preparing the powder adhesive Tn will be described. The powder adhesive Tn according to the present example contains ester wax and hydrocarbon wax as crystalline materials having compatibility with binder resin (styrene-butyl acrylate copolymer and polyester resin).

At first, the following materials were prepared.

| | |
|---|---|
| Styrene | 75.0 parts |
| N-butyl acrylate | 25.0 parts |
| Polyester resin | 4.0 parts (amorphous polyester resin having a weight-average molecular weight (Mw) of 20,000, a glass transition temperature (Tg) of 75° C. and an acid value of 8.2 mgKOH/g) |
| Ethylene glycol distearate | 14.0 parts (ester wax obtained by esterifying ethylene glycol and stearic acid) |
| Hydrocarbon wax | 2.0 parts (HNP-9, product of Nippon Seiro Co., Ltd.) |
| Divinylbenzene | 0.5 parts |

Then, powder adhesive particles were prepared according to approximately the same procedure as the manufacturing example described in the first embodiment.

Image Forming Operation

Figure 21A:
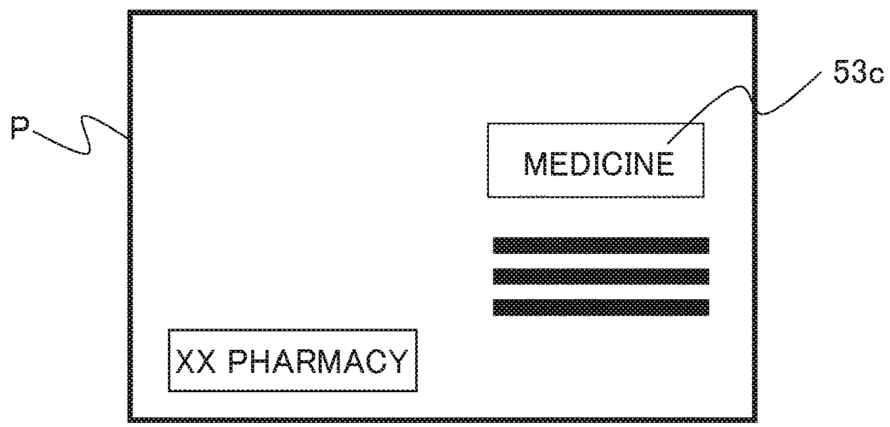
FIGS. 21A to 21C are views illustrating examples of a product output from the image forming apparatus according to the third embodiment.
Figure 21B:
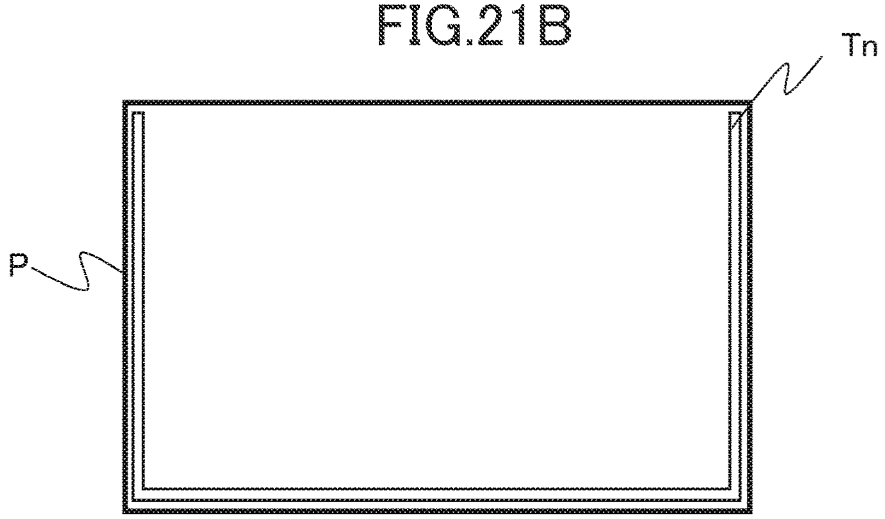
Figure 21C:
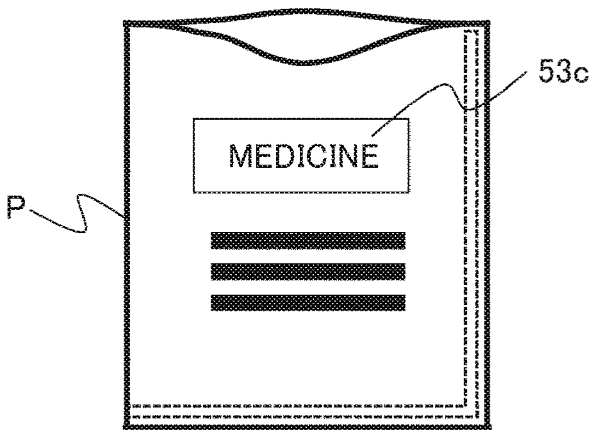

Next, an image forming operation performed by the image forming apparatus 1 according to the present embodiment will be described with reference to FIGS. 18 and 21A to 21C and to FIGS. 3, 4 and 5A to 5F of the first embodiment. FIGS. 21A to 21C are views illustrating a process for creating a paper pouch serving as a printed-and-bonded product from one sheet P by the image forming apparatus 1. FIG. 21A illustrates an image formed on a first side of the sheet P using printing toner, FIG. 21B illustrates an application pattern of powder adhesive to a second side of the sheet P, and FIG. 21C illustrates a paper pouch output as a product after the bonding process.

When data of an image to be printed and a command to execute printing is entered to the image forming apparatus 1, the control unit of the image forming apparatus 1 starts a sequence of operations, i.e., image forming operation, in which the sheet P is conveyed and an image is formed thereon, and if necessary, the sheet is subjected to postprocessing by the postprocessing unit 30. In the image forming operation, at first, as illustrated in FIG. 18, the sheet P is fed one at a time from the sheet cassette 8 and conveyed via the conveyance roller 8*a* to the transfer nip 5N.

The image forming apparatus 1 according to the present embodiment can form an image and/or applying powder adhesive to the sheets at a print speed of performing one-side printing to 40 sheets per minute while conveying the sheet at a speed, i.e., processing speed, of 210 mm/sec. When creating a paper pouch illustrated in FIG. 21C, image is formed or application of powder adhesive is performed to both the first and second sides of the sheet P, so that paper pouches can be created continuously at a pace of approximately 20 pouches per minute.

In parallel with the feeding of the sheet P, the processing cartridges 7*n*, 7*y*, 7*m* and 7*c* are sequentially driven, and the photosensitive drums 101 are driven to rotate at a surface speed of 210 mm/sec in the clockwise direction (arrow w) in the drawing. In this state, uniform charge is applied to the surface of each photosensitive drum 101 by the charge roller 102. Further, the scanner unit 2 emits laser light G being modulated based on image data to the photosensitive drums 101 of the respective processing cartridges 7*n*, 7*y*, 7*m* and 7*c*, and forms electrostatic latent images on the surface of the photosensitive drums 101. Specifically, the scanner unit 2 emits laser light G to the photosensitive drums 101 of the processing cartridges 7*y*, 7*m* and 7*c* to form electrostatic latent images at positions corresponding to the image 53*c* illustrated in FIG. 21A. Next, the electrostatic latent images on the photosensitive drums 101 are developed as toner image by printing toner borne on the developing rollers 105 of the processing cartridges 7*y*, 7*m* and 7*c*.

The transfer belt 3*a* rotates at a speed of 210 mm/sec to the counterclockwise direction (arrow v) in the drawing. The toner images formed by the respective processing cartridges 7*y*, 7*m* and 7*c* are primarily transferred from the photosensitive drums 101 to the transfer belt 3*a* by electric field formed between the photosensitive drums 101 and primary transfer rollers 4. Then, the toner image borne on the transfer belt 3*a* and having reached the transfer nip 5N is secondarily transferred to the sheet P conveyed along the main conveyance path 1*m* by electric filed formed between the secondary transfer roller 5 and the secondary transfer inner roller 3*b*.

Thereafter, the sheet P bearing an unfixed toner image is nipped and conveyed together with the fixing film 6*a* through the fixing nip 6N with the image surface side of the sheet P in close contact with an outer surface of the fixing film 6*a* at the fixing nip 6N. The speed of the first fixing unit 6 is controlled so that a surface speed of the pressure roller 6*b* is set to 210 mm/sec, and the sheet P is nipped and conveyed in synchronization with a transfer process. In the nipping and conveying process, the heat of the heater 6*a*1 is applied via the fixing film 6*a* to the image surface of the sheet P, by which the printing toner Ty, Tm and Tc and the powder adhesive Tn are melted and fixed on the sheet P. The sheet P having passed the fixing nip 6N is self-stripped from the fixing film 6*a* while maintaining the fixed toner image, and an image fixed to the sheet P is obtained.

The sheet P is nipped and conveyed by the switching guide 33 pivoted in the clockwise direction by the first sheet discharge roller 34*a* and the intermediate roller 34*b*. After the trailing edge of the sheet Pin the conveyance direction has passed through the switching guide 33, the switching guide 33 pivots in the counterclockwise direction and the intermediate roller 34*b* is reversed, so that the sheet P is conveyed in a reversed manner to the duplex conveyance path 1*r*. Then, in a state where the sheet P is passed through the main conveyance path 1*m* again with the front and back sides reversed, the powder adhesive Tn is applied to the second surface of the sheet P by an application pattern illustrated in FIG. 21B. The process of applying the powder adhesive Tn to the second surface of the sheet P is similar to the formation of the image 53*c* on the first surface except that the powder adhesive Tn is used as developer instead of the printing toner Ty, Tm and Tc.

It is preferable to apply the powder adhesive Tn to the second side than the first side during the duplex printing operation. If the powder adhesive Tn is applied to the first side, the powder adhesive Tn will be heated during the fixing process performed to the first side before being in contact with the pressure roller 6*b* arranged on the opposite side of the fixing film 6*a* in the fixing process performed to the second side, and the temperature will be reduced. In contrast, the powder adhesive Tn applied to the second side receives heat from the fixing film 6*a* in the fixing process of the second side and can enter the folding process while the temperature is relatively high.

Regardless of whether the operation is one-side printing or duplex printing, the sheet P discharged from the apparatus body 10 is nipped by the intermediate roller 34*b* and the second sheet discharge roller 34*c* as illustrated in FIGS. 3 and 4, similar to the first embodiment, and conveyed by the tray switching guide 13*a* to the first route R1 or the second route R2. The area from the tray switching guide 13*a* to the folding unit 31 in the sheet conveyance direction is configured to have no opening portion so as to keep heat of the sheet P from escaping to air.

The second guide roller 31*d* which is a rotary member in contact with the sheet comes into contact with the powder adhesive Tn on the sheet P, so that it is preferable to have the surface of the roller covered with a material having low thermal conductivity so as to take minimum heat away from the powder adhesive Tn and to have a moderate unevenness formed on the surface to reduce the contact area. An EPDM (Ethylene Propylene Diene Monomer) rubber layer is formed on the surface of the second guide roller 31*d*, and the surface roughness (ten-point average roughness Rzjis) is set to 10 μm or greater. The surface roughness of 10 μm or greater is preferable in order to obtain sufficient frictional force while minimizing contact with paper. The surface roughness (Rzjis) indicated here is a value measured using a surface roughness measuring instrument SE-3400 (product name) manufactured by Kosaka Laboratory Ltd. Ten-point average roughness Rzjis is an index of surface roughness provided in JIS B 0601:1994. The ten-point average roughness Rzjis refers to a sum of an average of heights of the five highest heights and an average of depths of the five deepest depths on a roughness curve of a reference length. The roughness curve is obtained by applying a high pass filter of a predetermined cutoff value to a profile curve by sampling a surface of a measurement target using a probe.

A thermal capacity of the second guide roller 31*d* is preferably set small so that the temperature rises speedily by a small heat quantity by adopting a hollow structure, that is, a structure in which a space is formed on the inner side in the radial direction of the outer circumference portion in contact with the sheet. In the present embodiment, a core metal of the second guide roller 31*d* is a pipe-like (i.e., tubular and cylindrical) hollow roller having a thickness of 1 mm.

The first guide roller 31*c*, the first folding roller 31*a* and the second folding roller 31*b* which are three rollers according to other examples of the rotary member in contact with the sheet adopt a similar configuration as the second guide roller 31*d* so as not to take away heat from the sheet.

A distance M (FIG. 18) from the second sheet discharge roller 34*c* to the first guide roller 31*c* in the sheet conveyance direction along the second route R2 is designed to be shorter than the total length L (FIG. 5A) in the conveyance direction of the sheet P prior to the folding process. Thereby, it can be omitted to provide an additional conveyance roller between the second sheet discharge roller 34*c* and the folding unit 31, preventing the heat of the sheet from being taken away by such conveyance roller.

The folding process performed by the folding unit 31 will be described with reference to FIGS. 5A to 5F. When executing the folding process, the first guide roller 31*c* and the first folding roller 31*a* rotate in the clockwise direction in the drawing, and the second guide roller 31*d* and the second folding roller 31*b* rotate in the counterclockwise direction in the drawing. When the sheet P is introduced, the rotational speed in surface speeds of respective rollers is 210 mm/sec. At first, a leading edge q of the sheet P sent out from the sheet discharge unit 34 is drawn into the guide roller pair 312, as illustrated in FIG. 5A. In this state, the powder adhesive Tn is applied on the lower side surface in the drawing of the sheet P, so that the powder adhesive Tn is only in contact with the guide roller 31*d*. As illustrated in FIG. 5B, the leading edge q of the sheet P is guided downward by the guide wall 31*f* and contacts the first folding roller 31*a*, is drawn into the first folding roller 31*a* and the second guide roller 31*d* arranged to face one another, and comes in contact with the wall 31*g* of the drawing portion 31*e*.

As the guide roller pair 312 draw in the sheet P, the leading edge q of the sheet P moves toward the depth of the drawing portion 31*e* while sliding against the wall 31*g*. Thereafter, the leading edge q is abutted against the end portion 31*h* of the drawing portion 31*e* as illustrated In FIG. 5C. The drawing portion 31*e* forms a space that is extended approximately in parallel with the intermediate path 15 at a lower side of the intermediate path 15, and in the state illustrated in FIG. 5C, the sheet P is wound around the second guide roller 31*d* and curved in a U shape.

In a state where the sheet P is further drawn in by the guide roller pair 312 from the state of FIG. 5C, a warp starts to be created at the middle part r, as illustrated in FIG. 5D. Then, in a state where the middle part r contacts the second folding roller 31*b* as illustrated in FIG. 5E, the sheet is drawn into the nip portion of the folding roller pair 311 by frictional force received from the second folding roller 31*b*. Then, as illustrated in FIG. 5F, the sheet P is discharged with the middle part r positioned at the leading end by the folding roller pair 311 in a folded state with the middle part r serving as the folding line.

In this example, a distance from a depth N (FIG. 5E) of the drawing portion 31*e*, that is, a distance from the nip portion of the folding roller pair 311 to the end portion 31*h* of the drawing portion 31*e* is set to half the length of the total length L of the sheet P. Thereby, the folding unit 31 can execute a process of folding the sheet P at half the length, i.e., center fold. The position of the folding line can be changed arbitrarily by changing the depth N of the drawing portion 31*e*.

When discharging the sheet P, immediately before the sheet P reaches the bonding nip 32N of the second fixing unit 32, the conveyance speed, i.e., surface speed, of the folding roller pair 311 is reduced to correspond to the conveyance speed of the second fixing unit 32. That is, the sheet conveyance speed of the folding unit 31 is reduced from the sheet conveyance speed V1 of the first fixing unit 6 to the sheet conveyance speed V2 of the second fixing unit 32 before the leading edge of the sheet P in the sheet conveyance direction reaches the second fixing unit 32. Specifically, the sheet conveyance speed V2 of the second fixing unit 32 is set to 105 mm/sec, so that the sheet conveyance speed of the folding roller pair 311 is reduced from 210 mm/sec to 105 mm/sec. The speed reduction timing is preferably as late as possible, so that the time difference (i.e., elapsed time) from the end of the fixing process to the start of the bonding process is made short. If the time difference is short, minimum heat stored in the sheet P is taken away and the bonding process is started while the temperature of the powder adhesive Tn is still high.

Figure 22A:
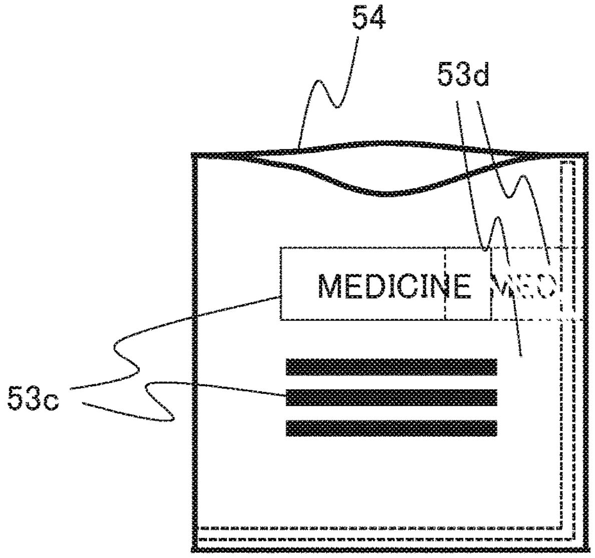
FIG. 22A is a view illustrating image defects caused during the bonding process.
Figure 22B:
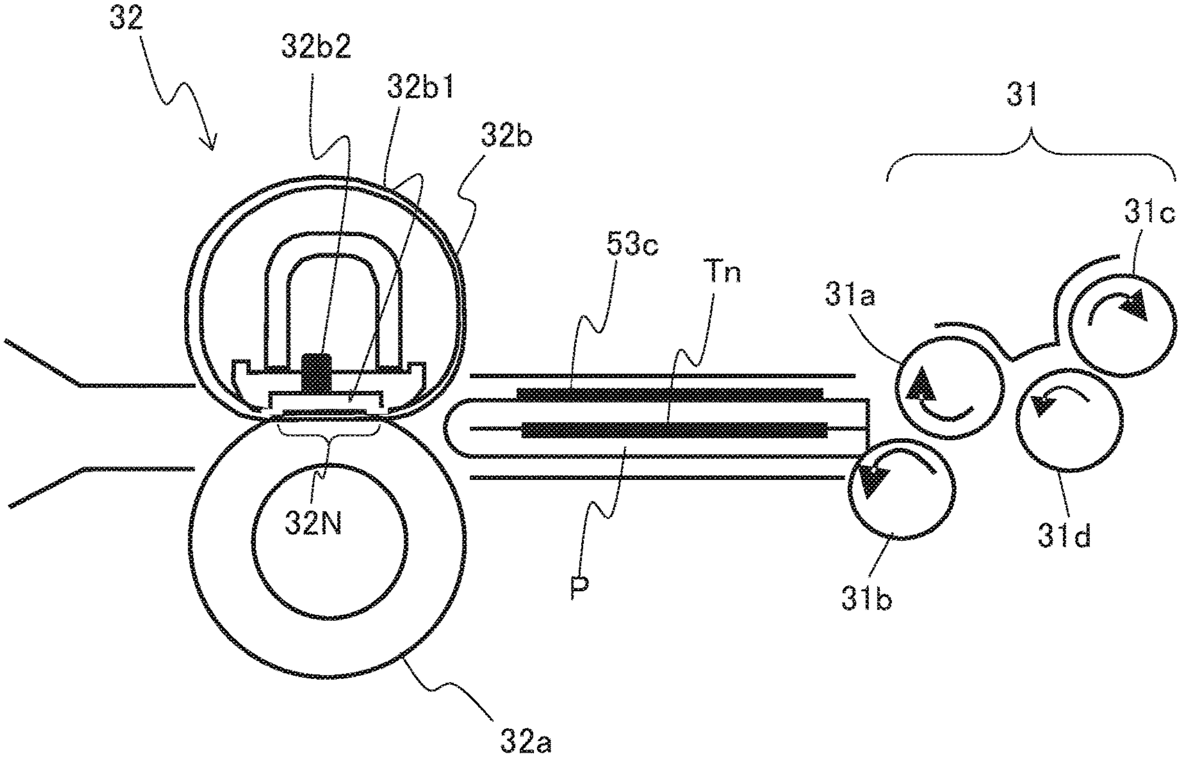
FIG. 22B is a schematic drawing of a second fixing unit according to the third embodiment.

The sheet P folded by the folding unit 31 is conveyed to the second fixing unit 32, where the sheet P receives a bonding treatment in which the sheet P is nipped and conveyed by the bonding nip 32 N while being heated and pressed. The pressure roller 32*a* of the second fixing unit 32 is driven to rotate so that the surface speed is set to 105 mm/sec. The sheet P is subjected to bonding treatment, i.e., second heat fixing performed to the image surface to which powder adhesive is applied, while being nipped and conveyed by the bonding nip 32N, by which the sheet is bonded in a folded state as illustrated in FIG. 22B. That is, the powder adhesive Tn on the sheet P is heated and then softened again while being pressed when the sheet P passes through the bonding nip 32N, by which the inner side surfaces of the sheet P are bound, i.e., bonded, via the powder adhesive Tn.

After receiving bonding treatment at the second fixing unit 32, as illustrated in FIG. 4, the sheet P is discharged to the left side in the drawing from the sheet discharge port 32*c*, i.e., second sheet discharge port, provided on the casing 39 of the postprocessing unit 30. Then, it is stored in the second sheet discharge tray 35 (refer to FIG. 18) provided on the left side of the apparatus body 10. As described, the image forming operation of a case where the sheet P is conveyed on the second route R2 is ended, and the paper pouch serving as a final product illustrated in FIG. 21C is obtained. The above description illustrates the series of image forming operations.

Hot Offset

Next, we will describe the issue that occurs when the fixing process, i.e., first fixing process or first heating process, and the bonding process, i.e., second fixing process or second heating process, are performed in one image forming apparatus 1. Image defects 53*d* that are also referred to as hot offsets as illustrated in FIG. 22A may occur, depending on the conditions of the bonding process such as temperature and power. When outputting the product 54, as illustrated in FIG. 22B, the powder adhesive Tn is applied on the inner side of the folded sheet P. In order to obtain a sufficient bond strength for the product 54 being output, it is necessary to set the power supply to the heater 32*b*1 (refer to FIG. 9) of the second fixing unit 32 during the bonding process, hereinafter simply referred to as “power supply during the bonding process”, so that the powder adhesive Tn being applied is sufficiently softened.

If the power supply during the bonding process is increased, the temperature of the heating film 32*b* is increased. However, if the temperature of the heating film 32*b* becomes excessively high, the image 53*c* of printing toner formed on the surface of the sheet P in direct contact with the heating film 32*b* is melted excessively into a fluid state. A part of the toner melted in a fluid state and having low viscosity may adhere to the heating film 32*b* as soiling from the surface of the sheet P. The adhered soiling may attach again to the sheet P when the heating film 32*b* rotates once and to be actualized as image defects 53*d* in FIG. 22A.

In order to prevent the occurrence of hot offsets while ensuring the adhesive strength of the product 54, it is desired to realize bonding via the powder adhesive Tn while preventing excessive rising of temperature of the heating film 32*b*. In other words, it is desired to suppress the heat supplied to the sheet P during the bonding process while mutually bonding the layers of powder adhesive Tn applied on the bonding surface of the sheet P.

Another reason for suppressing the heat supplied to the sheet P during the bonding process is to reduce power consumption. The first fixing unit 6 and the second fixing unit 32 are each a heat fixing-type heating apparatus, i.e., image heating apparatus, and they execute a process that consumes the most power among the electrophotographic processes. The image forming apparatus 1 according to the present embodiment includes two heating apparatuses for the fixing process and for the bonding process, so that it is desired to save as much power as possible. If power supply to the apparatus body 10 and the postprocessing unit 30 is realized through one plug, that is, a plug socket for a commercial power supply, there may be a limitation of suppressing the current flowing to the outlet to 15 A or smaller.

Temperature Change of Sheet Surface after Fixing Process

Figure 23A:
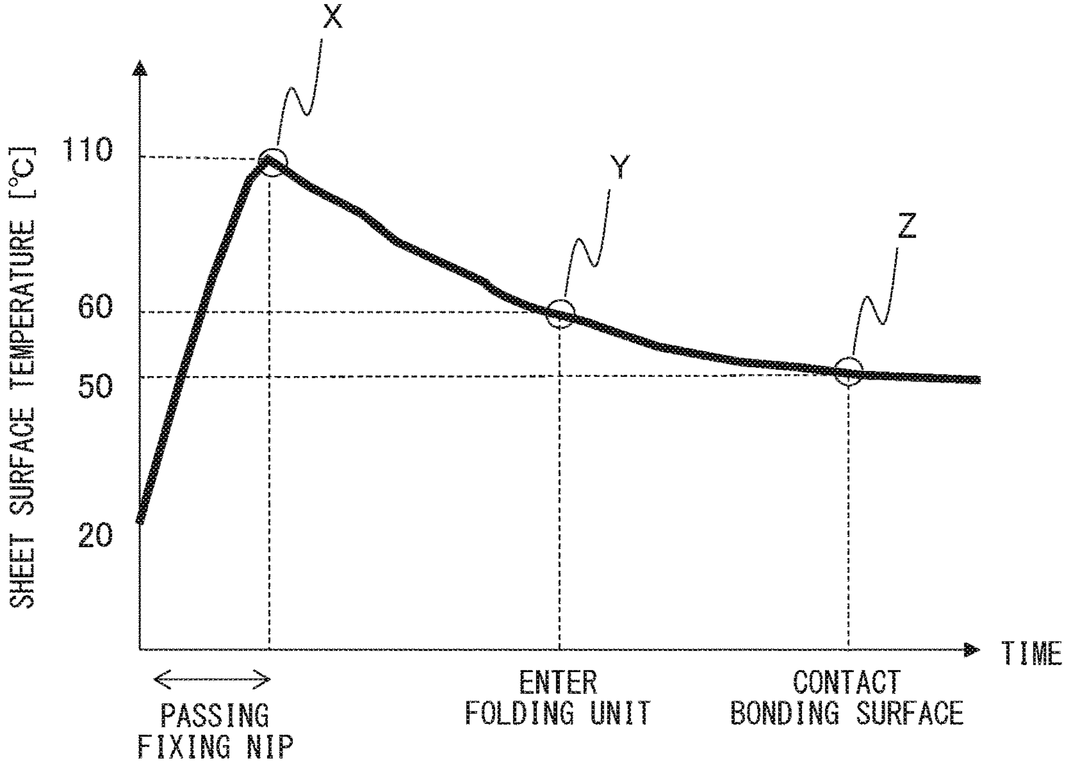
FIG. 23A is a view illustrating a time variation of temperature of the powder adhesive.

FIG. 23A illustrates a time variation of sheet surface temperature of the paper used as the sheet P from the time when the sheet is started to be fed to the first fixing unit 6 to the time when the folded surfaces of the sheet P come into contact with each other. Horizontal axis represents time and vertical axis represents temperature measurement results. Measurement was performed by attaching a thermocouple having a small thermal capacity of the temperature detection portion (such as a K-type thermocouple wire having a diameter of 50 μm or smaller, a product of Anritsu Meter Co., Ltd.) to the surface of the sheet P and passing the sheet P through the fixing nip 6N of the first fixing unit 6. A potential difference signal output from the thermocouple was measured by a Memory HiCorder, a product of Hioki E.E. Corporation, and the time variation of temperature was obtained.

As can be recognized based on the graph, the temperature keeps on rising while the measurement area on the sheet surface, that is, the portion where the thermocouple is adhered on the surface opposing the fixing film 6*a*, is passed through the fixing nip 6N, and the temperature reaches a peak temperature of approximately 110° C. (point X). Temperature starts to drop immediately after the measurement area exits the fixing nip 6N, and as illustrated in FIG. 5A, the temperature is lowered to approximately 60° C. when entering the folding unit 31 (point Y). Thereafter, by the time the sheet P is started to be folded (point Z) with the surface to which the thermocouple is adhered arranged on the inner side as illustrated in FIG. 5E, the temperature drops to 50° C.

According to the image forming apparatus 1 of the present embodiment, the temperature at the timing of point Z, that is, the temperature at the timing when the bonding surfaces to which the powder adhesive Tn are applied start to abut against one another is important. Specifically, by setting the surface temperature of the surface to which the powder adhesive Tn is applied at this point of time to be higher than a crystallization temperature of compatible wax added to the powder adhesive Tn, which according to the present embodiment is 45° C., a sufficient adhesive strength can be achieved even if the temperature of the bonding process is set low. The reasons will be described below.

Figure 23B:
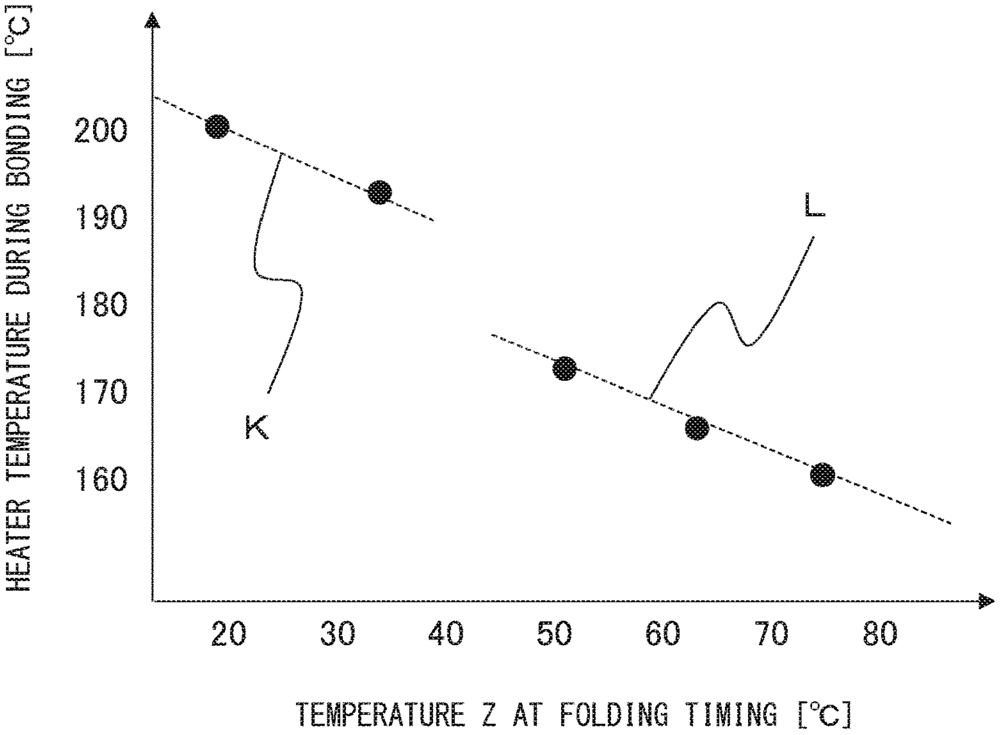
FIG. 23B is a view illustrating a relationship between heater temperature during bonding that is required to realize strong bonding.

The graph of FIG. 23B shows the relationship between temperature Z (° C.) of powder adhesive at a folding start timing (horizontal axis) and heater temperature (° C.) during bonding that is required to realize strong bonding (vertical axis). The “heater temperature during bonding that is required to realize strong bonding” was determined by repeatedly passing a sample sheet P through the image forming apparatus 1 while gradually raising the heater temperature setting of the second fixing unit 32 to output printed-and-bonded products and evaluating the adhesive property by peeling the obtained products by hand. As an evaluation criteria, the level of a “state where the sheet strength reaches its limit before the bonding surfaces are peeled off when external force is applied to the bonding surfaces in a direction to peel of the bonding surfaces" is determined as OK. A minimum temperature of the heater temperature of the second fixing unit 32 having achieved the adhesive property evaluated as OK is defined as "heater temperature during bonding that is required to realize strong bonding".

The evaluation of adhesive property of products being output via the folding process and the bonding process was repeatedly performed while varying the temperature Z of powder adhesive at the folding start timing. As a result, if the sample was completely cooled to room temperature (20° C.) after the fixing process, sufficient adhesive property could not be obtained unless the heater temperature of the second fixing unit 32 was increased to 200° C. Further, if the time for cooling the sample after the fixing process was gradually reduced to increase temperature Z, the "heater temperature during bonding that is required to realize strong bonding" tended to be low.

In a case where the conveyance distance from the first fixing unit 6 to the folding unit 31 is set extremely short and the temperature Z of powder adhesive at the folding start timing is set to 75° C., the heater temperature during bonding that is required to realize strong bonding was 160° C. Then, by plotting the heater temperature during bonding that is required to realize strong bonding in a state where the temperature Z is between 75° C. and 20° C., it was recognized to be approximated by two straight lines K and L which are discontinuous in the vicinity of Z=45 (° C.).

If the plotted points do not have a discontinuous point and are varied continuously, the negative correlation between the heater temperature during bonding that is required to realize strong bonding and temperature Z of the powder adhesive at the folding start timing is considered to be explained by a simple magnitude correlation of heat accumulation quantity. That is, the lower the heat quantity accumulated in the sheet P at the point of time when the sheet P reaches the bonding nip 32N of the second fixing unit 32, the higher the temperature of the heater 32*b*1 of the second fixing unit 32 must be set to heat the powder adhesive Tn to a temperature suitable for bonding in the bonding process. However, since the above-mentioned discontinuity is observed in FIG. 23B, a phenomenon other than the one mentioned above has occurred from the fixing process to the bonding process. The cause of occurrence of the discontinuous point of FIG. 23B can be explained as follows.

Influence of Wax Component

Figure 24:
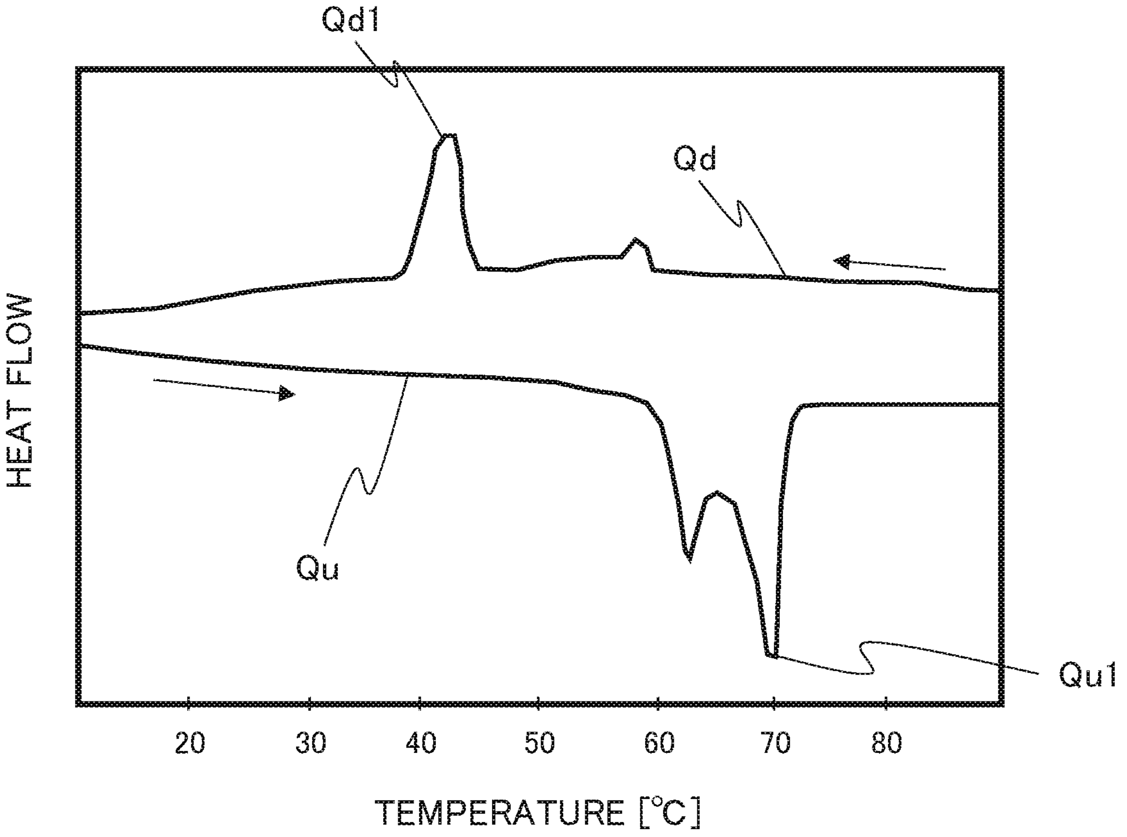
FIG. 24 is a view illustrating a result of measurement of the powder adhesive using a differential scanning calorimetry analyzer.

FIG. 24 illustrates a result of measurement of heat flow of the powder adhesive Tn performed using a differential scanning calorimetry analyzer "Q1000" (product of TA Instruments). Melting points of indium and zinc are used to correct temperature of temperature detecting portion, and fusion heat of indium is used to correct heat quantity. Specifically, 1 mg of a sample is precisely weighed, which is put into an aluminum pan, and an empty aluminum pan is used as a reference. Measurement is performed using a modulation measurement mode within the range of 10° C. to 90° C., with the temperature rising speed of 20° C./min and a temperature drop rate of 20° C./min. Curved line Qu indicates a temperature rising process, with a peak Qu1 (peak caused by heat absorption while melting) of melting point of wax appearing in the vicinity of 70° C. Curved line Qd indicates a temperature dropping process, with a peak Qd1 of heat generation by crystallization of wax appearing around 45° C.

Generally, if the toner used in the electrophotographic image forming apparatus contains a crystalline material having compatibility with binder resin, it is known that the hardness, or plasticity, of toner varies greatly depending on whether the crystalline material is melted and is mixed homogeneously with binder resin. Even according to the powder adhesive Tn of the present embodiment, the hardness, or plasticity, of the powder adhesive Tn varies greatly depending on whether the wax contained as crystalline material is melted. Depending on whether the wax melted by receiving the fixing process by the first fixing unit 6 has been crystallized prior to the folding process, the behavior of the powder adhesive Tn during the folding process and the bonding process is considered to be varied. In other words, it is considered that the crystallization temperature during dropping of temperature of the wax as the crystalline material contained in the powder adhesive Tn according to the present embodiment determines the boundary of the discontinuous points appearing in FIG. 24.

The "crystallization temperature during dropping of temperature" of the crystalline material contained in the powder adhesive Tn can be calculated as a peak temperature (Qd1) of heat generation in the temperature dropping process based on the measurement results of heat flow as illustrated in FIG. 24. In the crystallization of polymer, not only temperature but also time is an important variable, and in general, crystallization speed tends to drop as the molecular weight increases. Therefore, if a polymer such as crystalline polyester is used as the crystalline material, there may be a case where the start temperature of crystallization becomes lower as the dropping of temperature becomes faster. Therefore, the temperature drop rate when determining the crystallization temperature during dropping of temperature is preferably set to a speed close to an average temperature drop rate during the period of time after passing the fixing nip 6N to reaching the folding roller pair 311 in the actual image forming apparatus.

Figure 25A:
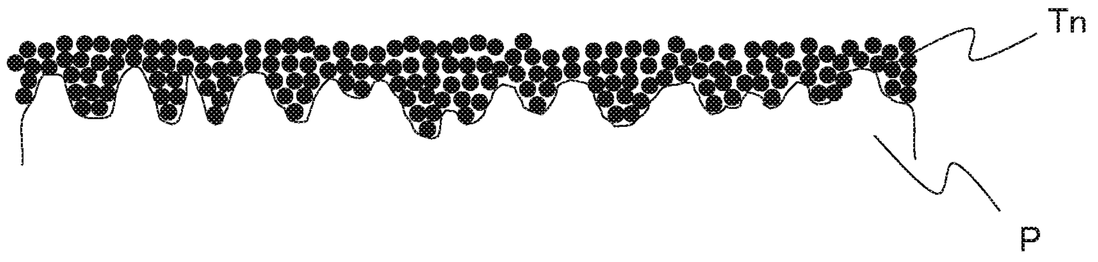
FIGS. 25A to 25C are views illustrating change of the powder adhesive during the fixing process.
Figure 25B:
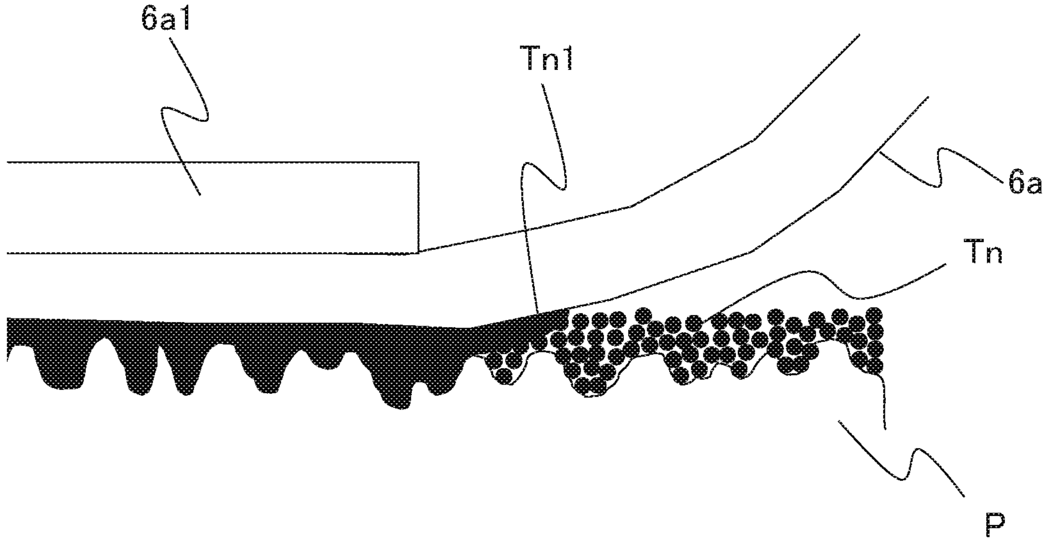

Hereafter, the behavior of the powder adhesive Tn in a print-and-bond operation will be described. FIG. 25A illustrates a state where the powder adhesive Tn is transferred to the paper serving as the sheet P. FIG. 25B illustrates a state of the powder adhesive Tn being changed by the fixing process performed by the first fixing unit 6. In the fixing nip 6N of the first fixing unit 6, the heat of the heater 6*a*1 is applied via the fixing film 6*a* to the powder adhesive Tn, and the powder adhesive Tn turns into fluid by the temperature of the powder adhesive Tn being raised to 120° C., for example. In this state, the wax serving as the crystalline material contained in the powder adhesive Tn is melted and is mixed homogeneously with the binder resin. As a result of the powder adhesive Tn melted in a fluid state being pressed by the fixing film 6*a* at the fixing nip 6N, a layer of adhesive Tn1 that wets the surface of the paper so as to fill the recesses on the surface of the paper, that is, to smooth the unevenness of the paper is formed.

Figure 25C:
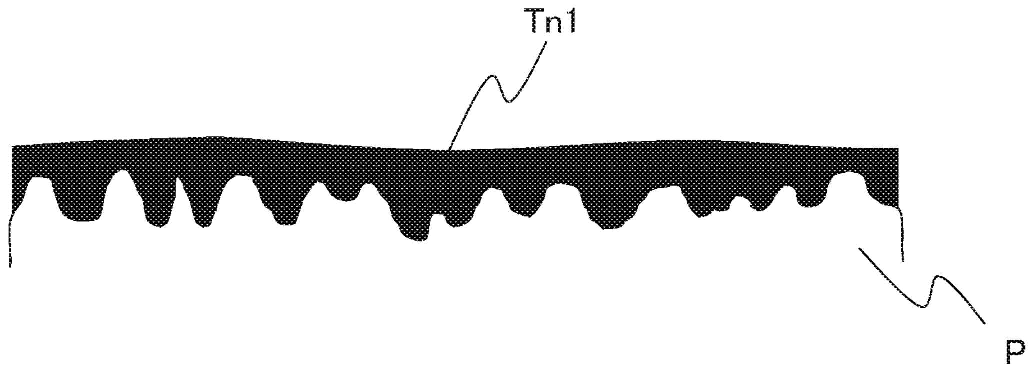

After the sheet P has passed through the first fixing unit 6, the adhesive Tn1 hardens in a state filling the unevenness of the sheet as illustrated in FIG. 25C, and an intermolecular attractive force, i.e., Van der Waals force, acts between the cellulose and the adhesive Tn1 having a sufficient contact area. Further, since the hardened adhesive Tn1 is entangled three-dimensionally with the paper fibers, an overall mechanical bond, i.e., anchor effect, is obtained between the adhesive and the paper. Further, since the surface of the adhesive Tn1 is smoothed by the fixing film 6*a* while passing through the fixing nip 6N, the surface of the adhesive Tn1 after passing the nip is smoothed to a surface roughness equivalent to the surface of the fixing film 6a, which according to the present embodiment is a release layer made of fluororesin.

Figure 26A:
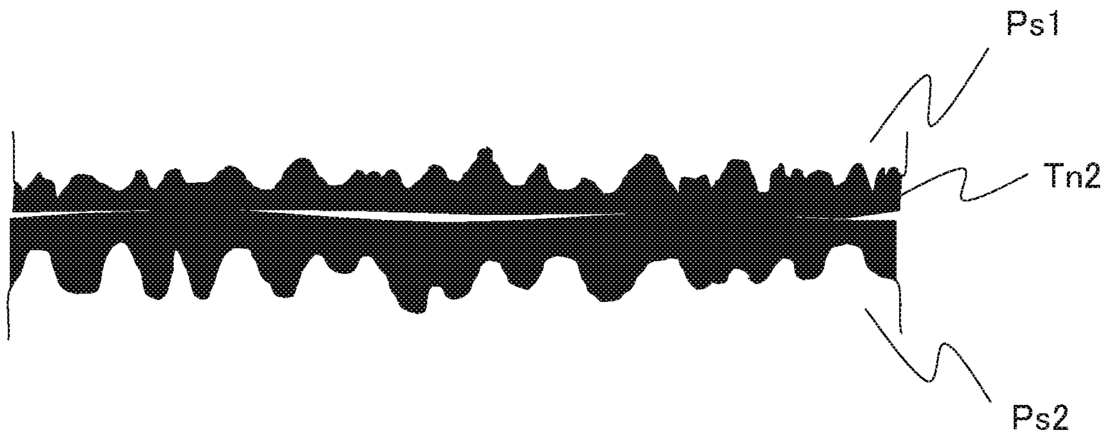
FIGS. 26A and 26B are views illustrating change of the powder adhesive during the folding process.

FIG. 26A illustrates a state where the sheet P is folded (refer to FIG. 5E) by the folding unit 31 such that bonding surfaces Ps1 and Ps2 to which the adhesive Tn2 is applied are opposed to each other. The paper serving as the sheet P is nipped and pressed by the first folding roller 31a and the second folding roller 31b that constitute the folding roller pair 311. The pressure applied by the folding roller pair 311 may deform the surfaces of the adhesive Tn2, and they may not be in sufficiently close contact with each other, which causes discontinuity of straight lines K and L appearing in FIG. 23B. In the following description, a case where the adhesive Tn1 is cooled and plasticity is lost before the folding process is started and a case where the plasticity of the adhesive Tn1 is maintained are described case by case.

At first, a case will be described where the adhesive Tn1 is cooled and plasticity is lost before the folding process is started will be described. In this case, since the adhesive Tn2 has a high hardness, the adhesive Tn2 on the bonding surfaces Ps1 and Ps2 will not easily deform even by receiving pressure from the folding roller pair 311, and a gap may remain between the surfaces of the adhesive Tn2 as illustrated in FIG. 26A. In a state where the sheet P is heated by the second fixing unit 32, the heat from the heater 32b1 is supplied via the heating film 32b from either one of the bonding surfaces Ps1 or Ps2 to the sheet P (FIG. 33B). In this state, the gap illustrated in FIG. 26A prevents smooth thermal conduction from one of the bonding surfaces to the other bonding surface. Therefore, a large heat quantity must be supplied in a short time during the bonding process to achieve a sufficient adhesive property by re-plasticizing the adhesive Tn2 on both bonding surfaces Ps1 and Ps2.

Figure 26B:
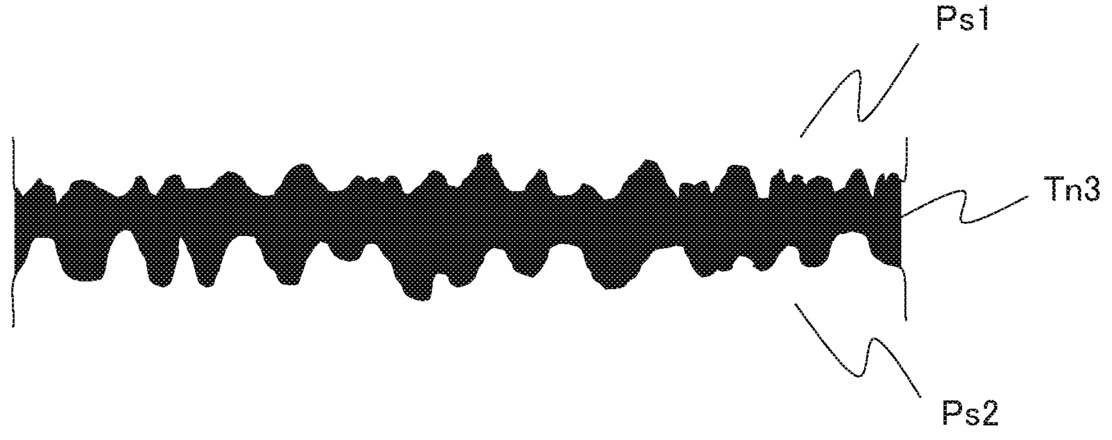

In contrast, if the hardness of the adhesive Tn2 is low at a point of time when the folding process by the folding roller pair 311 is started, the adhesives Tn2 on the bonding surfaces Ps1 and Ps2 deform relatively easily by receiving pressure by the folding roller pair 311, and the surfaces of the adhesives Tn3 come in close contact with each other, as illustrated in FIG. 26B. In this state, the heat supplied from the heater 32b1 via the heating film 32b is transferred smoothly from one of the bonding surfaces to the other bonding surface. As a result, compared to a state illustrated in FIG. 26A where a gap is present, a sufficient adhesive property can be obtained even if only a small amount of heat is supplied during the bonding process.

In the straight line K which is on the lower temperature side of the discontinuous point in FIG. 23B, it is considered that the hardness of the adhesive was high at the point of time the folding process has been started by the folding unit 31 by the adhesive being cooled and the wax being crystallized before the sheet P reaches the folding unit 31. As a result, a gap remains between the adhesives even after the sheet has been folded by the folding roller pair 311, and the heater temperature during bonding that is required to realize strong bonding becomes high.

Meanwhile, in the straight line L which is on the higher temperature side of the discontinuous point in FIG. 23B, the temperature drop before the sheet P reaches the folding unit 31 is small, so basically, it is considered that a state is maintained where the wax is melted and is mixed homogenously with the binder resin. In this state, the plasticity of the adhesive is maintained by the plasticizing action of wax, so that surfaces of the adhesive layers are relatively easily brought into close contact with each other when the sheet is folded by the folding roller pair 311. As a result, the heater temperature during bonding that is required to realize strong bonding is considered to have become lower than the temperature on the straight line extrapolating the straight line K. As described, regarding the temperature Z of the powder adhesive at the fold start timing, the mechanism in which the heater temperature during bonding that is required to realize strong bonding (straight lines K and L of FIG. 23B) becomes discontinuous at around 45° C. can be explained.

As described above, by closely attaching the surfaces of the adhesives by folding the sheets before the wax serving as the crystalline material crystallizes, sufficient adhesive strength can be obtained while suppressing the heater temperature of the bonding process to a value as low as possible. By suppressing the heater temperature to a low value, the possibility of occurrence of hot offset of the image formed by printing toner can be reduced. Further, power consumption of the bonding process can be cut down.

In order to realize the above state, it is effective to shorten the elapsed time from the fixing process to the folding process. Thereby, it becomes possible to carry out the folding process while much of the heat accumulated in the sheet during the fixing process still remains. Further, it is effective to minimize the heat quantity that the parts coming in contact with the sheet between the fixing process and the folding process, especially the folding roller pair 311, takes away from the sheet. Specifically, the following configurations are combined according to the present embodiment.

(a) The heat quantity that the folding roller pair 311 takes away from the sheet is suppressed by reducing the contact area with the sheet by moderately increasing the surface roughness of the folding roller pair 311.

(b) The heat quantity that the folding roller pair 311 takes away from the sheet is suppressed by reducing the thermal capacity of the folding roller pair 311 by adopting a hollow structure.

(c) The heat quantity that the folding roller pair 311 takes away from the sheet is suppressed by accumulating warm air in the circumference of the folding roller pair 311 by setting the opening ratio of the top panel portion (region 39a of FIG. 19) of the cover member covering the upper surface of the postprocessing unit 30 in which the folding unit 31 is installed to 5% or smaller.

(d) The sheet conveyance speed is maintained as much as possible after the sheet has passed through the first fixing unit 6 and immediately before the leading edge of the sheet reaches the bonding nip 32N of the second fixing unit 32, and the sheet conveyance speed is reduced immediately before the leading edge of the sheet reaches the bonding nip 32N. Thereby, the elapsed time from the fixing process to the folding process is shortened so that the heat accumulated in the sheet during the fixing process can be utilized.

In order to perform the folding process in a state where plasticity of the powder adhesive Tn is maintained, the above-mentioned configurations (a) to (d) can be used independently or in combination. That is, the level of cooling of the sheet suppressed in the section from the fixing process to the folding process can be considered according to the property, especially the crystallization temperature during dropping of temperature, of the crystalline material that provides plasticity to the powder adhesive, or the temperature setting of the first fixing unit 6.

Fourth Embodiment

The third embodiment illustrates a method for performing the folding process in a state where the plasticity of the powder adhesive is maintained, wherein the heat supplied to the sheet during the fixing process is kept as much as possible to maintain the melted state of the wax serving as the crystalline material. In the present embodiment, a method for preparing a crystalline material is considered so that the plasticity of the crystalline material can be maintained at a lower temperature. Hereafter, it is assumed that the elements denoted with the same reference numbers as the third embodiment have the same configurations and effects as the third embodiment, so that only the portions that differ from the third embodiment will be described.

An example of preparation of powder adhesive according to the present embodiment will be described. This powder adhesive is stored in the powder storage portion 104*n* of the image forming apparatus 1, similar to the powder adhesive Tn of the first embodiment, and applied to the sheet by the electrophotographic process when creating the printed-and-bonded product.

Example of Preparation of Crystalline Polyester Dispersion 100.0 parts of ethyl acetate, 30.0 parts of crystalline polyester (condensate of 1,10-decanediol and sebacic acid, having a number average molecular weight (Mn) of 7200 and melting point of 72° C.), 0.3 parts of 0.1 mol/L sodium hydroxide, and 0.2 parts of anionic surfactant (Neogen RK, product of DKS Co., Ltd.) were loaded in a beaker having a stirring device, which was heated to 60.0° C. and continuously agitated until it was completely dissolved. Further, 90.0 parts of ion exchanged water were gradually added thereto, which was then subjected to phase-transfer emulsification and solvent removal to acquire a crystalline polyester dispersion (solid component concentration: 20 wt. %).

Example of Preparation of Amorphous Polyester

At first, the following materials were prepared.

| | |
|---|---|
| Terephthalic acid | 30.0 parts |
| Isophthalic acid | 10.0 parts |
| Sebacic acid | 15.0 parts |
| Dodecenylsuccinic acid | 20.0 parts |
| Trimellitic acid | 6.9 parts |
| Bisphenol A ethylene oxide (2 mol) adduct | 70.0 parts |
| Bisphenol A propylene oxide (2 mol) adduct | 90.0 parts |
| Dibutyltin oxide | 0.1 parts |

The above-listed materials were put into a heat-dried two-mouth flask, nitrogen gas was introduced into the container, and the materials were agitated while maintaining an inert atmosphere and the temperature thereof was raised. After performing polycondensation reaction for approximately 13 hours at a temperature of 150 to 230° C., the pressure was gradually reduced at a temperature of 210 to 250° C. to acquire an amorphous polyester. The number average molecular weight (Mn) of the obtained amorphous polyester was 19,400, the weight-average molecular weight (Mw) was 85,000, and the glass transition temperature (Tg) was 58° C.

Example of Preparation of Amorphous Resin Dispersion

An amorphous resin particle dispersion was obtained in a similar manner as the example of preparation of the crystalline polyester dispersion, with the crystalline polyester changed to amorphous polyester.

Example of Preparation of Wax Dispersion

The following materials were prepared.

-continued

| | |
|---|---|
| Behenic behenyl (melting point 72° C.) | 50.0 parts |
| Anionic surfactant | 0.3 parts (Neogen RK, product of DKS Co., Ltd.) |
| Ion exchanged water | 150.0 parts |

The above-listed materials were mixed and heated to 95° C., and then dispersed using a homogenizer (ULTRA-TURRAX T50, product of IKA). Thereafter, the materials were subjected to dispersion processing using a Manton Gaulin high-pressure homogenizer (product of Gaulin), and a wax dispersion in which wax particles are dispersed (solid component concentration: 20 wt. %) was prepared.

Example of Preparation of Powder Adhesive

The following materials were prepared.

| | |
|---|---|
| Amorphous resin dispersion (20 wt. % solid component) | 150.0 parts |
| Crystalline polyester dispersion (20 wt. % solid component) | 65.0 parts |
| Wax dispersion (20 wt. % solid component) | 20.0 parts |

The above-listed materials were loaded into a beaker, and after adjusting the total parts of water to 250 parts, the temperature thereof was controlled to 30.0° C. Thereafter, the materials were mixed by agitating for one minute at 5000 rpm using a homogenizer (ULTRA-TURRAX T50, product of IKA).

Further, 10.0 parts of 2.0 wt. % aqueous solution of aluminum chloride which is a polyvalent metal compound were gradually added as flocculant. The material dispersion was transferred to a polymerization tank having a stirring device and a thermometer and was heated to 50.0° C. using a mantle heater while agitating to promote growth of aggregated particles.

After elapse of 60 minutes, 200.0 parts of 5.0 wt. % aqueous solution of ethylenediaminetetraacetic acid (EDTA) was added to prepare an aggregated particle dispersion. Next, the aggregated particle dispersion was adjusted to pH 8.0 using a sodium hydroxide aqueous solution of 0.1 mol/L, and thereafter, the aggregated particle dispersion was heated to 80.0° C. and left standing for 180 minutes to coalesce aggregated particles.

After the elapse of 180 minutes, a powder adhesive particle dispersion in which powder adhesive particles are dispersed was obtained. After cooling the dispersion to 40° C. or lower at a temperature drop rate of 300° C./min, the powder adhesive particle dispersion was filtrated and then washed by ion exchanged water to extract powder adhesive particles. The obtained powder adhesive particles were dried for 24 hours in an oven set to 40° C. to obtain powder adhesive particles.

0.5 parts of sol-gel silica having a particle diameter of 100 nm and 0.8 parts of hydrophobic silica microparticles obtained by treating silica particles whose number average particle diameter of primary particles is 12 nm with silicone oil and whose BET specific surface area after the treatment was 120 $m^2/g$ were added to 100 parts of powder adhesive particles. Then, the materials were mixed using an FM mixer (product of Nippon Coke & Engineering Co., Ltd.) to obtain the powder adhesive. The glass transition temperature of the obtained powder adhesive was 49° C. and a weight-average particle diameter thereof was 5.8 μm.

In the powder adhesive obtained by the above method, the crystalline polyester acts as a plasticizer that give plasticity to the powder adhesive when heated. In other words, the crystalline polyester functions as the crystalline material according to the present embodiment. That is, when the powder adhesive which is an aggregate of crystalline polyester and amorphous resin is heated, the crystalline polyester is melted and becomes compatible with amorphous resin, allowing the powder adhesive to be deformed easily.

According to the powder adhesive of the present embodiment, even if the temperature of the adhesive is lowered to a temperature lower than the crystallization temperature (approximately 45° C.) of wax according to the first embodiment after the fixing process, crystallization of the crystalline polyester will not occur. In other words, if a graph of FIG. 24 is illustrated, the temperature at which the straight lines K and L become discontinuous will be a lower value (such as 5° C. or lower). In this case, if the powder adhesive according to the present embodiment is used, the plasticity of the adhesive will still be maintained even if the surface temperature of the adhesive is lowered for example to room temperature after the fixing process. Therefore, the surfaces of the adhesive layer can be made to come into close contact relatively easily during the folding process, and a sufficient adhesive strength can be obtained while reducing the heat quantity supplied to the sheet during the bonding process.

Further according to the present embodiment, a sufficient adhesive strength can be achieved without suppressing the heat quantity supplied to the sheet during the bonding process without providing the configuration ((a) to (d) mentioned earlier) to retain the heat supplied to the sheet during the fixing process, so that design freedom is advantageously increased. However, it is also possible to additionally adopt the method of lowering the crystallization temperature during dropping of temperature of the crystalline material contained in the powder adhesive and the method of retaining the heat supplied to the sheet during the fixing process.

Fifth Embodiment

As described above, the pressure roller of the second fixing unit 32 for performing the bonding process includes an elastic layer formed of an elastomer such as silicone rubber. The pressure roller formed of such an elastomer may vary the conveyance speed of the sheet by thermal expansion of rubber. Therefore, the sheet conveyance speed at the nip portion formed by the pressure roller may be slower than the conveyance speed of the conveyance roller for conveying the folded sheet toward the nip portion. In that case, slackness or looseness of the sheet, which is called a waving hereinafter, may occur between the conveyance roller and the pressure roller, which may cause creasing of the sheet or misalignment of the folding position of the sheet.

Therefore, an embodiment suitable for suppressing the occurrence of waving of the sheet prior to bonding is illustrated as a fifth embodiment. It is assumed that the elements denoted with the same reference numbers as the first embodiment have the same configurations and effects as the first embodiment, so that only the parts that differ from the first embodiment will mainly be described.

Configuration of Folding Unit and Second Fixing Unit

Figure 29:
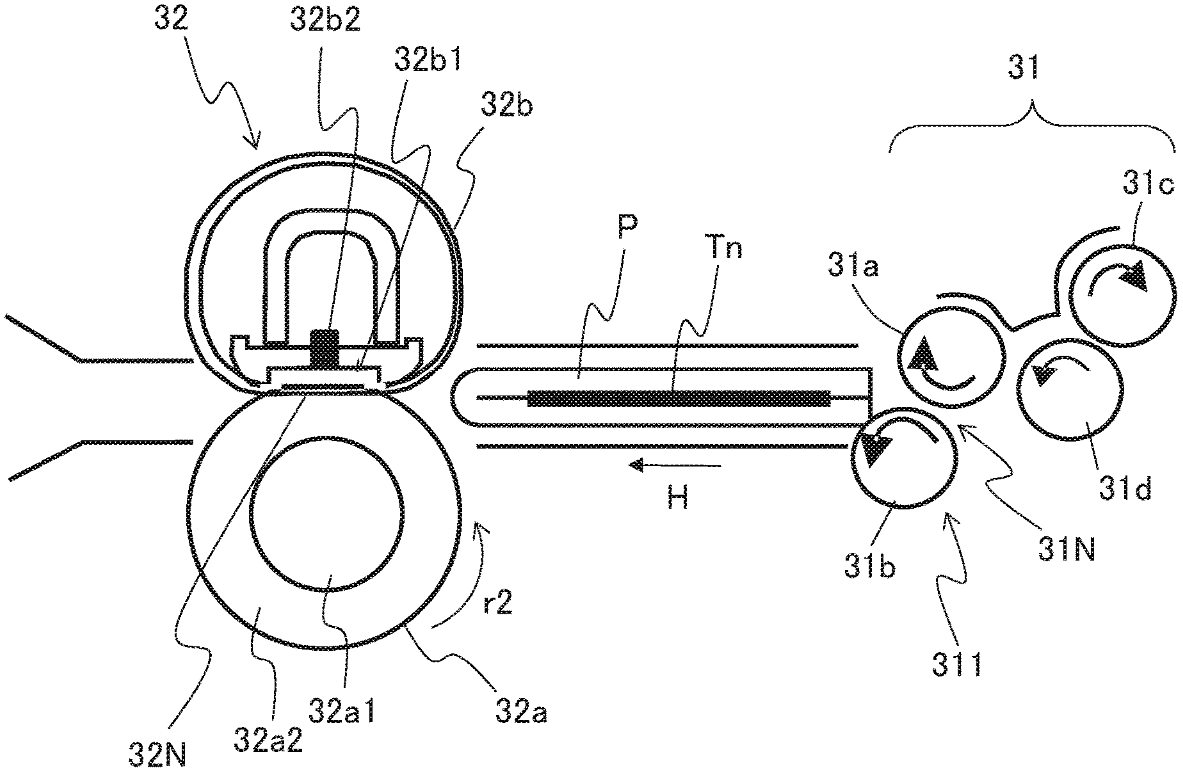
FIG. 29 is a schematic drawing of an inner side of a postprocessing unit according to a fifth embodiment.

FIG. 29 is a schematic view illustrating the folding unit 31 and the second fixing unit 32 according to the present embodiment. The second fixing unit 32 according to the present embodiment includes a pressure roller 32*a* including an elastic layer 32*a*2 formed of an elastomer. The pressure roller 32*a* is a rotary member having an outer diameter of 24 mm, including a core metal 32*a*1 made for example of iron or aluminum, the elastic layer 32*a*2 having a thickness of 2 to 4 mm made for example of silicone rubber, and a release layer made of fluororesin such as PFA or PTFE arranged on an outermost surface. The pressure roller 6*b* is in pressure contact via the heating film 32*b* with a nip forming unit including the heater 32*b*1 and a holding member thereof arranged on the inner side of the heating film 32*b* and forms the bonding nip 32N whose width is 7 to 9 mm in the sheet conveyance direction. The other configurations of the second fixing unit 32 are substantially the same as the first embodiment.

Figure 30:
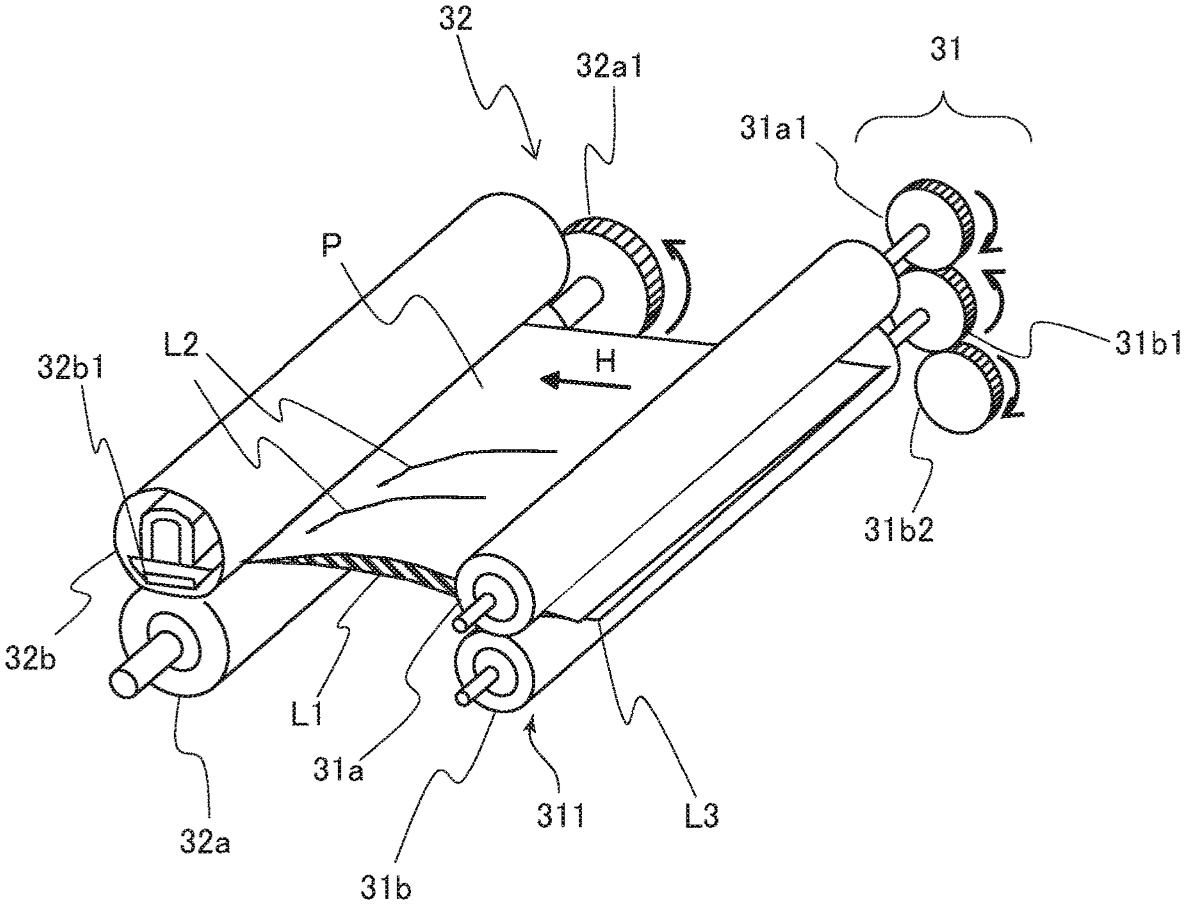
FIG. 30 is a view illustrating a case where a sheet is waved prior to bonding.

FIG. 30 is a perspective view illustrating a part of the folding unit 31 and the second fixing unit 32. Now, the relationship between the sheet conveyance speed of the folding roller pair 311 that folds the sheet P while conveying the sheet toward the second fixing unit 32 and the sheet conveyance speed of the second fixing unit 32 will be described. In the present embodiment, the sheet conveyance speed of the folding roller pair 311 is set to be somewhat slower than the sheet conveyance speed of the second fixing unit 32.

The first folding roller 31*a* and the second folding roller 31*b* receive driving force transmitted from a motor serving as a drive source via a drive transmission portion (31*a*1, 31*b*1 and 31*b*2) such as a gear train, and rotate in the direction of the arrow in the drawing. Thereby, the sheet P is conveyed in the sheet conveyance direction shown by arrow H from a nip portion 31N of the first folding roller 31*a* and the second folding roller 31*b* toward the bonding nip 32N of the second fixing unit 32.

Thereby, as illustrated in FIG. 30, there may be a case where waving of the sheet may be generated between the nip portion 31N of the folding roller pair 311 and the bonding nip 32N of the second fixing unit 32. For example, there may be a case where the leading edge, that is, downstream edge in the sheet conveyance direction shown by arrow H, of the sheet P is somewhat curved, so that the sheet P cannot enter the bonding nip 32N smoothly. In such a case, a waving L1 may be formed on the sheet P between the nip portion 31N of the folding roller pair 311 and the bonding nip 32N of the second fixing unit 32.

If the sheet conveyance speed of the second fixing unit 32 is designed to always be relatively faster than the sheet conveyance speed of the folding roller pair 311, even if the waving L1 is created temporarily, the waving L1 will be solved during conveyance of the sheet P without growth of the waving L1. In contrast, if the sheet conveyance speed of the second fixing unit 32 is designed to always be relatively slower than the sheet conveyance speed of the folding roller pair 311, the waving L1 is created during conveyance of the sheet P, and the waving L1 gradually grows, that is, the level of waviness is increased. When the waving L1 is created, a crease L2 may be created on the sheet P or a misalignment L3, that is, misalignment of positions of surfaces that oppose one another in the folded state, of the folding position of the sheet P may be caused.

Figure 31A:
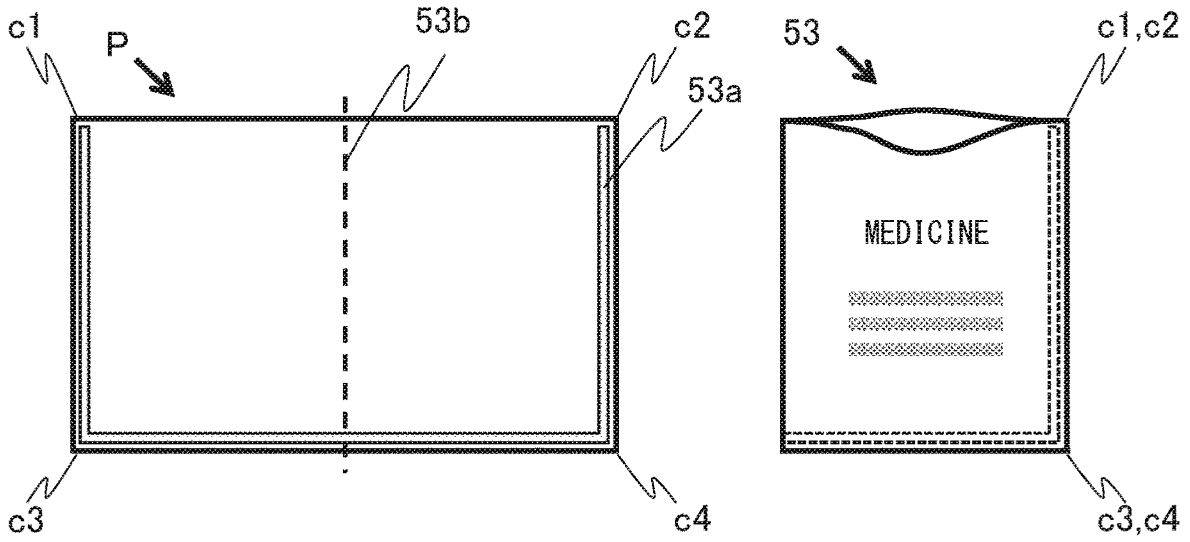
FIGS. 31A and 31B are views illustrating an influence of a waving of the sheet formed prior to bonding.
Figure 31B:
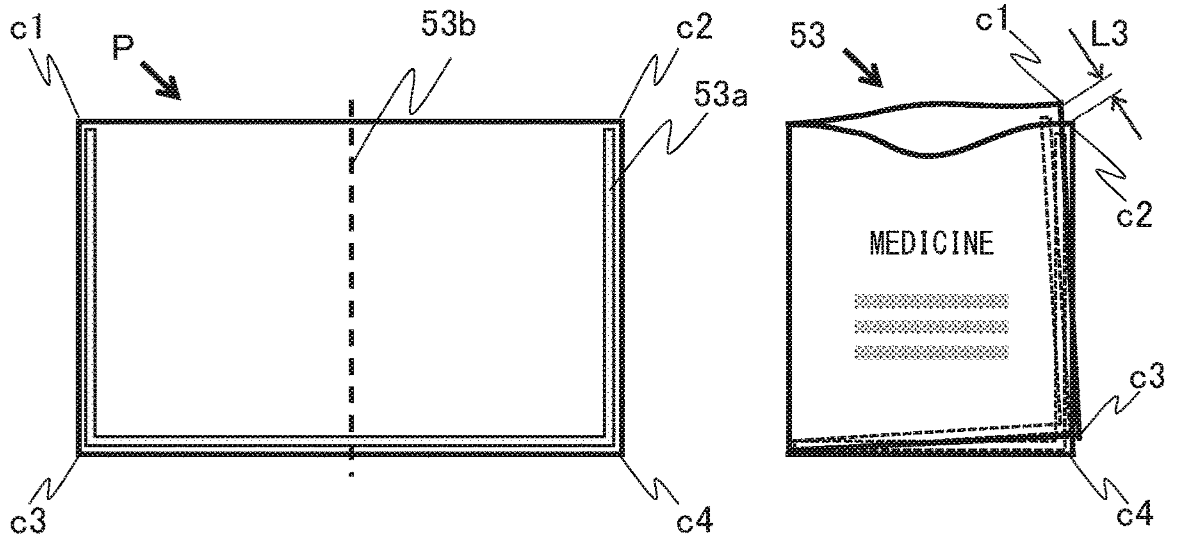

Disadvantages of a case where the folding position of the sheet is misaligned will be described with reference to FIGS. 31A and 31B. A paper pouch 53 in a normal state is formed in a pouch shape by having corners c1 and c2 and corners c3 and c4 superposed as illustrated in FIG. 31A. In contrast, if the folding position is misaligned, the sheet is bonded in a state where the corners c1 and c2 are not superposed and the corners c3 and c4 are not superposed, as illustrated in FIG. 31B. Therefore, not only the shape of the paper pouch 53 is distorted but also sufficient bonding strength may not be obtained since the area 53*a* to which the powder adhesive is applied is not superposed, and the bonding surface may be peeled.

One of the causes of the waving L1 being formed between the folding roller pair 311 and the second fixing unit 32 is the outer diameter of the pressure roller 32*a* which is a roller member according to the present embodiment being fluctuated by the change of temperature. Since the pressure roller 32*a* includes the elastic layer 32*a*2 (FIG. 29) formed for example of silicone rubber, in a state where the print-and-bond operation is performed continuously and the pressure roller 32*a* is gradually heated, the elastic layer 32*a*2 is thermally expanded and the outer diameter of the pressure roller 32*a* is gradually enlarged. Therefore, the sheet conveyance speed of the second fixing unit 32 will depend on the temperature of the pressure roller 32*a*, and the sheet conveyance speed will become faster if the temperature of the pressure roller 32*a* is high during continuous use of the image forming apparatus 1 and the sheet conveyance speed will become slower if the temperature of the pressure roller 32*a* is low, such as immediately after turning on the power. Even if the pressure roller 32*a* is formed of a material other than silicone rubber, fluctuation of the sheet conveyance speed accompanying temperature change may occur according to the thermal expansion rate of the relevant material.

Therefore, according to the present embodiment, the sheet conveyance speed of the second fixing unit 32 is set to 101 mm/sec at normal temperature (such as 20° C.) and the sheet conveyance speed of the folding roller pair 311 is set to 100 mm/sec. It is preferable for the sheet conveyance speed of the second fixing unit 32 to be set to a value greater by 0.1% or more and 10% or less than the sheet conveyance speed of the folding roller pair 311. In other words, if the sheet conveyance speed of the folding roller pair 311 is denoted as V1 and the sheet conveyance speed of the second fixing unit 32 is denoted as V2, it is preferable to satisfy $1.001 \le V2/V1 \le 1.1$. Thereby, a relationship is satisfied where the sheet conveyance speed of the second fixing unit 32 is faster than that of the folding roller pair 311 both immediately after turning on the power and during continuous use.

The sheet conveyance speed of the second fixing unit 32 refers to the peripheral speed of the pressure roller 32*a* and the heating film 32*b* serving as the rotary member pair that nips and conveys the sheets. Further, the sheet conveyance speed of the folding roller pair 311 refers to the peripheral speed of the first folding roller 31*a* and the second folding roller 31*b* in a state before the leading edge of the sheet P reaches the bonding nip 32N of the second fixing unit 32.

Figure 32A:
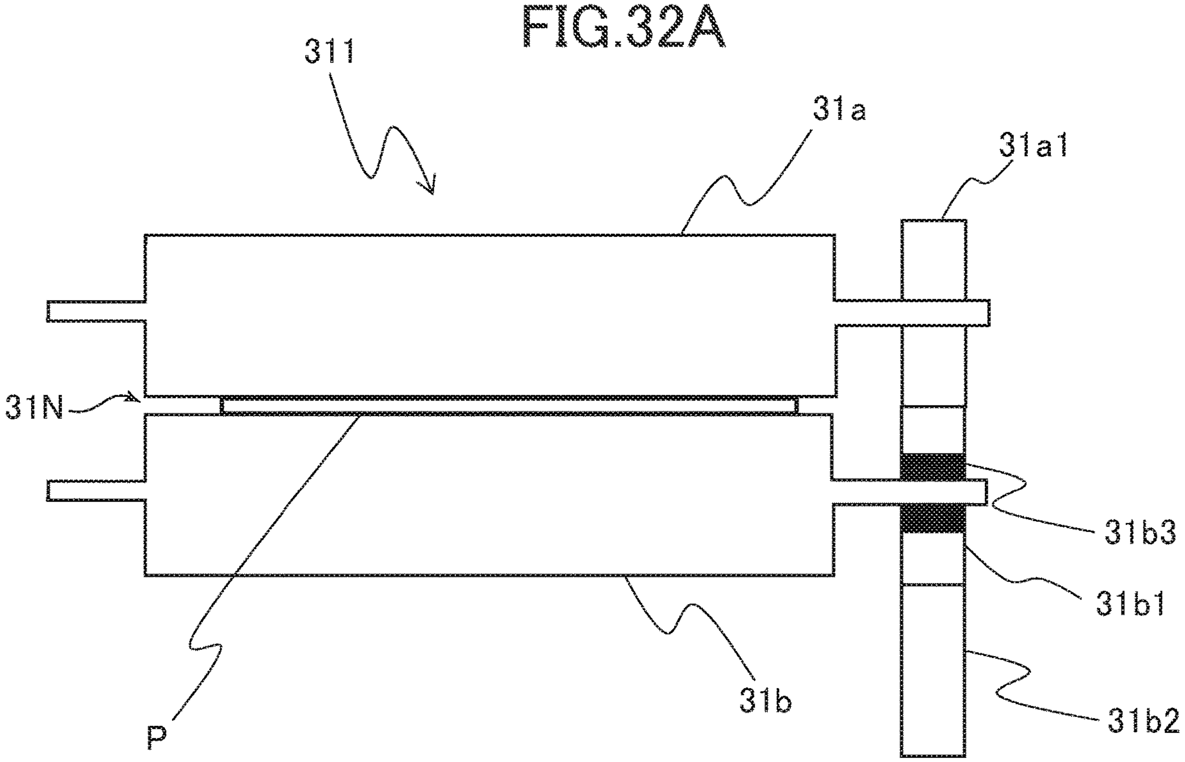
FIGS. 32A and 32B are views illustrating a one-way clutch according to the fifth embodiment.
Figure 32B:
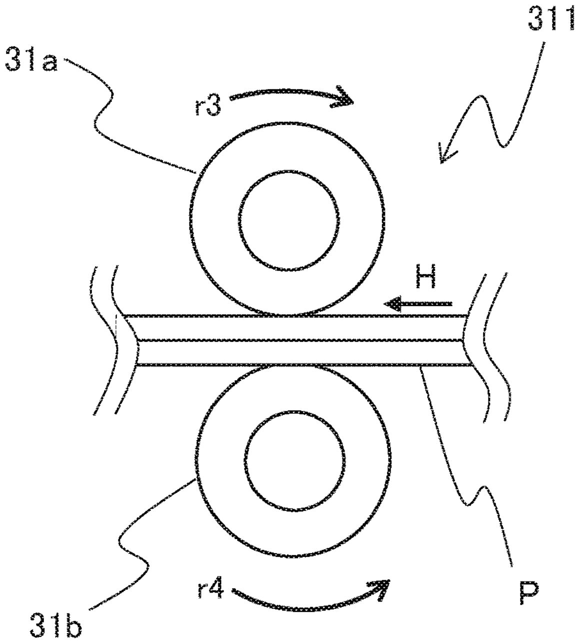

FIGS. 32A and 32B are schematic drawings illustrating a drive transmission configuration of the folding roller pair 311. FIG. 32A illustrates a cross-sectional configuration taken along the rotational axis direction, that is, longitudinal direction of the nip portion 31N, of the folding roller pair 311, and FIG. 32B illustrates a cross-sectional configuration of a cross section perpendicular to the rotational axis of the folding roller pair 311. A first gear 31*a*1 is attached to the rotation shaft of the first folding roller 31*a*, and a second gear 31*b*1 that meshes with the first gear 31*a*1 is attached to the rotation shaft of the second folding roller 31*b*. Driving force from a motor serving as a drive source is transmitted to a transmission gear 31*b*2 that meshes with the second gear 31*b*1, according to which the first folding roller 31*a* and the second folding roller 31*b* are rotated in predetermined rotating directions r3 and r4, as illustrated in FIG. 32B. Thereby, the folding roller pair 311 conveys the sheet P nipped by the nip portion 31N in a sheet conveyance direction shown by arrow H toward the bonding nip 32N of the second fixing unit 32.

It is preferable to provide a one-way clutch 31*b*3 (i.e., free-wheel mechanism) between the second gear 31*b*1 that receives driving force from the drive source and the rotation shaft of the second folding roller 31*b*. The one-way clutch 31*b*3 allows the second folding roller 31*b* to rotate faster than the second gear 31*b*1 in the rotating direction r4 to convey the sheet P and regulates the second folding roller 31*b* from rotating slower than the second gear 31*b*1 in the rotating direction r4. In other words, the one-way clutch 31*b*3 is in a locked state when a torque in a direction opposite to the rotating direction r4 is loaded to the second gear 31*b*1 from the second folding roller 31*b* and is in a free state when a torque in the rotating direction r4 is loaded thereto.

Until the leading edge, that is, downstream end in the sheet conveyance direction shown by arrow H, of the sheet P reaches the bonding nip 32N, the sheet P is conveyed by the folding roller pair 311 by drive transmission via the one-way clutch 31*b*3 in the locked state. If the leading edge of the sheet P reaches the bonding nip 32N and abuts against both the folding roller pair 311 and the pressure roller 32*a*, the sheet P is started to be accelerated to the sheet conveyance speed of the second fixing unit 32. In this state, the one-way clutch 31*b*3 will be in a free state, and the folding roller pair 311 rotates freely following the movement of the sheet P drawn toward the bonding nip 32N. In order to ensure the conveyance force of the second fixing unit 32, a contact pressure and a nip width of the bonding nip 32N are preferably greater than the contact pressure and the nip width of the nip portion 31N of the folding roller pair 311. By providing the one-way clutch 31*b*3, the pulling of the sheet P caused by the speed difference of the second fixing unit 32 and the folding roller pair 311 can be prevented.

As described, according to the present embodiment, the sheet conveyance speed of the second fixing unit 32 is set faster than the sheet conveyance speed of the folding roller pair 311 that conveys the sheet P toward the bonding nip 32N of the second fixing unit 32. Thereby, the generation of a waving on the sheet P is suppressed prior to bonding between the folding roller pair 311 and the second fixing unit 32, and the possibility of generation of creases on the sheet or misalignment of the folding position caused by the waving can be reduced to acquire a printed-and-bonded product without creases and positional misalignments.

Sixth Embodiment

In the sixth embodiment, a configuration example adopting a detection unit for detecting waving of the sheet between the folding roller pair 311 and the second fixing unit 32 will be described. Hereafter, it is assumed that the elements denoted with the same reference numbers as the fifth embodiment have the same configuration and effect as the fifth embodiment, so that only the portions that differ from the fifth embodiment will be described.

Figure 33:
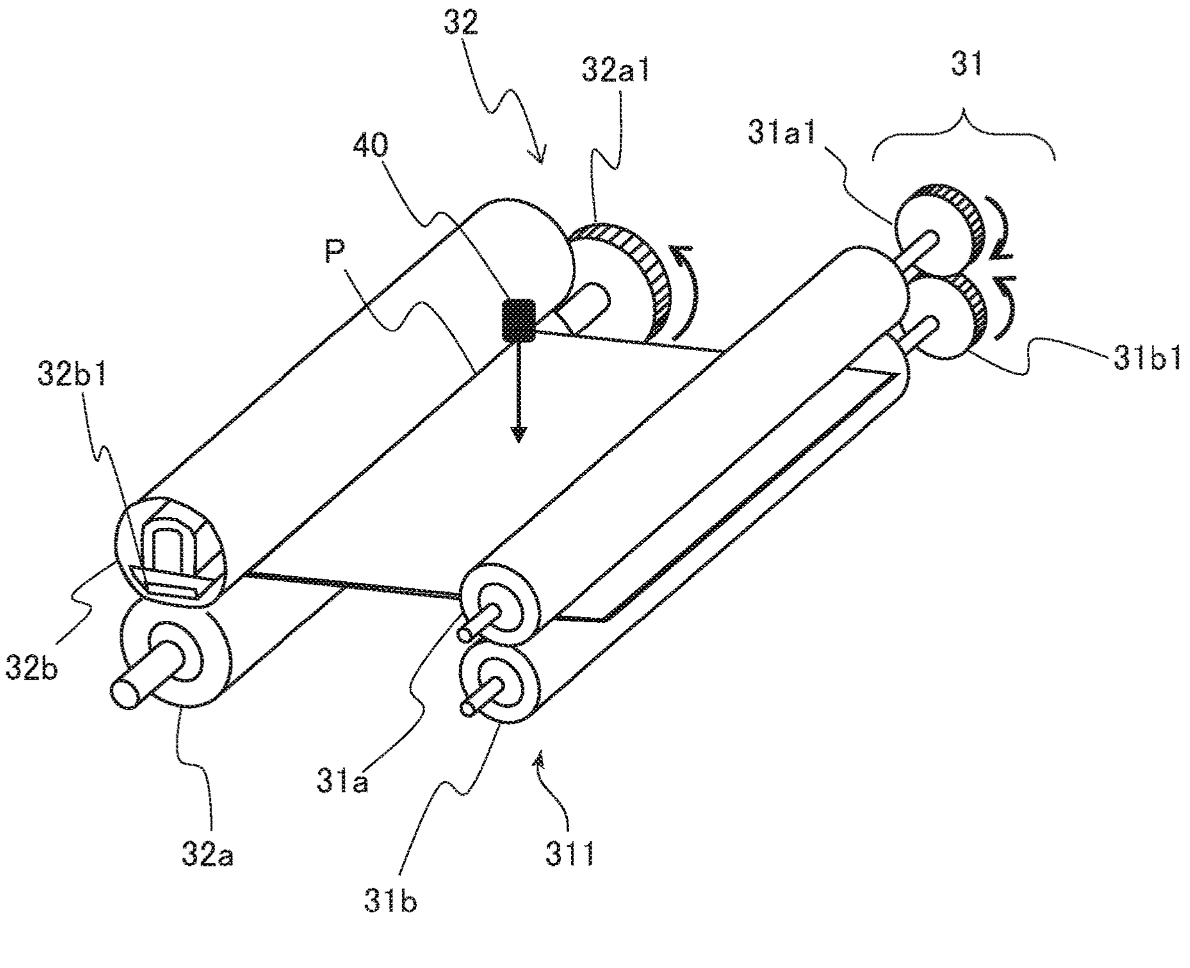
FIG. 33 is a view illustrating a distance sensor according to a sixth embodiment.

As illustrated in FIG. 33, the present embodiment is equipped with a distance sensor 40 that serves as a detection unit. The distance sensor 40 is an optical sensor that is arranged between the nip portion 31N of the folding roller pair 311 and the bonding nip 32N of the second fixing unit 32 in the sheet conveyance direction. The distance sensor 40 detects whether the position in a thickness direction, that is, normal direction on the surface, of the sheet P conveyed by the folding roller pair 311 toward the second fixing unit 32 has been fluctuated with respect to a reference position in a state where the sheet P is stretched without slackness between the nip portion 31N and the bonding nip 32N.

The control unit of the image forming apparatus controls the sheet conveyance speed of the second fixing unit 32 based on a detection signal from the distance sensor 40. For example, if the detection signal of the distance sensor 40 indicates that a waving has been formed on the sheet P, the control unit sends a control signal to the motor driving the pressure roller 32*a* to accelerate the rotational speed of the pressure roller 32*a* and dissolve the waving.

There are various detection systems of optical sensors capable of measuring distance to an object, such as a system using triangulation or a system using a time difference of the light emitted from the light emitting component being reflected on the object and reaching the photosensing portion, but the detection system is not limited as long as an appropriate accuracy is realized.

Further, a sensor combining a flag that swings by abutting against the sheet P and a photo-interrupter shaded by the flag can be used as the detection unit. In this case, if the magnitude of waving of the sheet P is smaller than a predetermined value, the flag is moved away from the detection position of the photo-interrupter so that the output is set to 0 (low). Further, if the magnitude of waving of the sheet P is greater than the predetermined value, the flag is moved to the detection position of the photo-interrupter so that the output of the waving sensor is set to 1 (high).

The present embodiment detects the waving of the sheet using the detection unit and performs feedback to control the sheet conveyance speed, so that the waviness of the sheet can be controlled with higher accuracy. The configuration of the present embodiment is advantageous, for example, in order to correspond to a long sheet in a large-size image forming apparatus.

The present embodiment does not necessarily require a configuration where the sheet conveyance speed of the second fixing unit 32 is always faster than the sheet conveyance speed of the folding roller pair 311 as according to the first embodiment. That is, the present embodiment can adopt a configuration where the sheet conveyance speed of the second fixing unit 32 is usually set equal to the sheet conveyance speed of the folding roller pair 311, and the second fixing unit 32 is accelerated only when the distance sensor 40 detects the waving of the sheet.

Seventh Embodiment

As described according to the first to sixth embodiments described earlier, in a state where the fixing process and the bonding process for creating the printed-and-bonded product is executed by a single image forming apparatus, the powder adhesive is applied to a surface to be an inner side of the folded sheet. Meanwhile, contents such as corporate logos and addresses are recorded on another surface to be an outer side of the folded sheet. Now, when heating the sheet via the heating member such as a roller or a film during the bonding process, hot offsets may be caused where toner of the image recorded on the outer side of the folded sheet is melted and transferred to the heating member and then re-attached to the sheet after the heating member rotates once. If the heating temperature during the bonding process is lowered to suppress the occurrence of hot offsets, the powder adhesive applied to the inner side of the folded sheet will not be sufficiently softened, and bonding of the sheet surfaces may become insufficient.

Therefore, an embodiment that is suitable for both suppressing hot offsets and realizing a preferable adhesive property will be described as a seventh embodiment. Hereafter, it is assumed that the elements denoted with the same reference numbers as the first embodiment have the same configuration and effect as the first embodiment, so that only the portions that differ from the first embodiment will be described.

Figure 34:
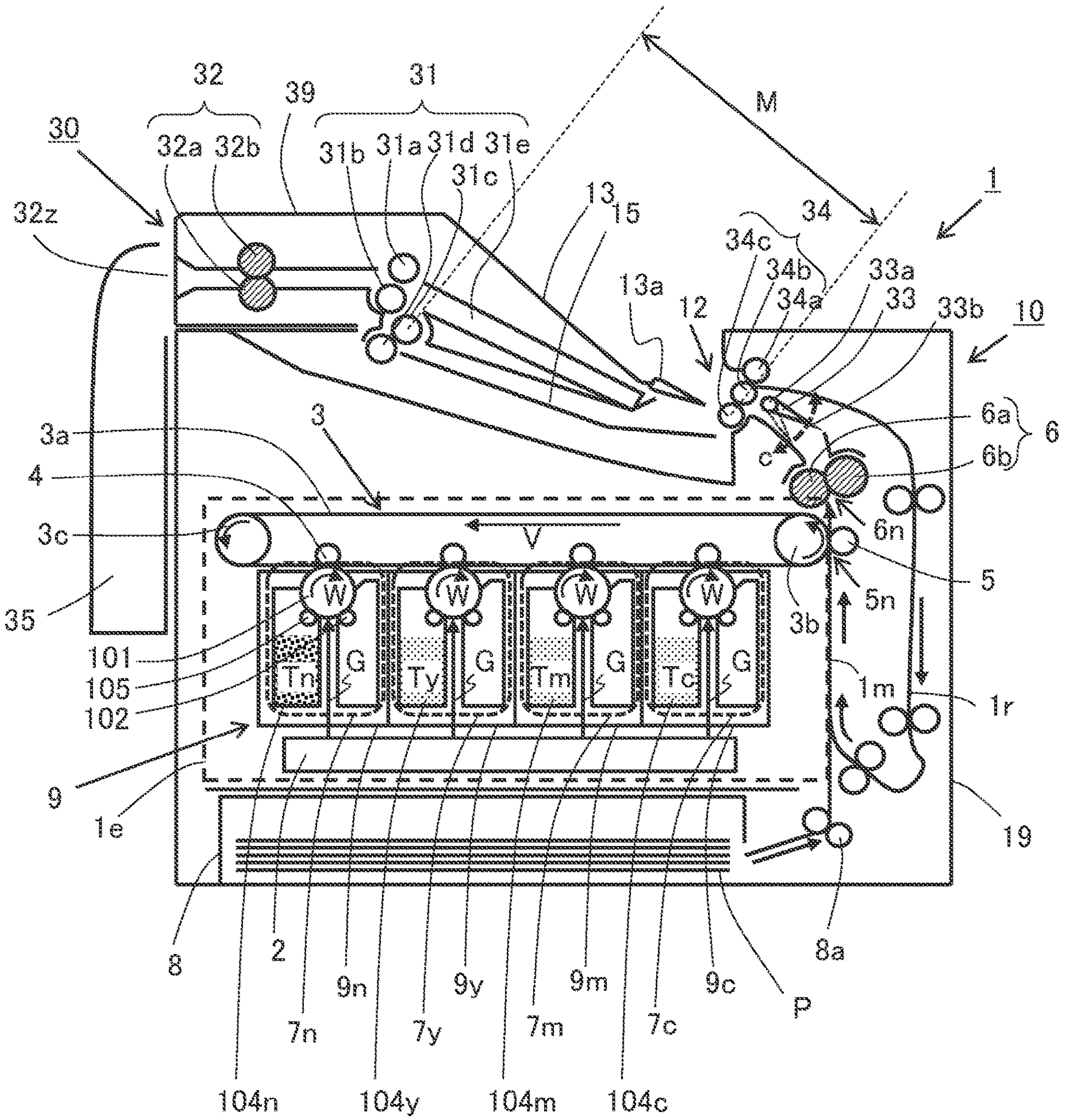
FIG. 34 is a schematic drawing of an image forming apparatus according to a seventh embodiment.

The arrangement of rollers constituting the folding unit 31 of the image forming apparatus 1 according to the present embodiment differs from that of the first embodiment, as illustrated in FIGS. 34 and 36. The folding unit 31 includes four rollers including the first guide roller 31*c*, the second guide roller 31*d*, the first folding roller 31*a* and the second folding roller 31*b*, and the drawing portion 31*e*. The first guide roller 31*c* and the second guide roller 31*d* are the guide roller pair 312 that nips and conveys the sheet P received from the conveyance path, which according to the present embodiment is the intermediate path 15, upstream of the folding unit 31. The first folding roller 31*a* and the second folding roller 31*b* are the folding roller pair 311 that folds and conveys the sheet P.

Figure 36A:
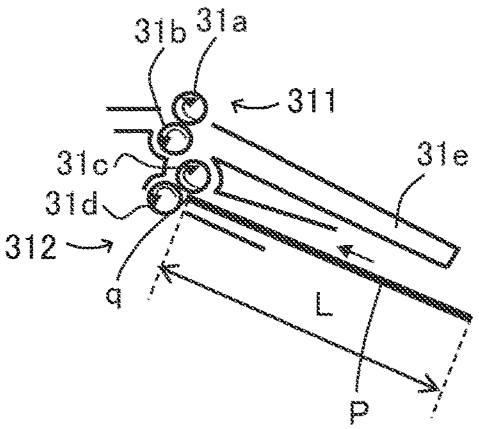
FIGS. 36A to 36F are views illustrating folding steps according to the seventh embodiment.

The folding process performed by the folding unit 31 will be described with reference to FIGS. 36A to 36F. When the folding process is executed, the first guide roller 31*c* and the first folding roller 31*a* are rotated in the clockwise direction in the drawing and the second guide roller 31*d* and the second folding roller 31*b* are rotated in the counterclockwise direction in the drawing. At first, the leading edge q of the sheet P sent out from the sheet discharge unit 34 is drawn into the guide roller pair 312 as illustrated in FIG. 36A. The leading edge q of the sheet P is guided upward by the guide wall 31*f* as illustrated in FIG. 36B and comes into contact with the first folding roller 31*a*, drawn into the second folding roller 31*b* and the first guide roller 31*c* opposing each other and abuts against the wall 31*g* of the drawing portion 31*e*.

Along with the drawing in of the sheet P by the guide roller pair 312, the leading edge q advances toward a depth of the drawing portion 31*e* while sliding against the wall 31*g*. Then the leading edge q abuts against the end portion 31*h* of the drawing portion 31*e*, as illustrated in FIG. 36C. The drawing portion 31*e* forms a space that extends approximately in parallel with the intermediate path 15 on the upper side of the intermediate path 15, and in the stage illustrated in FIG. 36C, the sheet P is in a state curved in a U-shape being wound around the first guide roller 31*c*.

Figure 36D:
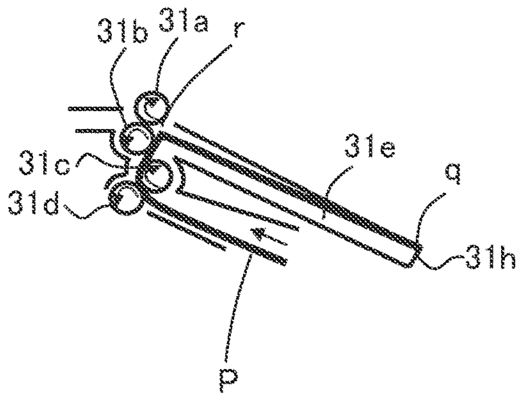
Figure 36B:
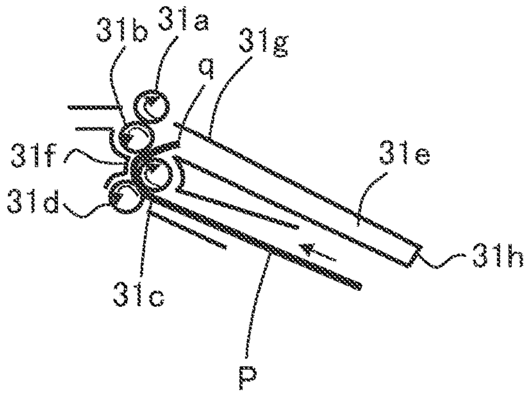
Figure 36E:
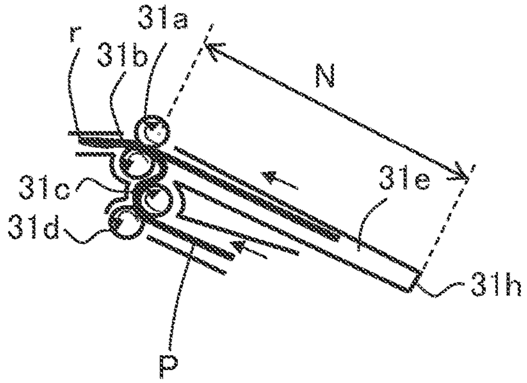
Figure 36C:
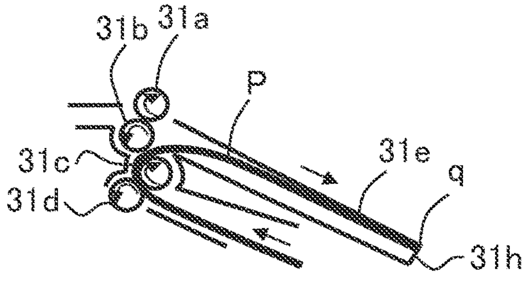
Figure 36F:
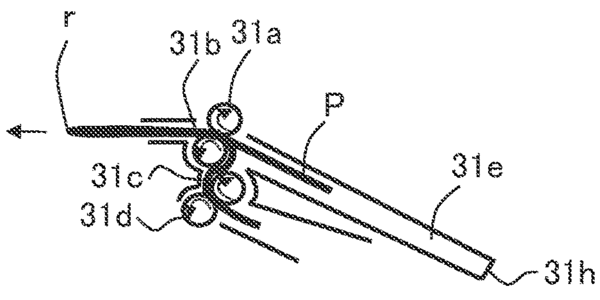

When the sheet P is further drawn in by the guide roller pair 312 from the state illustrated in FIG. 36C, the sheet starts to be warped at the middle part r as illustrated in FIG. 36D. Then, in a state where the middle part r abuts against the first folding roller 31*a* as illustrated in FIG. 36E, the middle part r is drawn into the nip portion of the folding roller pair 311 by frictional force received from the second folding roller 31*b*. Thereafter, as illustrated in FIG. 36F, the sheet P is discharged with the middle part r positioned at the leading edge by the folding roller pair 311 in a state where the sheet P is folded at the middle part r serving as the folding line.

Figure 38:
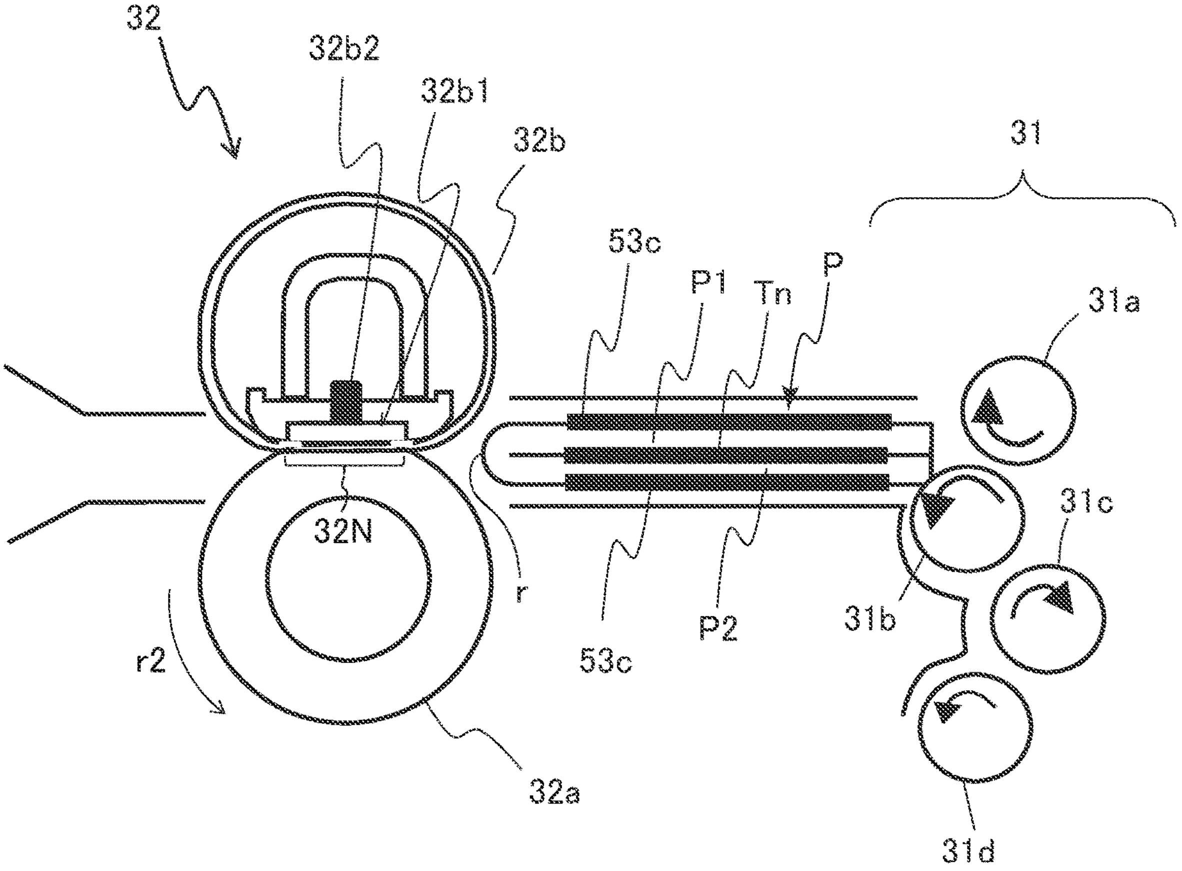
FIG. 38 is a schematic drawing of an inner side of a postprocessing unit according to the seventh embodiment.

The sheet P folded by the folding unit 31 is conveyed to the second fixing unit 32, and receives bonding treatment in which the sheet P is heated and pressed while being nipped and conveyed by the bonding nip 32N. In this state, as described later, a portion of the sheet that was a leading portion when the sheet P being discharged from the first fixing unit 6 is exposed to the outer side of the folded sheet folded by the folding unit 31 and is in contact with the heating film 32*b* which constitutes the heat source of the second fixing unit 32 when passing through the bonding nip 32N. The sheet P is bonded in the folded state as illustrated in FIG. 38 by receiving the bonding treatment, i.e., second heat fixing process performed to the image surface to which the powder adhesive is applied. That is, in a state where the powder adhesive Tn is heated and softened again when the sheet P passes through the bonding nip 32N while receiving pressure, the surfaces on the inner side of the sheet P are bonded via the powder adhesive Tn.

Figure 35:
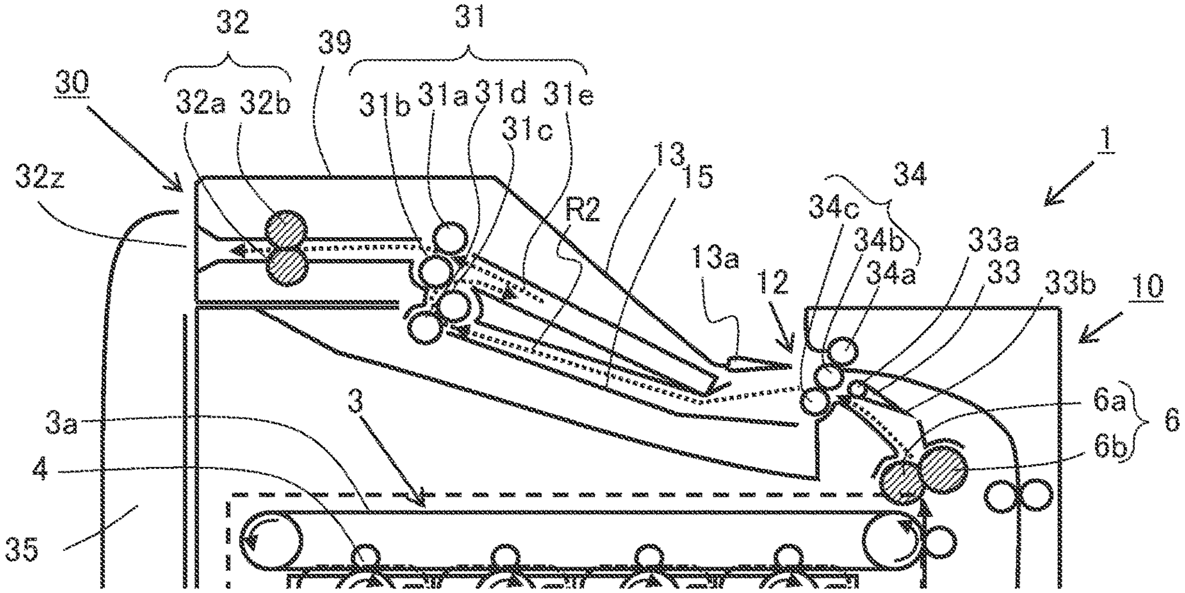
FIG. 35 is a view illustrating another conveyance route of a sheet in the image forming apparatus according to the seventh embodiment.

The sheet P having received the bonding treatment by the second fixing unit 32 is discharged to a left side in the drawing from a sheet discharge port 32*z*, i.e., second sheet discharge port, provided on the casing 39 of the postprocessing unit 30, as illustrated in FIG. 35. Then, it is stored in the second sheet discharge tray 35 (refer to FIG. 1) provided on the left side surface of the apparatus body 10. Thereby, the operation of forming an image on a sheet P conveyed through the second route R2 is ended.

Operation for Preparing Pouch

Figure 37A:
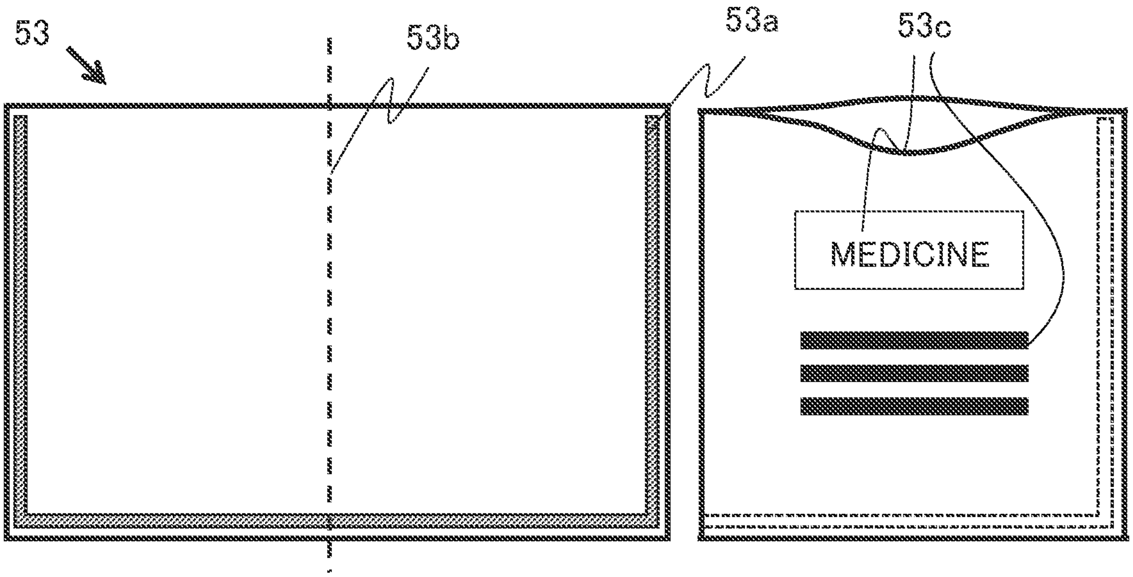
FIG. 37A is a view illustrating an example of a product output from the image forming apparatus according to the seventh embodiment.

According to the image forming apparatus of the present embodiment, in parallel with an operation for recording an image on one side or both sides of the sheet P using printing toner, the powder adhesive Tn is applied based on a predetermined pattern and a product to which the folding process and the bonding process are performed can be output. Therefore, a product that has been bonded by a bonding process from a base sheet such as a white paper that is not a preprinted sheet and to which printed information is added can be output. FIG. 37A illustrates an example of a product in which an envelope which is one example of a pouch-shaped product is formed by bonding treatment using powder adhesive to which an image 53*c* is simultaneously recorded on a front surface or a back surface of the envelope using printing toner. Examples of the image 53*c* include corporate logos and addresses.

When outputting such a product, one of the surfaces of the sheet P used as a base sheet will be on an outer side of the product, and the other surface will be on the inner side of the product. As illustrated in FIG. 38, according to the image forming apparatus of the present embodiment, after applying the powder adhesive Tn by a predetermined application pattern as an image forming operation on the first surface in duplex printing, the image 53*c* on the outer side can be formed using printing toner as the image forming operation on the second surface.

Setting of Conditions of Fixing Process and Bonding Process

Figure 37B:
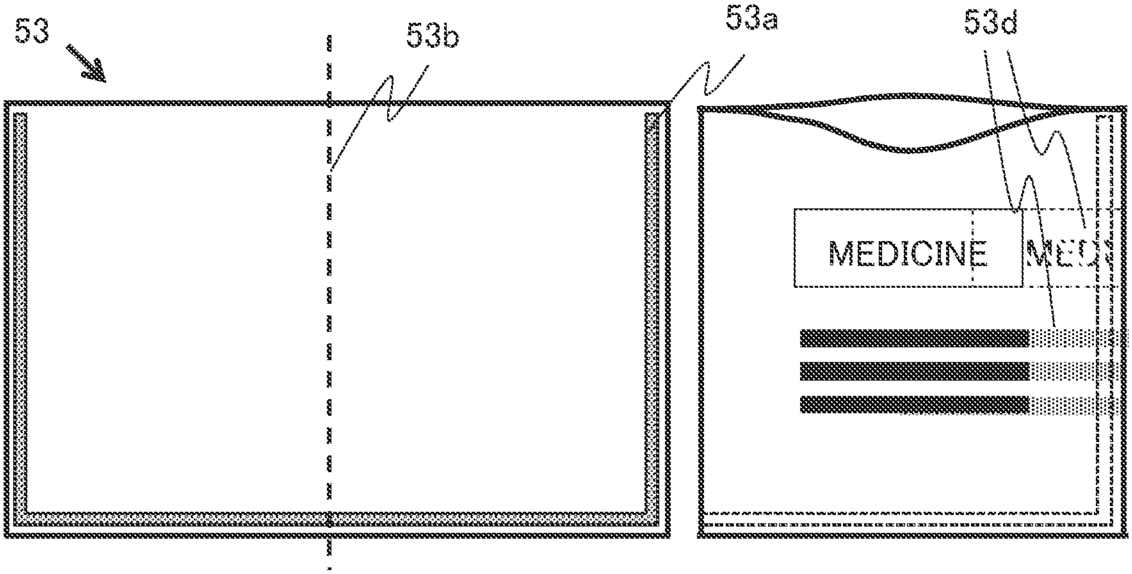
FIG. 37B is a view illustrating the influence of a hot offset of the product output from the image forming apparatus according to the seventh embodiment.

In outputting such a product, depending on conditions such as temperature and power during the bonding process, i.e., second fixing process and second heating process, image defects called hot offsets may occur, as denoted by 53*d* in FIG. 37B. Hot offsets may occur by the following causes.

As illustrated in FIG. 38, the powder adhesive Tn is applied on the inner side of the sheet P being folded. If the temperature of the heater 32*b*1 of the second fixing unit 32 is raised to increase the temperature of the powder adhesive Tn, the temperature of the heating film 32*b* is naturally increased. If the temperature of the heating film 32*b* becomes excessively high, the image 53*c* of printing toner that comes in direct contact with the heating film 32*b*, that is, the image formed on the outer side of the sheet P, is melted excessively into a fluid state and attaches to the heating film 32*b* as soiling. The attached soiling will be reattached to the sheet P after the heating film 32*b* rotates once and is recognized by the user as image defects 53*d* illustrated in FIG. 37B. In order to prevent the occurrence of such hot offsets, it is required to supply the heat quantity required for the powder adhesive Tn while preventing the temperature of the heater 32*b*1 of the second fixing unit 32 from becoming too high. That is, the relationship between the hot offset and the adhesive strength is usually a trade-off.

According to the present embodiment, in order to realize both suppression of hot offset and appropriate adhesive property, an arrangement is adopted where the leading-edge side of the sheet P being discharged from the first fixing unit 6 comes into contact with the fixing film 6*a* serving as a heat source member of the second fixing unit 32 after being folded by the folding unit 31. The description of "being discharged from the first fixing unit 6" refers to a state where the sheet is passed through the first fixing unit 6 to fix the toner image and then discharged after the toner image of printing toner has been transferred to the second surface of the sheet having the powder adhesive Tn already applied on the first surface thereof.

Specifically, an area from a leading edge of the sheet P when the sheet P is conveyed from the fixing nip 6N to the folding unit 31 ("q" of FIGS. 36A to 36D) to a folding line ("r" of FIGS. 36E, 36F and 38) is a first part P1 which is a leading-edge part of the sheet P. Since the sheet P is folded in two according to the present embodiment, the area from the folding line to the trailing edge of the sheet P is referred to as a second part P2 which is a trailing-edge part of the sheet P. In other words, the first part P1 is a part that passes the fixing nip 6N first when the sheet P is conveyed through the first fixing unit 6 toward the folding unit 31 and the second part P2 is a part that passes the fixing nip 6N thereafter.

As illustrated in FIG. 38, the first part P1 is exposed to one side in the thickness direction of the sheet P in a state where the sheet P is folded by the folding unit 31. Further, the second part P2 is exposed to the other side in the thickness direction of the sheet P in a state where the sheet P is folded by the folding unit 31. In other words, the folding unit 31 folds the sheet P being conveyed from the first fixing unit 6 toward the folding unit 31 in two so that the surfaces of the first part P1 and the second part P2 to which the powder adhesive Tn is applied, that is, second surface in duplex printing, face each other. The heating film 32*b* and the pressure roller 32*a* are arranged so that when the sheet P is passed through the second fixing unit 32, the first part P1 comes into contact with the fixing film 6*a* serving as a heating member and the second part P2 comes into contact with the pressure roller 32*a* serving as a pressing member. The advantages of this arrangement will be described in detail hereafter.

In the present embodiment, the sheet conveyance speed of the first fixing unit 6 and the second fixing unit 32 is set to the same speed, specifically, 210 mm/sec. In order to realize both suppression of hot offset and appropriate adhesive property at a high level, target temperature, i.e., controlled temperature of heater, of the heater 6*a*1 of the first fixing unit 6 is set to 170° C., and target temperature, i.e., controlled temperature of heater, of the heater 32*b*1 of the second fixing unit 32 is set to 220° C.

Verification of Suppression of Hot Offsets and Adhesive Property

Figure 41:
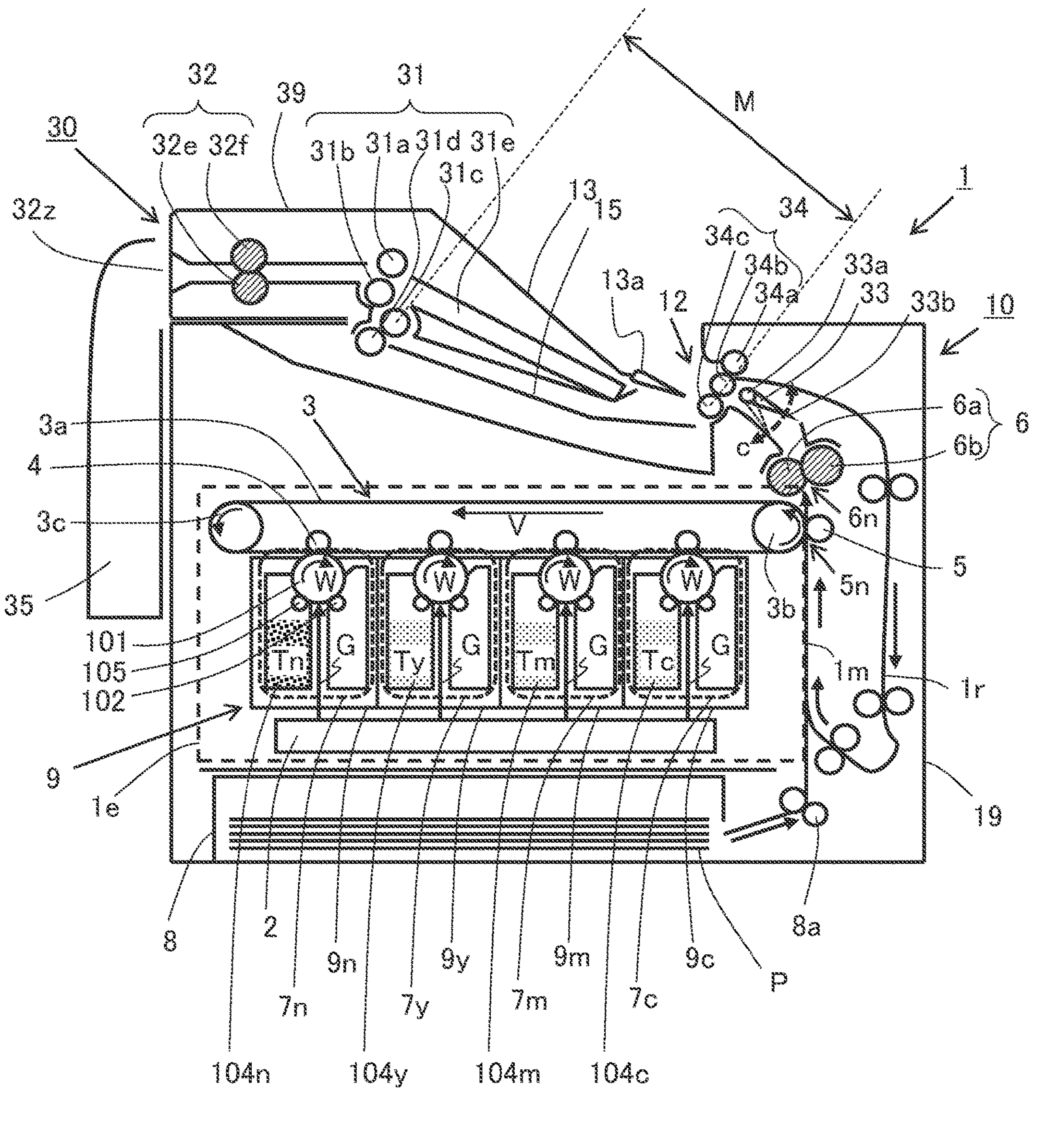
FIG. 41 is a schematic drawing of an image forming apparatus according to a comparative example 7.
Figure 42:
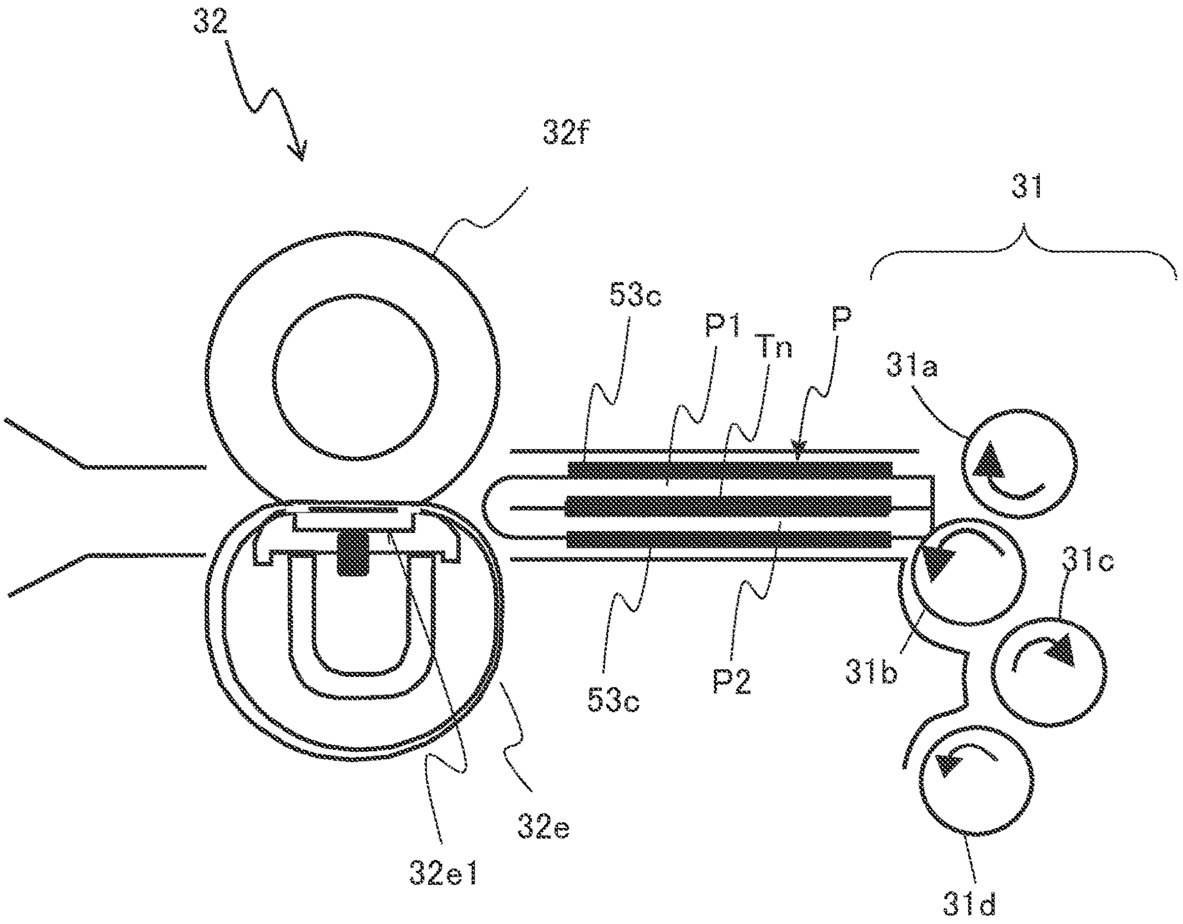
FIG. 42 is a schematic drawing of an inner side of a postprocessing unit according to the comparative example 7.

Next, the adhesive property and the occurrence of hot offsets were evaluated according to a comparative example 7 and the present embodiment. Comparative example 7 will be described with reference to FIGS. 41 and 42. The difference from the present embodiment is that the arrangement of the heating member and the pressing member in the second fixing unit 32 has been switched. That is, according to the present comparative example, a pressure roller 32*f* serving as a pressing member is arranged on an upper side in the vertical direction, and a film 32*e* having a heater 32*e*1 serving as a heating member is arranged on the lower side thereof. According to this arrangement, in the comparative example 7, a portion of the sheet P that was on a leading-edge side of the sheet P when the sheet P was discharged from the first fixing unit 6 and conveyed to the folding unit 31 abuts against the pressure roller 32*f* serving as the pressing member of the second fixing unit 32. In other words, according to the present comparative example, a portion of the sheet P that was the leading portion, i.e., the first part P1, of the sheet P when the sheet P was discharged from the first fixing unit 6 abuts against the pressure roller 32*f* which is not the heat-source side member. Further, a portion of the sheet P that was the trailing portion, i.e., the second part P2, of the sheet P when the sheet P was discharged from the first fixing unit 6 abuts against the film 32*e* serving as the heat-source side member. The other configurations of the image forming apparatus are the same as the first embodiment.

Highly white paper GF-C081 (grammage 81.4 g/$m^2$) which is a product of Canon Inc. was used as the sheet P for evaluation. As a method for evaluating the adhesive strength, force was applied to the bonding surface of the paper pouch in a direction to peel off the bonded surfaces by hand to observe whether the bonding surfaces maintained their bonded state. The surfaces not being bonded at all was evaluated as poor, the surfaces being peeled off at the bonding surface was evaluated as fair, and paper torn without the bonding surfaces being peeled off was evaluated as good. As for the evaluation of hot offsets, the paper pouch on which no hot offset was observed was evaluated as good, the paper pouch having a slight hot offset was evaluated as fair, and the paper pouch with a hot offset that is considered as a deterioration of image quality was evaluated as poor.

31*e*. Further, if the first part P1 and the second part P2 come into contact with the same conveyance guide during conveyance of the sheet P, the heat of the first part P1 is easily taken away by the conveyance guide but temperature of the second part P2 is not easily reduced since it comes into contact with the conveyance guide being warmed by the heat from the first part P1. Further, since the elapsed time from passing through the fixing nip 6N to reaching the bonding nip 32N is longer for the first part P1 than the second part P2, radiation of heat tends to progress.

According to the configuration of the present embodiment, the first part P1 whose temperature when reaching the second fixing unit 32 is lower than the second part P2 comes into contact with the heating film 32*b* which is the heat source-side member of the second fixing unit 32. The heat of the heater 32*b*1 is conducted to the first part P1 of the sheet P via the heating film 32*b*, and further conducted to the powder adhesive Tn applied on the bonding surface on the inner side of the sheet P via the first part P1. While the powder adhesive Tn is raised to a temperature suitable for achieving a sufficient adhesive strength, the temperature of the image 53*c* formed of printing toner on the first part P1 is also increased. However, since the temperature prior to entering the bonding nip 32N is relatively low, the temperature of the powder adhesive Tn can be heated to a temperature suitable for bonding before the temperature of the image 53*c* rises excessively. As a result, the bonding surfaces of the sheet P can be bonded firmly by the powder adhesive Tn while suppressing the occurrence of hot offsets caused by the

TABLE 5

| | SEVENTH EMBODIMENT | COMPARATIVE EXAMPLE 7 | | | | | | | | |
|---|---|---|---|---|---|---|---|---|---|---|
| CONTROLLED TEMPERATURE OF FIRST FIXING UNIT [° C.] | 170 | 160 | | | 170 | | | 180 | | |
| CONTROLLED TEMPERATURE OF SECOND FIXING UNIT [° C.] | 220 | 210 | 220 | 230 | 210 | 220 | 230 | 210 | 220 | 230 |
| BONDING PROPERTY | GOOD | POOR | POOR | FAIR | POOR | FAIR | FAIR | FAIR | GOOD | GOOD |
| HOT OFFSET | GOOD | GOOD | FAIR | POOR | GOOD | FAIR | POOR | FAIR | POOR | POOR |

As shown in Table 5, good results have been achieved for both adhesive property and hot offset according to the present embodiment. Meanwhile, according to the comparative example 7, it can be recognized that that there is no controlled temperature where the adhesive property and the hot offset both achieve satisfactory results in the same level as the present embodiment. The reason for this is considered as follows.

In a state where the sheet P in the folded state passes through the second fixing unit 32, a leading-edge side portion, i.e., first part P1, of the sheet P being discharged from the first fixing unit 6 normally has a lower temperature than the trailing-edge side portion, i.e., second part P2, of the sheet P being discharged from the first fixing unit 6. This is because the first part P1 is easily cooled by contact with the conveyance roller or the conveyance guide and by the temperature difference with the ambient temperature within the conveyance path after passing through the fixing nip 6N and before reaching the bonding nip 32N. For example, according to the present embodiment, the first part P1 is drawn into the drawing portion 31*e* of the folding unit 31 and comes into contact with peripheral walls of the drawing portion 31*e* where the heat is taken away, whereas the second part P2 does not pass through the drawing portion image 53*c* on the first part P1. As for the image 53*c* on the second part P2, there is little risk of hot offset since it is in contact with the pressure roller 32*a* which is a member arranged on the opposite side from the heat source.

Meanwhile, according to the configuration of the comparative example, the second part P2 whose temperature when reaching the second fixing unit 32 is higher than the first part P1 comes into contact with the heating film 32*b* which is the heat source-side member of the second fixing unit 32. In this case, the heat of the heater 32*b*1 is conducted to the second part P2 of the sheet P via the heating film 32*b*, and further conducted via the second part P2 to the powder adhesive Tn applied to the bonding surface on the inner side of the sheet P. In this state, if the controlled temperature of the second fixing unit is set high so that the powder adhesive Tn is raised to an appropriate temperature for achieving a sufficient adhesive strength, the temperature of the image 53*c* formed of printing toner on the second part P2 rises excessively and hot offsets tend to occur. If the controlled temperature of the second fixing unit is set low so as to suppress hot offsets, the temperature of the powder adhesive Tn will not rise sufficiently, and as a result, good adhesive property cannot be achieved. As described, it can be recognized that it is difficult to realize both suppression of hot offset and appropriate adhesive property at a high level. Similar results were observed in a case where the controlled temperature of the heater of the first fixing unit 6 is varied within the range of 160 to 180° C. to control the heat applied to the sheet P in the fixing process.

As described, according to the configuration of the present embodiment, both suppression of hot offsets and sufficient adhesive property can be realized easily.

Eighth Embodiment

An eighth embodiment has a configuration of a folding unit 38 and the second fixing unit 32 that differs from the seventh embodiment. Hereafter, the elements having the same configuration and effect as the seventh embodiment are denoted with the same reference numbers and detailed descriptions thereof are omitted.

Figure 39:
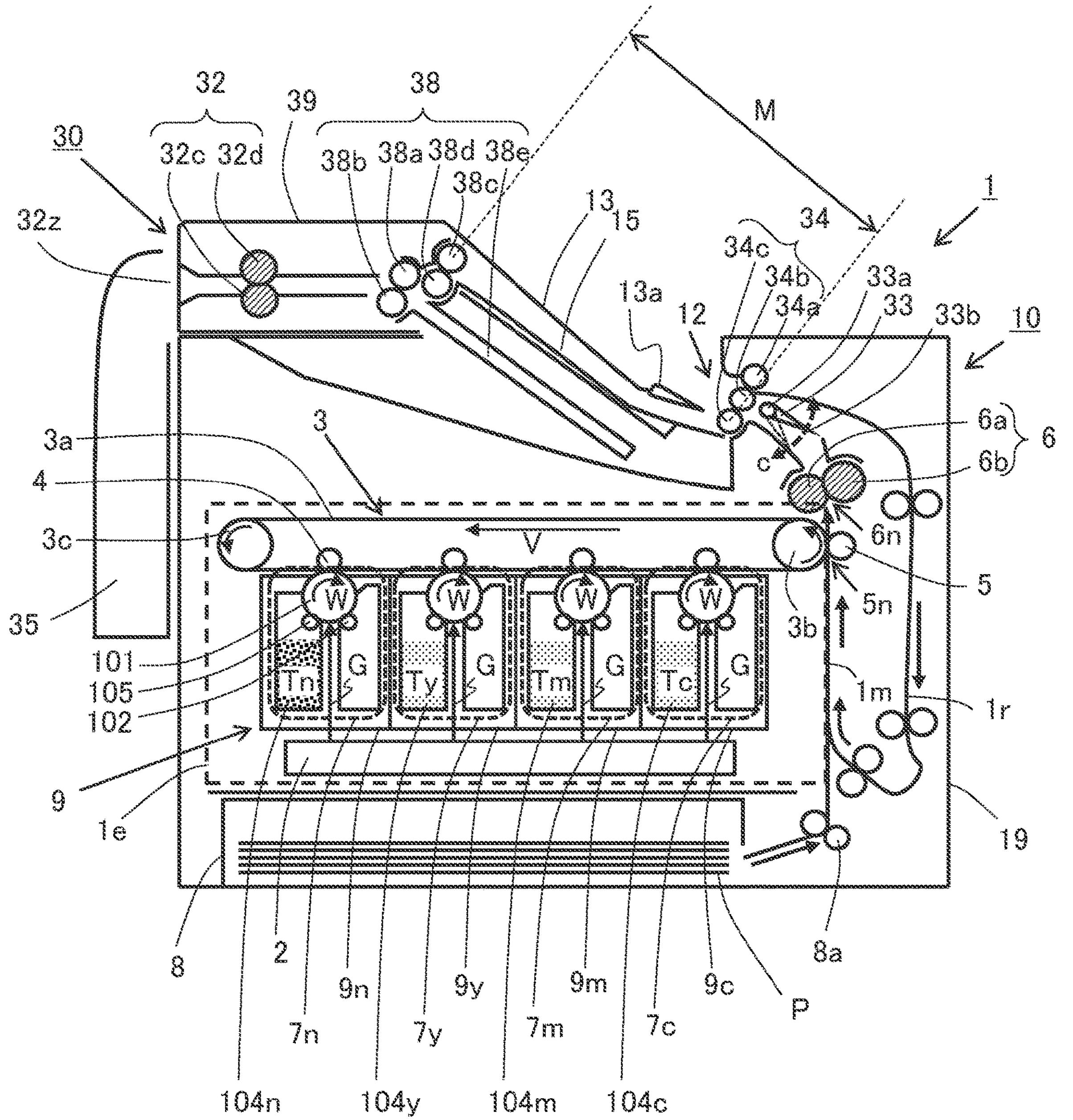
FIG. 39 is a schematic drawing of an image forming apparatus according to an eighth embodiment.

FIG. 39 is a schematic drawing illustrating a cross-sectional configuration of the image forming apparatus 1 according to the present embodiment. The positional relationships of roller members 38*a* to 38*d* constituting the folding unit 38, a drawing portion 38*e* and an intermediate path 15*e* differ from the configuration of the seventh embodiment illustrated in FIG. 34.

The folding unit 38 includes four rollers, which are a first guide roller 38*c*, a second guide roller 38*d*, a first folding roller 38*a* and a second folding roller 38*b*, and the drawing portion 38*e*. The first guide roller 38*c* and the second guide roller 38*d* are a guide roller pair that nip and convey the sheet P received from a conveyance path, which according to the present embodiment is the intermediate path 15, upstream of the folding unit 38. The first folding roller 38*a* and the second folding roller 38*b* are a folding roller pair that send out the sheet P while folding the same.

Figure 40:
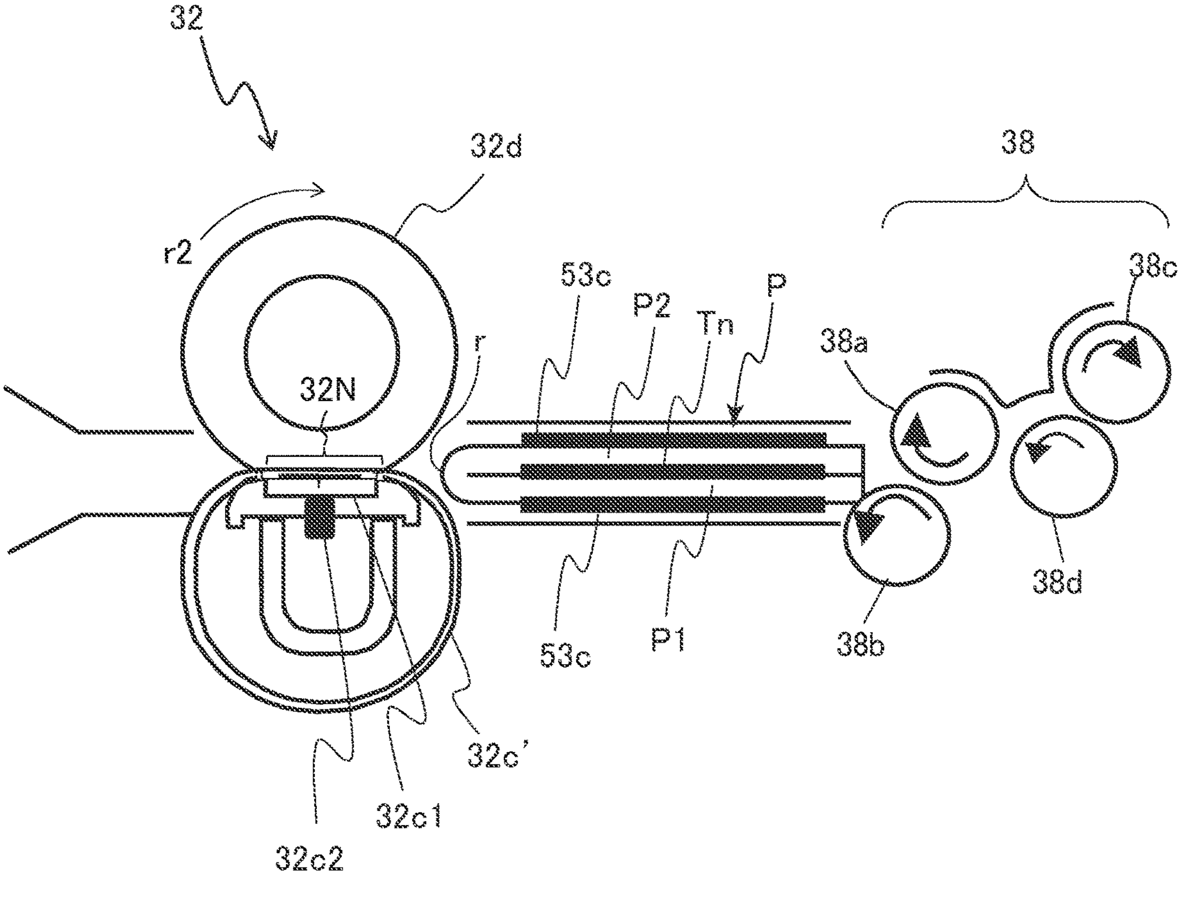
FIG. 40 is a schematic drawing of an inner side of a postprocessing unit according to the eighth embodiment.

The positional relationship of the folding unit 38 and the intermediate path 15*e* according to the present embodiment and the contents of the folding process executed by the folding unit 38 are approximately the same as the first embodiment. As a result, as illustrated in FIG. 40, in a state after the sheet P has been folded by the folding unit 38, the first part P1 on the leading-edge side of the sheet P when being discharged from the first fixing unit 6 is arranged on the lower side and the second part P2 on the trailing-edge side is arranged on the upper side. According to the image forming apparatus of the present embodiment, after forming the image 53*c* on the outer side using printing toner as the image forming operation performed to the first surface in duplex printing, the powder adhesive Tn can be applied according to a predetermined application pattern as an image formation operation performed to the second surface.

FIG. 40 is a schematic drawing illustrating an inner configuration of the postprocessing unit 30 according to the present embodiment, and it illustrates the folding unit 38 and the second fixing unit 32 serving as a bonding portion schematically. In the print-and-bond mode, the sheet P having passed through the folding unit 38 is conveyed to the second fixing unit 32 as illustrated in FIG. 49. The second fixing unit 32 adopts a heat fixing configuration similar to the first fixing unit 6. That is, the second fixing unit 32 is composed of a tubular film, i.e., endless belt, 32*c* including a heater 32*c*1 serving as a heating member and a pressure roller 32*d* serving as a pressing member.

The present configuration differs from the configuration of the seventh embodiment in that a heating film 32*c*' having the heater 32*c*1 arranged in the inner side thereof is positioned under the conveyance path and the pressure roller 32*d* is positioned above the conveyance path. Therefore, as illustrated in FIG. 40, also according to the present embodiment, the first part P1 on the leading-edge side of the sheet P being discharged from the first fixing unit 6 is folded by the folding unit 38 before coming into contact with the fixing film 6*a* which is the heat-source side member of the second fixing unit 32. Similarly, according to the present embodiment, the second part P2 on the trailing-edge side of the sheet P being discharged from the first fixing unit 6 is folded by the folding unit 38 before coming into contact with the pressure roller 32*d* which is the non-heat-source side member of the second fixing unit 32.

Setting of Conditions of Fixing Process and Bonding Process

In order to realize both suppression of hot offsets and adhesive property at a high level, target temperature, i.e., controlled temperature of heater, of the heater 6*a*1 of the first fixing unit 6 is set to 170° C., and target temperature, i.e., controlled temperature of heater, of the heater 32*c*1 of the second fixing unit 32 is set to 220° C.

Verification of Suppression of Hot Offsets and Adhesive Property

Figure 43:
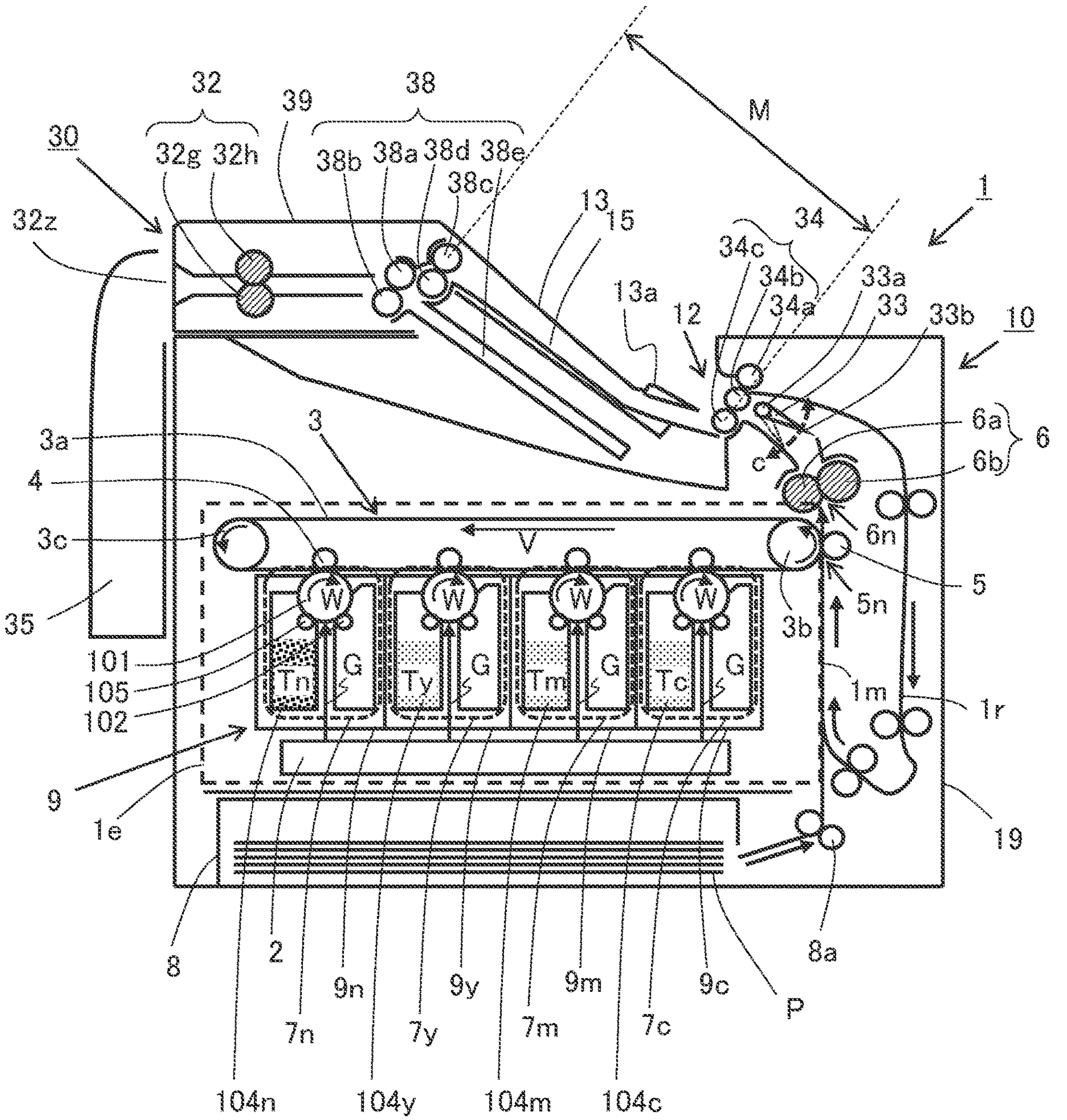
FIG. 43 is a schematic drawing of an image forming apparatus according to a comparative example 8.
Figure 44:
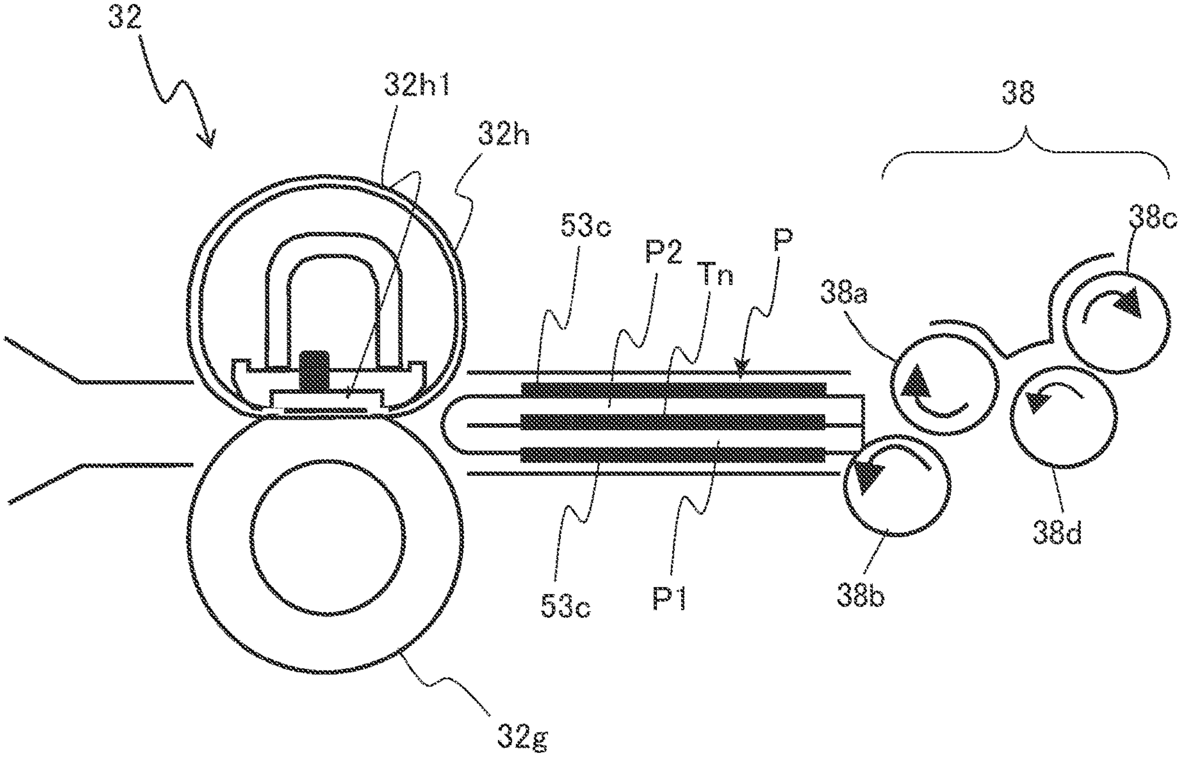
FIG. 44 is a schematic drawing of an inner side of a bonding unit according to the comparative example 8.

Next, the adhesive property and the occurrence of hot offsets were evaluated according to a comparative example 8 and the present embodiment. Comparative example 8 will be described with reference to FIGS. 43 and 44. The difference from the present embodiment is that the arrangement of the heating member and the pressing member in the second fixing unit 32 has been switched. That is, according to the present comparative example, a pressure roller 32*g* serving as a pressing member is arranged on a lower side in the vertical direction, and a film 32*h* having a heater 32*h*1 serving as a heating member is arranged on the upper side thereof. According to this arrangement, in the comparative example 8, the leading-edge side of the sheet P that has been discharged from the first fixing unit 6 and conveyed to the folding unit 38 abuts against the pressure roller 32*f* serving as the pressing member of the second fixing unit 32. In other words, according to the present comparative example, the leading-edge side portion, i.e., the first part P1, of the sheet P being discharged from the first fixing unit 6 abuts against the pressure roller 32*f* which is the non-heat-source side member. Further, the trailing-edge side portion, i.e., the second part P2, of the sheet P being discharged from the first fixing unit 6 abuts against the film 32*h* serving as the heat-source side member. The other configurations of the image forming apparatus are substantially the same as the seventh embodiment. The verification method is similar to the verification test shown in Table 5 of the seventh embodiment.

TABLE 6

| | EIGHTH EMBODIMENT | COMPARATIVE EXAMPLE 8 | | |
|---|---|---|---|---|
| CONTROLLED TEMPERATURE OF FIRST FIXING UNIT [° C.] | 170 | 160 | 170 | 180 |

TABLE 6-continued

| | EIGHTH EMBODIMENT | COMPARATIVE EXAMPLE 8 | | | | | | | | |
|---|---|---|---|---|---|---|---|---|---|---|
| CONTROLLED TEMPERATURE OF SECOND FIXING UNIT [° C.] | 220 | 210 | 220 | 230 | 210 | 220 | 230 | 210 | 220 | 230 |
| BONDING PROPERTY | GOOD | POOR | FAIR | GOOD | FAIR | GOOD | GOOD | GOOD | GOOD | GOOD |
| HOT OFFSET | GOOD | GOOD | FAIR | POOR | GOOD | FAIR | POOR | FAIR | POOR | POOR |

As shown in Table 6, good results have been achieved regarding adhesive property and hot offset according to the present embodiment. Meanwhile, according to the comparative example 8, it can be recognized that that there is no controlled temperature where the adhesive property and the hot offset both achieve satisfactory results in the same level as the eighth embodiment. The reason for this difference is considered to be because the first part P1 is easily cooled after passing the first fixing unit 6 and before reaching the second fixing unit 32 compared to the second part P2, similar to the seventh embodiment. That is, according to the present embodiment, the sheet P is heated from the side of the first part P1 having a low temperature when entering the bonding nip 32N, so that the powder adhesive Tn can be raised to a temperature suitable for bonding before the printing toner image of the first part P1 is melted excessively. Meanwhile, according to the comparative example 8, the sheet P is heated from the side of the second part P2 having a high temperature when entering the bonding nip 32N, so that hot offsets tend to occur if the controlled temperature of heater is increased, and sufficient adhesive property cannot be achieved if the controlled temperature of the heater is set low. Similar tendency was seen in a case where the heat applied to the sheet P was controlled in a fixing process where the controlled temperature of the heater of the first fixing unit 6 was varied within the range of 160 to 180° C.

As described above, according to the configuration of the present embodiment, suppression of hot offsets and sufficient adhesive property can both be realized easily.

Compared to the seventh embodiment, the present embodiment simply applies the powder adhesive Tn during forming of image on the second surface in duplex printing. Therefore, compared to the seventh embodiment, the folding process in the folding unit 38 and the bonding process in the second fixing unit 32 can be performed in a state where the temperature of the powder adhesive Tn remains relatively high. Therefore, the adhesive property according to the present embodiment is more advantageous compared to the seventh embodiment, and for example, a sufficient adhesive property can be achieved even if the controlled temperature of the heater of the second fixing unit 32 is set lower.

MODIFICATION EXAMPLES

In the first to eighth embodiments, a film-type image heating apparatus having advantageous quick-start property is adopted as the first fixing unit 6 and the second fixing unit 32, but the configuration of the image heating apparatus is not limited thereto. For example, an image heating apparatus of a type where toner and powder adhesive on the sheet P is heated via a heating roller in pressure contact with pressure rollers 6*b* and/or 32*a* can be adopted as the first fixing unit 6 and/or the second fixing unit 32. The heating roller is, for example, a roller in which an elastic layer formed for example of silicone rubber and a release layer formed for example of fluororesin are formed on an outer circumference of a metal cylinder. A film-type nip forming unit is not limited to a system where the heater is directly in contact with the inner side of the film and can adopt a system where the heater comes into contact with the film via the sheet member having a thermal conductivity such as iron alloy or aluminum. Further, the heating unit is not limited to adopting heating resistors, and it can adopt halogen lamps or induction heating mechanisms.

(1) According to the present disclosure, the following apparatus is disclosed as illustrated in the third and fourth embodiments.

(1-1) An image forming apparatus including:

an image forming portion configured to form a toner image on a sheet using printing toner and apply powder adhesive on the sheet;

a fixing portion configured to heat the toner image formed on the sheet by the image forming portion and fix the toner image to the sheet;

a folding portion configured to fold the sheet having passed through the fixing portion; and a bonding portion configured to heat the sheet having been folded by the folding portion and bond the sheet by the powder adhesive, wherein the folding portion includes a rotary member configured to contact the sheet and rotate, and wherein a ten point average roughness Rzjis of a surface of the rotary member is 10 μm or greater.

(1-2) In the image forming apparatus according to (1-1), preferably, the rotary member adopts a hollow structure.

(1-3) An image forming apparatus including:

an image forming portion configured to form a toner image on a sheet using printing toner and apply powder adhesive on the sheet;

a fixing portion configured to heat the toner image formed on the sheet by the image forming portion and fix the toner image to the sheet;

a folding portion configured to fold the sheet having passed through the fixing portion; and a bonding portion configured to heat the sheet having been folded by the folding portion and bond the sheet by the powder adhesive, wherein the folding portion includes a rotary member configured to contact the sheet and rotate, and wherein the rotary member adopts a hollow structure.

(1-4) The image forming apparatus according to any one of (1-1) to (1-3), wherein preferably, the rotary member is a roller member configured to nip the sheet, rotate, and convey the sheet while folding the sheet so that a surface on which the powder adhesive is applied is inside.

(1-5) The image forming apparatus according to any one of (1-1) to (1-4), wherein preferably, the image forming apparatus further includes a cover portion that is arranged above the folding portion and the bonding portion, and that covers the folding portion and the bonding portion when viewed in a gravity direction, wherein the cover portion includes an opening portion through which an outer space above the image forming apparatus and an inner space of the image forming apparatus are communicated, and wherein a ratio of an opening area of the opening portion with respect to an area of the cover portion is 5% or smaller when viewed in the gravity direction.

(1-6) An image forming apparatus including:

an image forming portion configured to form a toner image on a sheet using printing toner and apply powder adhesive on the sheet;

a fixing portion configured to heat the toner image formed on the sheet by the image forming portion and fix the toner image to the sheet;

a folding portion configured to fold the sheet having passed through the fixing portion;

a bonding portion configured to heat the sheet having been folded by the folding portion and bond the sheet by the powder adhesive; and a cover portion that is arranged above the folding portion and the bonding portion, and that covers the folding portion and the bonding portion when viewed in a gravity direction, wherein the cover portion includes an opening portion through which an outer space above the image forming apparatus and an inner space of the image forming apparatus are communicated, and wherein a ratio of an opening area of the opening portion with respect to an area of the cover portion is 5% or smaller when viewed in the gravity direction.

(1-7) The image forming apparatus according to any one of (1-1) to (1-6), wherein preferably, a sheet conveyance speed of the bonding portion is slower than a sheet conveyance speed of the fixing portion, and after starting to convey the sheet toward the bonding portion at a sheet conveyance speed faster than the sheet conveyance speed of the bonding portion, the folding portion reduces the sheet conveyance speed to the sheet conveyance speed of the bonding portion before a leading edge of the sheet in the sheet conveyance direction reaches the bonding portion.

(1-8) An image forming apparatus including:

an image forming portion configured to form a toner image on a sheet using printing toner and apply powder adhesive on the sheet;

a fixing portion configured to heat the toner image formed on the sheet by the image forming portion and fix the toner image to the sheet;

a folding portion configured to fold the sheet having passed through the fixing portion; and a bonding portion configured to heat the sheet having been folded by the folding portion and bond the sheet by the powder adhesive, wherein a sheet conveyance speed of the bonding portion is slower than a sheet conveyance speed of the fixing portion, and after the folding portion starts to convey the sheet toward the bonding portion at a sheet conveyance speed faster than the sheet conveyance speed of the bonding portion, the folding portion reduces the sheet conveyance speed to the sheet conveyance speed of the bonding portion before a leading edge of the sheet in the sheet conveyance direction reaches the bonding portion.

(1-9) The image forming apparatus according to (1-7) or (1-8), wherein preferably, the sheet conveyance speed of the fixing portion is V1, and the sheet conveyance speed of the bonding portion is V2, the sheet is conveyed at a speed of V1 after passing the fixing portion and before the sheet conveyance speed of the folding portion is reduced, and the folding portion reduces the sheet conveyance speed from V1 to V2 before the leading edge of the sheet in the sheet conveyance direction reaches the bonding portion.

(1-10) The image forming apparatus according to any one of (1-1) to (1-9), wherein preferably, the powder adhesive contains a binder resin, and a crystalline material that is compatible with the binder resin and that melts when being heated by the fixing portion, and the folding portion is configured to fold the sheet in a state where a surface temperature of the powder adhesive heated by the fixing portion after being applied to the sheet is higher than a crystallization temperature during dropping of temperature of the crystalline material.

(1-11) An image forming apparatus including:

an image forming portion configured to form a toner image on a sheet using printing toner and apply powder adhesive on the sheet;

a fixing portion configured to heat the toner image formed on the sheet by the image forming portion and fix the toner image to the sheet;

a folding portion configured to fold the sheet having passed through the fixing portion; and a bonding portion configured to heat the sheet having been folded by the folding portion and bond the sheet by the powder adhesive, wherein the powder adhesive contains a binder resin, and a crystalline material that is compatible with the binder resin and that melts by being heated by the fixing portion, and the folding portion is configured to fold the sheet in a state where a surface temperature of the powder adhesive heated by the fixing portion after being applied to the sheet is higher than a crystallization temperature during dropping of temperature of the crystalline material.

(1-12) The image forming apparatus according to (1-10) or (1-11), wherein preferably, the crystalline material includes ester wax or hydrocarbon wax.

(1-13) The image forming apparatus according to any one of (1-10) to (1-12), wherein preferably, the crystalline material includes a crystalline resin.

(2) According further to the present disclosure, the following apparatus is disclosed, as illustrated in the fifth and sixth embodiments.

(2-1) An image forming apparatus including:

an image forming portion configured to form a toner image on a sheet using printing toner and apply powder adhesive on the sheet;

a fixing portion configured to heat the toner image formed on the sheet and the powder adhesive applied on the sheet by the image forming portion and fix the toner image and the powder adhesive to the sheet;

a folding portion configured to fold the sheet having passed through the fixing portion with a surface on which the powder adhesive is applied inside; and a bonding portion including a roller member having an elastic layer formed of an elastomer and configured to bond the sheet by the powder adhesive by conveying the sheet by the roller member and heating the sheet having been folded by the folding portion, wherein a sheet conveyance speed of the bonding portion is faster than a sheet conveyance speed of the folding portion conveying the sheet toward the bonding portion.

(2-2) The image forming apparatus according to (2-1), wherein preferably, the folding portion includes a folding roller pair configured to fold the sheet while conveying the sheet toward the bonding portion, and a drive transmission portion configured to transmit a driving force from a drive source to the folding roller pair, and the drive transmission portion includes a one-way clutch configured to allow the folding roller pair to be rotated by being pulled by the sheet in a state where the sheet is in contact with both the folding roller pair and the roller member.

(2-3) The image forming apparatus according to (2-1) or (2-2), wherein preferably, a sheet conveyance speed by the bonding portion is greater by a ratio of 0.1% or more and 10% or less than the sheet conveyance speed of the folding portion conveying the sheet toward the bonding portion.

(2-4) The image forming apparatus according to any one of (2-1) to (2-3), wherein preferably, the elastic layer is formed of silicone rubber.

(2-5) The image forming apparatus according to any one of (2-1) to (2-4), wherein preferably, the bonding portion includes a tubular film that is in contact with the roller member at an outer surface, a heater arranged on an inner side of the film, and a nip forming unit that forms a nip portion by being in pressure contact with the roller member via the film, wherein the bonding portion is configured to heat the sheet by the heater while nipping and conveying the sheet between the roller member and film at the nip portion.

(2-6) The image forming apparatus according to any one of (2-1) to (2-5), wherein preferably, the image forming apparatus further includes a detection unit configured to detect waving of the sheet between the folding portion and the bonding portion in the sheet conveyance direction, and based on a detection signal of the detection unit, the sheet conveyance speed by the bonding portion is controlled so as to reduce the waving of the sheet between the folding portion and the bonding portion.

(2-7) An image forming apparatus including:

an image forming portion configured to form a toner image on a sheet using printing toner and apply powder adhesive on the sheet;

a fixing portion configured to heat the toner image formed on the sheet and the powder adhesive applied on the sheet by the image forming portion and fix the toner image and the powder adhesive to the sheet;

a folding portion configured to fold the sheet having passed through the fixing portion with a surface on which the powder adhesive is applied inside;

a bonding portion including a roller member having an elastic layer formed of an elastomer and configured to bond the sheet by the powder adhesive by conveying the sheet by the roller member and heating the sheet having been folded by the folding portion; and a detection unit configured to detect waving of the sheet between the folding portion and the bonding portion in the sheet conveyance direction, wherein based on a detection signal from the detection unit, a sheet conveyance speed by the bonding portion is controlled so as to reduce the waving of the sheet between the folding portion and the bonding portion.

(3) According further to the present disclosure, the following apparatus is disclosed, as illustrated in the seventh and eighth embodiments.

(3-1) An image forming apparatus including:

an image forming portion configured to form a toner image on a sheet using printing toner and apply powder adhesive on the sheet;

a fixing portion configured to heat the toner image formed on the sheet and the powder adhesive applied on the sheet by the image forming portion and fix the toner image and the powder adhesive to the sheet;

a folding portion configured to fold the sheet having passed through the fixing portion with a surface on which the powder adhesive is applied inside; and a bonding portion including a heating member configured to heat the sheet and a pressing member that abuts against the heating member, the bonding portion being configured to heat the sheet while nipping and conveying the sheet having been folded by the folding portion by a nip portion formed between the heating member and the pressing member so as to bond the sheet by the powder adhesive, wherein the bonding portion is arranged such that a portion of the sheet that was a leading portion when the sheet was discharged from the fixing portion toward the folding portion comes into contact with the heating member at the nip portion of the bonding portion.

(3-2) The image forming apparatus according to (3-1), wherein preferably, the image forming apparatus is configured such that, after forming the toner image using the printing toner to a first surface of the sheet by the image forming unit and fixing the toner image to the first surface by the fixing portion, the sheet is reversed, the powder adhesive is applied to a second surface opposite to the first surface of the sheet by the image forming unit and the powder adhesive is fixed to the second surface by the fixing portion, and thereafter, the sheet is folded with the second surface inside by the folding portion before being bonded by the bonding portion.

(3-3) The image forming apparatus according to (3-1) or (3-2), wherein preferably, the folding portion is configured to fold the sheet being conveyed from the fixing portion to the folding portion in two such that the surface to which the powder adhesive is applied is inside, and a portion of the sheet that was a trailing portion when the sheet was discharged from the fixing portion toward the folding portion comes in contact with the pressing member at the nip portion of the bonding portion.

(3-4) The image forming apparatus according to (3-3), wherein preferably, the folding portion includes a folding roller pair configured to nip and convey the sheet, a drawing portion that extends upstream of the folding roller pair in a sheet conveyance direction of the folding roller pair, and a guide roller configured to send a leading edge of the sheet conveyed from the fixing portion to the drawing portion, wherein the folding roller pair is configured to nip and convey the sheet while folding the sheet with a part of the sheet being a leading end of the folded sheet, wherein the part of the sheet is a part where a warp of the sheet has been created in a state where a leading edge of the sheet abuts against an end portion of the drawing portion.

(3-5) The image forming apparatus according to (3-1) or (3-2), wherein preferably, the folding portion is configured to fold the sheet a plurality of positions in the sheet conveyance direction, and in a state where the sheet is folded at the plurality of positions, the portion of the sheet that was the leading portion when the sheet is discharged from the fixing portion toward the folding portion is on an outside of the folded sheet.

(3-6) The image forming apparatus according to any one of (3-1) to (3-5), wherein preferably, the heating member includes a tubular film, and a heater arranged on an inner side of the film and configured to heat the sheet passing through the nip portion via the film, and the pressing member is a roller configured to abut against the heater via the film.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-129960, filed on Jul. 31, 2020, 2020-129961, filed on Jul. 31, 2020, 2020-129962, filed on Jul. 31, 2020, and 2020-156213, filed on Sep. 17, 2020, which are hereby incorporated by reference herein in their entirety.

What is claimed is:

1. An electrophotographic image forming apparatus comprising:

a plurality of photosensitive members configured to respectively form a toner image and an adhesive layer on a sheet using printing toner and powder adhesive;

a pair of rotatable fixing members configured to heat the toner image and the adhesive layer formed on the sheet by the plurality of photosensitive members and fix the toner image and the adhesive layer to the sheet;

a plurality of rollers configured to fold the sheet having passed through the pair of rotatable fixing members such that a surface of the sheet to which the powder adhesive is applied is folded to become opposing inner surfaces of the folded sheet; and a pair of rotatable members configured to heat the folded sheet folded by the plurality of rollers and bond the opposing inner surfaces of the folded sheet together by the adhesive layer, wherein the pair of rotatable fixing members and the pair of rotatable members are configured such that a relationship of Tmax1>Tmax2 is satisfied, where Tmax1 (° C.) is a highest temperature of the adhesive layer when being heated by the pair of rotatable fixing members and Tmax2 (° C.) is a highest temperature of the adhesive layer when being heated by the pair of rotatable members, and wherein a relationship of Q1<Q2 is satisfied, where Q1 ($J/mm^2$) is a heat quantity per unit area applied to the sheet by the pair of rotatable fixing members and Q2 ($J/mm^2$) is a heat quantity per unit area applied to the folded sheet by the pair of rotatable members.

2. The electrophotographic image forming apparatus according to claim 1, wherein Tmax1 is higher than a melting point of the powder adhesive, and wherein Tmax2 is lower than the melting point of the powder adhesive and equal to or higher than a glass transition temperature of the powder adhesive.

3. The electrophotographic image forming apparatus according to claim 1, wherein both Tmax1≤Tg+40 and Tmax2≤Tg+10 are satisfied, where Tg (° C.) is a glass transition temperature of the powder adhesive.

4. The electrophotographic image forming apparatus according to claim 1, wherein both Tmax1Tg+50 and Tmax2≤Tg+20 are satisfied, where Tg (° C.) is a glass transition temperature of the powder adhesive is referred to as Tg (° C.).

5. The electrophotographic image forming apparatus according to claim 1, wherein a relationship of 1.0≤Q2/Q1≤2.2 is satisfied for Q1 and Q2.

6. The electrophotographic image forming apparatus according to claim 1, wherein a relationship of 1.3≤Q2/Q1≤1.9 is satisfied for Q1 and Q2.

7. The electrophotographic image forming apparatus according to claim 1, wherein the pair of rotatable fixing members is provided with a first heating unit configured to heat the sheet being conveyed by the pair of rotatable fixing members, wherein the pair of rotatable members is provided with a second heating unit configured to heat the sheet being conveyed by the pair of rotatable members, and wherein a relationship of V1>V2 is satisfied, where V1 (mm/sec) is a sheet conveyance speed by the pair of rotatable fixing members and V2 (mm/sec) is a sheet conveyance speed by the pair of rotatable members.

8. The electrophotographic image forming apparatus according to claim 7, wherein the plurality of rollers is configured to fold the sheet in two such that a length of the sheet in a sheet conveyance direction becomes half, and wherein a relationship of 0.5≤V2/V1≤0.75 is satisfied for V1 and V2.

9. An electrophotographic image forming apparatus comprising:

a first photosensitive member;

a first developing roller configured to supply toner to the first photosensitive member and form a toner image on the first photosensitive member;

a second photosensitive member;

a second developing roller configured to supply powder adhesive to the second photosensitive member and form an adhesive layer on the second photosensitive member;

a transfer unit configured to transfer the toner image and the adhesive layer to a sheet by applying transfer voltage to the toner image and the adhesive layer;

a pair of rotatable fixing members configured to fix the toner image and the adhesive layer formed on the sheet onto the sheet, the pair of rotatable fixing members being configured to heat the sheet at a fixing nip portion formed by the pair of rotatable fixing members while conveying the sheet at the fixing nip portion;

a plurality of rollers configured to fold the sheet having passed through the pair of rotatable fixing members such that a surface of the sheet to which the adhesive layer is formed is folded to become opposing inner surfaces of the folded sheet; and a pair of rotatable members configured to bond the opposing inner surfaces of the folded sheet together by the adhesive layer, the pair of rotatable members being configured to heat the folded sheet from an outside of the folded sheet at a heating nip portion formed by the pair of rotatable members while conveying the folded sheet at the heating nip portion, wherein the pair of rotatable fixing members and the pair of rotatable members are configured such that a relationship of Tmax1>Tmax2 is satisfied, where Tmax1 (° C.) is a highest temperature of the adhesive layer when being heated by the pair of rotatable fixing members and Tmax2 (° C.) is a highest temperature of the adhesive layer when being heated by the pair of rotatable members, and wherein a relationship of Q1<Q2 is satisfied, where Q1 (J/mm$^2$) is a heat quantity per unit area applied to the sheet by the pair of rotatable fixing members and Q2 (J/mm$^2$) is a heat quantity per unit area applied to the folded sheet by the pair of rotatable members.

10. The electrophotographic image forming apparatus according to claim 9, wherein Tmax1 is higher than a melting point of the powder adhesive, and wherein Tmax2 is lower than the melting point of the powder adhesive and equal to or higher than a glass transition temperature of the powder adhesive.

11. The electrophotographic image forming apparatus according to claim 9, wherein a relationship of V1>V2 is satisfied, where V1 (mm/sec) is a sheet conveyance speed by the pair of rotatable fixing members and V2 (mm/sec) is a sheet conveyance speed by the pair of rotatable members.

12. An electrophotographic image forming system comprising:

an electrophotographic printer including:

a first photosensitive member, a first developing roller configured to supply toner to the first photosensitive member and form a toner image on the first photosensitive member, a second photosensitive member, a second developing roller configured to supply powder adhesive to the second photosensitive member and form an adhesive layer on the second photosensitive member, a transfer unit configured to transfer the toner image and the adhesive layer to a sheet by applying transfer voltage to the toner image and the adhesive layer, and a pair of rotatable fixing members configured to fix the toner image and the adhesive layer formed on the sheet onto the sheet, the pair of rotatable fixing members configured to heat the sheet at a fixing nip portion formed by the pair of rotatable fixing members while conveying the sheet at the fixing nip portion; and a postprocessing unit attached to the printer, the postprocessing unit including:

a plurality of rollers configured to fold the sheet having passed through the pair of rotatable fixing members such that a surface of the sheet to which the adhesive layer is formed is folded to become opposing inner surfaces of the folded sheet; and a pair of rotatable members configured to bond the opposing inner surfaces of the folded sheet together by the adhesive layer, the pair of rotatable members configured to heat the folded sheet from an outside of the folded sheet at a heating nip portion formed by the pair of rotatable members while conveying the folded sheet at the heating nip portion, wherein the pair of rotatable fixing members and the pair of rotatable members are configured such that a relationship of Tmax1>Tmax2 is satisfied, where Tmax1 (° C.) is a highest temperature of the adhesive layer when being heated by the pair of rotatable fixing members and Tmax2 (° C.) is a highest temperature of the adhesive layer when being heated by the pair of rotatable members, and wherein a relationship of Q1<Q2 is satisfied, where Q1 (J/mm$^2$) is a heat quantity per unit area applied to the sheet by the pair of rotatable fixing members and Q2 (J/mm$^2$) is a heat quantity per unit area applied to the folded sheet by the pair of rotatable members.

13. The electrophotographic image forming system according to claim 12, wherein Tmax1 is higher than a melting point of the powder adhesive, and wherein Tmax2 is lower than the melting point of the powder adhesive and equal to or higher than a glass transition temperature of the powder adhesive.

14. The electrophotographic image forming system according to claim 12, wherein a relationship of V1>V2 is satisfied, where V1 (mm/sec) is a sheet conveyance speed by the pair of rotatable fixing members and V2 (mm/sec) is a sheet conveyance speed by the pair of rotatable members.

15. An electrophotographic image forming apparatus comprising:

a photosensitive member;

a developing roller configured to supply powder adhesive to the photosensitive member and form an adhesive layer on the photosensitive member;

a transfer unit configured to transfer the adhesive layer to a sheet by applying transfer voltage to the adhesive layer;

a pair of rotatable fixing members configured to fix the adhesive layer formed on the sheet onto the sheet, the pair of rotatable fixing members being configured to heat the sheet at a fixing nip portion formed by the pair of rotatable fixing members while conveying the sheet at the fixing nip portion;

a plurality of rollers configured to fold the sheet having passed through the pair of rotatable fixing members such that a surface of the sheet to which the adhesive layer is formed is folded to become opposing inner surfaces of the folded sheet; and a pair of rotatable members configured to bond the opposing inner surfaces of the folded sheet together by the adhesive layer, the pair of rotatable members being configured to heat the folded sheet from an outside of the folded sheet at a heating nip portion formed by the pair of rotatable members while conveying the folded sheet at the heating nip portion, wherein the pair of rotatable fixing members and the pair of rotatable members are configured such that a relationship of Tmax1>Tmax2 is satisfied, where Tmax1 (° C.) is a highest temperature of the adhesive layer when being heated by the pair of rotatable fixing members and Tmax2 (° C.) is a highest temperature of the adhesive layer when being heated by the pair of rotatable members, and wherein a relationship of Q1<Q2 is satisfied, where Q1 (J/mm2) is a heat quantity per unit area applied to the sheet by the pair of rotatable fixing members and Q2 (J/mm2) is a heat quantity per unit area applied to the folded sheet by the pair of rotatable members.

16. The electrophotographic image forming apparatus according to claim 15, wherein Tmax1 is higher than a melting point of the powder adhesive, and wherein Tmax2 is lower than the melting point of the powder adhesive and equal to or higher than a glass transition temperature of the powder adhesive.

17. The electrophotographic image forming apparatus according to claim 15, wherein a relationship of V1>V2 is satisfied, where V1 (mm/sec) is a sheet conveyance speed by the pair of rotatable fixing members and V2 (mm/sec) is a sheet conveyance speed by the pair of rotatable members.

* * * * *